United States Patent [19]

Devenport

[11] Patent Number: 5,517,298
[45] Date of Patent: May 14, 1996

[54] DIODE ARRAY VELOCIMETER

[75] Inventor: William J. Devenport, Christiansburg, Va.

[73] Assignee: Virginia Tech Intellectual Properties, Inc, Blacksburg, Va.

[21] Appl. No.: 70,115

[22] Filed: Jun. 1, 1993

[51] Int. Cl.⁶ .................................................... G01P 3/36
[52] U.S. Cl. .................................................... 356/28
[58] Field of Search .................................................... 356/28

[56] References Cited

U.S. PATENT DOCUMENTS

| | | |
|---|---|---|
| 3,193,816 | 7/1965 | Brath . |
| 3,675,029 | 7/1972 | Iten et al. . |
| 3,677,647 | 7/1972 | Misek .................................................... 356/28 |
| 3,998,552 | 12/1976 | Stewart et al. . |
| 4,162,509 | 7/1979 | Robertson . |
| 4,255,048 | 3/1981 | Franke . |
| 4,309,104 | 1/1982 | Prinz et al. .................................................... 356/28 |
| 4,385,830 | 5/1983 | Webb et al. .................................................... 356/28 |
| 4,543,834 | 10/1985 | Hasegawa et al. . |
| 4,637,727 | 1/1987 | Ahola et al. . |
| 4,664,513 | 5/1987 | Webb et al. .................................................... 356/28 |
| 4,725,136 | 2/1988 | McCullough et al. . |
| 4,746,211 | 5/1988 | Ruth et al. . |
| 4,875,769 | 10/1989 | Linebarger . |
| 4,887,213 | 12/1989 | Smart et al. . |
| 4,895,442 | 1/1990 | Boutier et al. .................................................... 356/28 |
| 4,927,263 | 5/1990 | de Groot et al. . |
| 4,989,969 | 2/1991 | Siebert et al. .................................................... 356/28 |
| 5,011,279 | 4/1991 | Auweter et al. . |

FOREIGN PATENT DOCUMENTS

| | | |
|---|---|---|
| 8504883 | 3/1986 | Brazil . |
| 1261169 | 9/1989 | Canada . |
| 0123309 | 6/1987 | Japan .................................................... 356/28 |
| 2213018 | 8/1989 | United Kingdom . |

*Primary Examiner*—Stephen C. Buczinski
*Attorney, Agent, or Firm*—Whitham, Curtis, Whitham, and McGinn

[57] ABSTRACT

A velocimeter includes a light source for emitting a light beam through a flow, the flow including particles for scattering light as the light beam passes through the flow, a focussing device for focussing the scattered light into a particle image, a detecting device for detecting the particle image, and a device for timing passage of the particles through a predetermined section of the light beam. The detecting device includes at least one array of photodiodes for receiving light scattered by the particles. The array has a predetermined shape and is positioned so as to control a measurement volume geometry from which light scattered by the particles is received by the photodiodes.

8 Claims, 48 Drawing Sheets

Time (micro seconds)

DIODE ARRAY VELOCIMETER

BACKGROUND OF THE INVENTION

Field of the Invention

The present invention generally relates to a device for measuring the motion of transparent gaseous or liquid flow by illuminating small solid or liquid particles carried with those flows.

Description of the Related Art

Many techniques exist for measuring the motion of a fluid by analyzing light scattered by particles suspended within the fluid. These techniques include laser Doppler velocimetry, particle image velocimetry (PIV) and laser-two-focus (L2F), and are described below.

Laser Doppler Velocimetry (LDV) is the principle measurement technique employed and uses the Doppler effect. LDVs measure velocity over a small region of the flow, and thus are considered to be point measurement devices. LDVs require that particles be illuminated by coherent laser light beams. At least two light beams are required for a one-component velocity measurements. More than two light beams are required if more than one component is to be measured. If measurements in a reversing flow are required at least one of the beams must be frequency-shifted by an acousto-optic device or the like. Light scattered by the beams is typically collected by one or more photomultiplier tubes which convert the light signal into an electrical signal. Since particles pass through the beams at random, the signal contains a series of "bursts" at random. Each of the bursts has a frequency which corresponds to the velocity of the particle that generated it. This type of signal is difficult and expensive to process accurately. If several velocity components are measured simultaneously, the costs are multiplied. The optical and electronic complexity of LDVs makes them impractical for use outside the laboratory, such as on operational vehicles. However, in laboratories, LDVs exist that make high-quality single-point velocity measurements at a high rate. These measurements are typically used to measure statistical averages of velocity in turbulent flows, such as mean-velocity components and Reynolds stresses.

A second technique is particle image velocimetry (PIV), in which a sheet of light is used to illuminate a large number of the particles simultaneously and a video or still camera images the light scattered from those particles. Either the light source is pulsed or several images are taken at short intervals so that the positions of the particles as successive time points can be determined. PIVs are expensive, physically large and generally require powerful light sources and therefore are confined to the measurements in the laboratory. The images generated by PIVs are difficult, expensive and slow to process, requiting high-speed computers. As a result, PIVs are impractical for measuring statistical average of velocity and are most often used to examine flow patterns.

A third technique is laser-two-focus anemometry (L2F), in which two parallel light beams are directed through a flow field. Particles in the flow scatter light as they pass through the beams. The light is collected and focussed onto one or more electro-optic detectors. The resulting electrical signal is used to determine the transit time of the particles between the beams and thus estimate their velocity. Only velocity is measured. While L2F is considerably simpler and less costly than either of the two techniques described above, it is inaccurate and has limited applications. Specifically, since the beams are of finite diameter, the distance which the particle travels between the beams is poorly defined. Further, if the instantaneous angle is large, particles will tend to pass through only one beam. L2F is generally limited to mean-velocity measurements in low turbulence flows (non-reversing) of known flow direction.

A large number of other, lesser known, techniques exist but almost all are derivatives of one or more of the above techniques. An exception is the technique described in U.S. Pat. No. 4,895,442 which discloses a velocity measuring device which is a mosaic laser velocimeter (MLV) which has an optical fiber mosaic and which uses a single laser beam. Light scattered by particles passing through a section of the beam is imaged on to one or more arrays of the fiber mosaics. Each optical fiber in the mosaic is connected to a photomultiplier tube. However, using optical fibers makes this device inaccurate. Because of the circular shape of the fibers, the distance travelled by a particle between two fiber ends is poorly defined. Therefore, velocity based on transit times between these ends are also poorly defined. Second, the large number of photomultiplier makes this device expensive and bulky.

Another system, disclosed by U.S. Pat. No. 4,725,136, has a device for measuring particle velocities by monitoring their diffracted images as they pass across a pair of differential linear photodiode arrays. Because the linear arrays are operated in a differential mode, the arrays provide an output in the form of an electrical signal whose frequency is proportional to the particle velocity, similar to laser Doppler anemometry. While this device utilizes an illuminating laser beam, a particle image and a photodiode array, individual particle image locations cannot be detected. Further, the technique cannot be extended to more than one-component measurements. Additionally, this device utilizes the signal processing electronics of laser Doppler anemometers. These electronics are prohibitively expensive and physically large. Therefore, complete miniaturization of this device is difficult. Further, errors in one-component measurements made with this device may be substantial at high flow angles where particle images move across the diode array at significant angles to its axis.

SUMMARY OF THE INVENTION

It is therefore an object of the present invention to provide a new optical flow measurement technique that overcomes the above difficulties and which provides a technique which combines low cost and simplicity with high accuracy, speed and flexibility of measurement.

According to a first aspect of the invention, a diode array velocimeter (DAV) measures the motion of a transparent gas or liquid flow seeded with naturally occurring or artificially introduced solid or liquid particles. The DAV includes a light source for producing a collimated light beam or sheet of light (the light need not be monochromatic or coherent), means (e.g., a lens or the like) for focussing light scattered by the illuminated particles to form images from the light, means (e.g., at least one array of solid-state electro-optic detector elements such as PIN or avalanche photodiodes) for detecting the light focussed by the focussing means scattered by the flow, each array producing electrical signals from the light received from the focussing means, and means for processing the electrical signals from each array to obtain the transit time of the particle images across or between elements of the same array, wherein the detecting means comprises at least one photodiode array for receiving light focussed by the focussing means, the photodiode array having a predetermined shape and being positioned so as to control a geometry of a measurement volume of the light scattered by the particles.

The region or regions within which the DAV measures the particle and thus fluid motion is termed the measurement volume. The measurement volume is the region or regions formed by the intersection of the light beam or sheet and the projection of the detector array(s) back through the focussing means. When a particle passes through the measurement volume, its image passes across one or more of the detector arrays. Measurements are made by timing this passage. Each detector array is used to sense the motion of only one particle image at a time. This greatly simplifies the signal processing required to time the motion of a particle image and determine its velocity, position and/or acceleration and indeed such measurements, if necessary, can be performed by simple logic circuitry. Several detector arrays may be operated in parallel if simultaneous measurements of several particles are required, for example, if measurements of the flow pattern over a large region of space are required.

A primary feature of the invention is that the arrays have carefully shaped elements having prescribed geometrical configurations. The shape and relative position of each element within each detector array are selected so that any one or more of velocity, acceleration and position of the particle images (and therefore, the flow), may be determined easily and accurately from the measured transit times of the particle images across or between elements of the same array. As the detecting means, solid-state photodiode arrays are preferred since such arrays can be formed in almost any shape and pattern and are therefore well-suited to this application. Solid-state photodiode arrays are also inexpensive as compared to other types of detectors such as photomultiplier tubes.

DAVs are useful for making one-, two- or three-component measurement of velocity, acceleration, and/or position. Depending on the design and number of detector arrays, measurement is made at a single point or simultaneously at a number of points over a large region of the flow. Since the DAV only requires simple signal processing be performed for each detector array, measurements are made at a high rate. Therefore, DAVs are capable of all types of measurements that can be made using existing technologies and in comparison to these technologies many advantages and benefits accrue to the DAV.

For example, in point velocity measurement, the DAV has significant advantages over techniques such as LDV and L2F. Compared to LDV, the optical setup of the DAV is simpler and less costly, requiring only one illuminating light beam, which need not be coherent or monochromatic, regardless of the number of components to be measured. Additionally, the signals produced by the DAV (e.g., electrical pulses indicating the passage of a particle image over a detector array element) are easier and less costly to process than frequency-modulated bursts. Optical simplicity, accuracy and the ability to make velocity measurements regardless of turbulence level and flow reversals, are also advantages over L2F apparatus and techniques.

Further, in velocity, position and acceleration measurements over a large region, the DAV has substantial advantages over PIV and similar techniques in that since each detector array is operated in parallel, measurements can be made at a rate several orders of magnitude higher than that achievable with PIV. Furthermore, none of the sophisticated and expensive image processing circuitry required by PIV is needed in the DAV.

Additionally, the DAV is well-suited to miniaturization as compared to the conventional techniques described above. Its detector arrays, signal amplifiers and processing circuitry can be formed of silicon and can have simple designs thus can be easily miniaturized. Such miniaturization and associated mass production capability further reduce the cost of this device as compared to the conventional systems.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
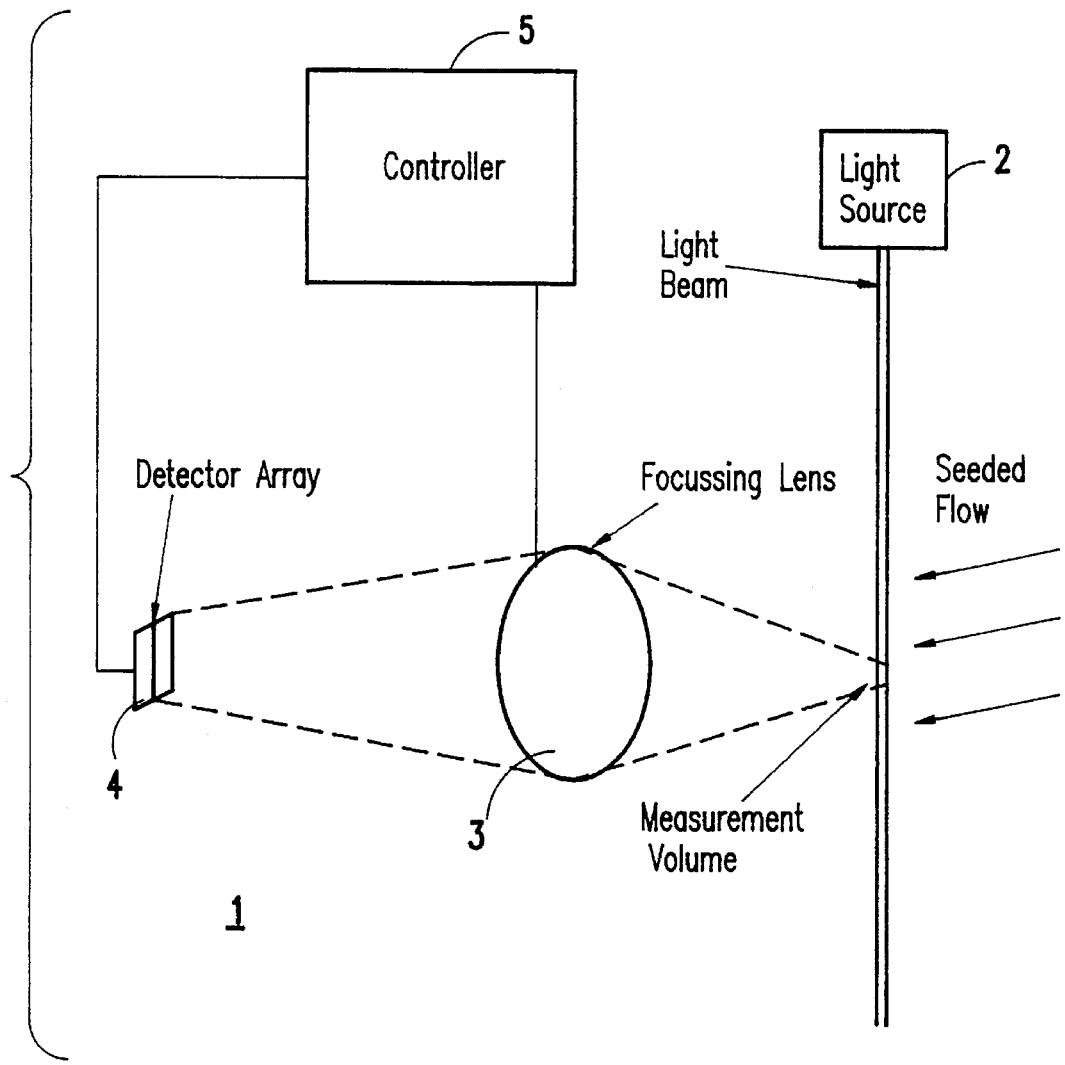
FIG. 1 is a schematic of a specific embodiment of a diode array velocimeter according to the invention.

Referring now to the drawings, and more particularly to FIG. 1, there is shown a diode array velocimeter (DAV) used for optically measuring the motion of a transparent gas or liquid flow seeded with naturally occurring or artificially introduced solid or liquid particles. The general concept of the DAV is to utilize a light beam or light sheet directed across the flow. Light scattered by particles as they pass through the beam or sheet is focussed by one or more focussing means (e.g., a lens) to form one or more images of the particles. Thereafter, the motion of the particles is timed as the images pass across one or more detecting means (e.g., one or more arrays of solid state electro-optic detectors). As will become evident, the components of the DAV lend themselves to miniaturization, can be efficiently produced and allow for high accuracy measurements.

Hereinbelow, the design, operation and performance of a specific embodiment of the DAV having been reduced to practice is described. The specific embodiment is only one of numerous contemplated designs, with some other designs being described at the end of this section. Hence, the scope of the invention is limited only by the claims following this section and not by the description of the specific embodiment herein.

An optical layout of the DAV 1 according to the specific embodiment and which is suitable for one-component velocity measurements is shown in FIG. 1. In principle, the optical system of the DAV 1 is very simple and, apart from the seeded flow to be measured, includes light source means (e.g., light source 2) for producing a collimated light beam or sheet into the flow, focussing means (e.g., a lens 3) for focussing light scattered by the particles in the flow and detecting means (e.g., a detector array 4) for receiving and detecting the focussed light from the focussing means. As particles pass through the beam, their images pass across the array elements. Measurements are made by timing this passage of the images.

Looking at the inventive system, as illustrated in FIG. 1 in greater detail, a light source 2 such as a collimated light source, a laser light source, or the like, directs a single collimated light beam or sheet into a flow of media. In the specific embodiment, a Spectra Physics Model 164 argon-ion laser was employed. At a wavelength of 514.5 nm, it produced a 1 W beam with a Gaussian intensity distribution.

Particles in the flow, either naturally occurring or artificially introduced by suitable means, scatter light as they pass through the beam. Scattered light from a small section of the beam (e.g., the measurement volume discussed in further detail below and shown in FIG. 3) is collected by a lens 3 and focussed onto a light receiving and detecting mechanism having a plurality of elements having a predetermined shape. In the specific embodiment, the receiving lens was an Achromatic Doublet produced by Oriel Corporation having a 50 mm diameter and a 100 mm focal length. This lens was selected based on its low cost, ability to collect a reasonable solid angle of scattered light and ability to form a high-quality image.

As particles pass through the measurement volume, their images are focussed by the lens and pass across a light receiving and detecting mechanism 4. The velocity components are measured by timing this passage by the light receiving and detecting mechanism. The outputs of the light receiving and detecting mechanism are amplified and then analyzed by a processor 5, preferably an A/D converter and computer or alternatively a trigger and logic circuit under the control of a computer. The processor is used to time the passage of the particle images across the light receiving and detecting mechanism and thus determine their velocity. The computer is preferably an IBM AT or the like.

Figure 3:
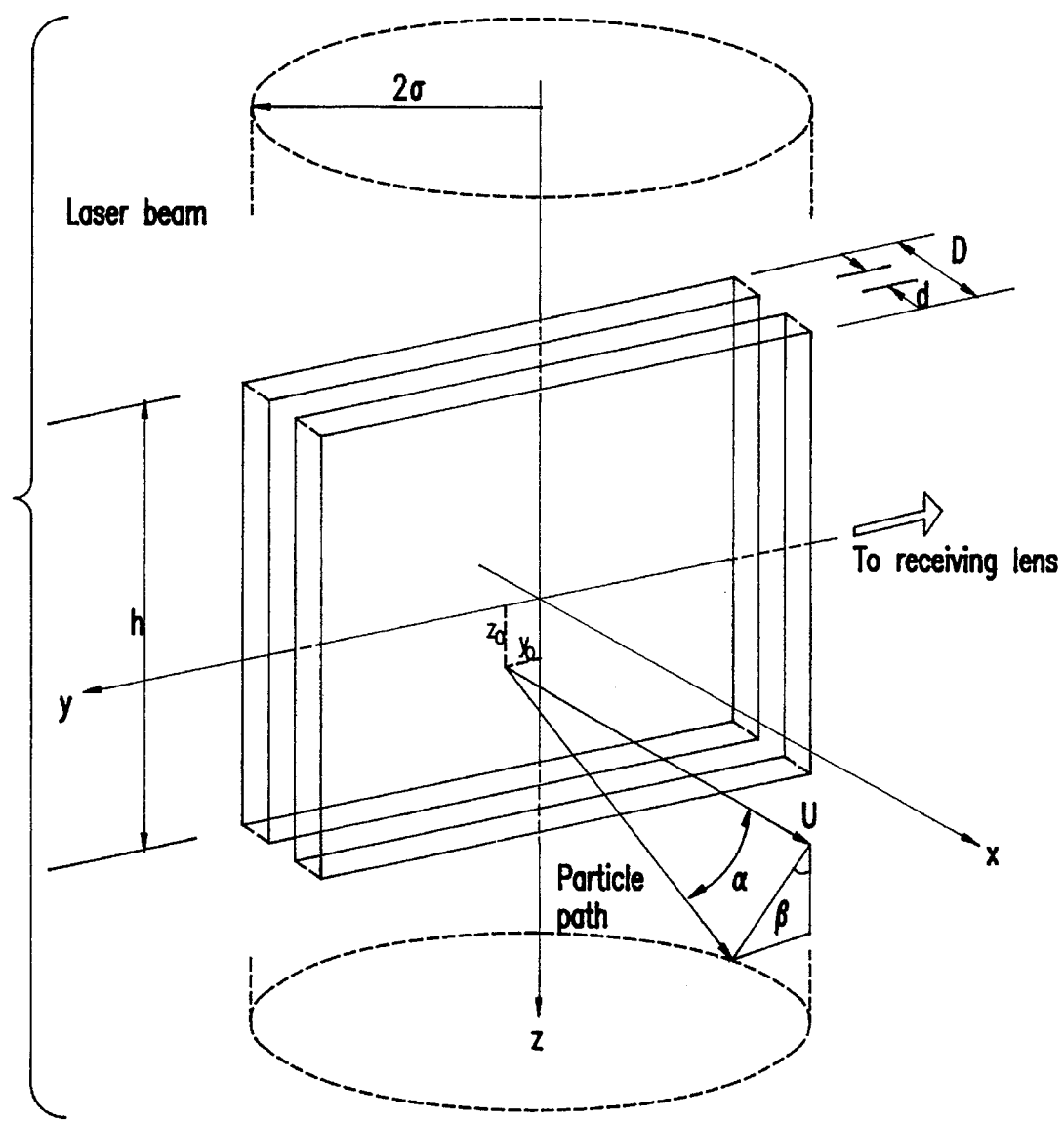
FIG. 3 illustrates a measurement volume of a one-component DAV according to the invention.

The measurement volume being investigated by this optical arrangement is the intersection of the light beam and the projection of the photodiode array elements back through the receiving lens and is shown in FIG. 3. By controlling the number, shape and position of the array elements, the beam size and the receiving lens orientation and magnification, a wide variety of measurement volume geometries may be generated.

Figure 2:
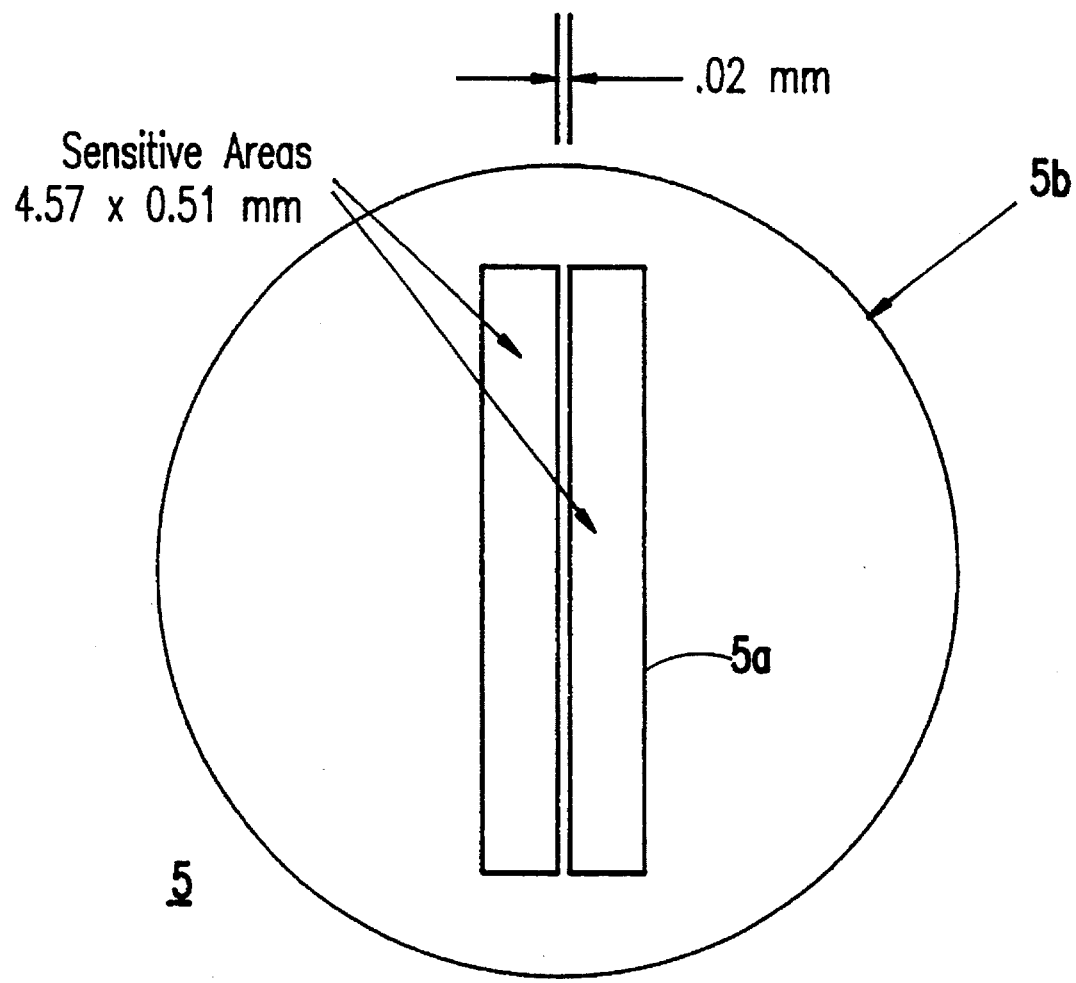
FIG. 2 is a view of one embodiment of a photodiode array for use in the diode array velocimeter shown in FIG. 1.

The light receiving and detecting mechanism 4 is preferably a photodiode array which preferably employs small PIN photodiode arrays to time the motion of images of single seeding particles in a flow, thereby deducing the flow velocity. In the specific embodiment reduced to practice, the detector array employed was a Silicon Detector Corporation SD160, as illustrated in FIG. 2, which includes two rectangular PIN photodiode elements 5a, each 4.57×0.51 mm, placed side by side in a casing 5b and separated by 0.02 mm. As discussed below, this geometry, while fully adequate, is not the best possible configuration for a one-component DAV.

Other designs for the diode arrays and arrangement are discussed in further detail below, after the description of the specific embodiment.

Thus, the DAV uses a unique photodiode array geometry which can be advantageously selected, as described in further detail below. The shapes of the elements as well as their positions are formed to select the form of the measurement volume and thus the measurement made. Silicon photodiode arrays can be made in almost any shape and pattern and are therefore well suited to this application.

In velocity measurements, the DAV has significant advantages over competing techniques such as LDV and L-2-F. Compared to laser Doppler velocimetry, the DAV is simple, requiring only one illuminating beam regardless of the number of components to be measured. Further, the beam need not be coherent or monochromatic. Additionally, the signals produced by the DAV (electrical pulses indicating the passage of a particle image over a photodiode element) are easier to process than frequency-modulated bursts. Optical simplicity as well as increased accuracy and the ability to make velocity measurements regardless of turbulence level and flow reversals are also advantages in comparison to laser-two-focus anemometry.

Along with the lens 3, front surface mirrors (unillustrated) may also be used to position the beam. In the specific embodiment, front surface mirrors commercially available from Edmund Scientific, were used to position the beam. Further, a beam expander and spatial filter 41 are preferably used to vary the diameter of the beam and ensure its Gaussian intensity distribution in the measurement volume. In the specific embodiment, an Oriel model 15261 beam expander and 10 μm spatial filter were employed.

A slit diaphragm 42 is preferably placed adjacent to the receiving lens 4 and aligned with the long axis of the detector, so as to improve depth of focus. In the specific embodiment, a slit having a width of 12.7 mm was employed.

Figure 4:
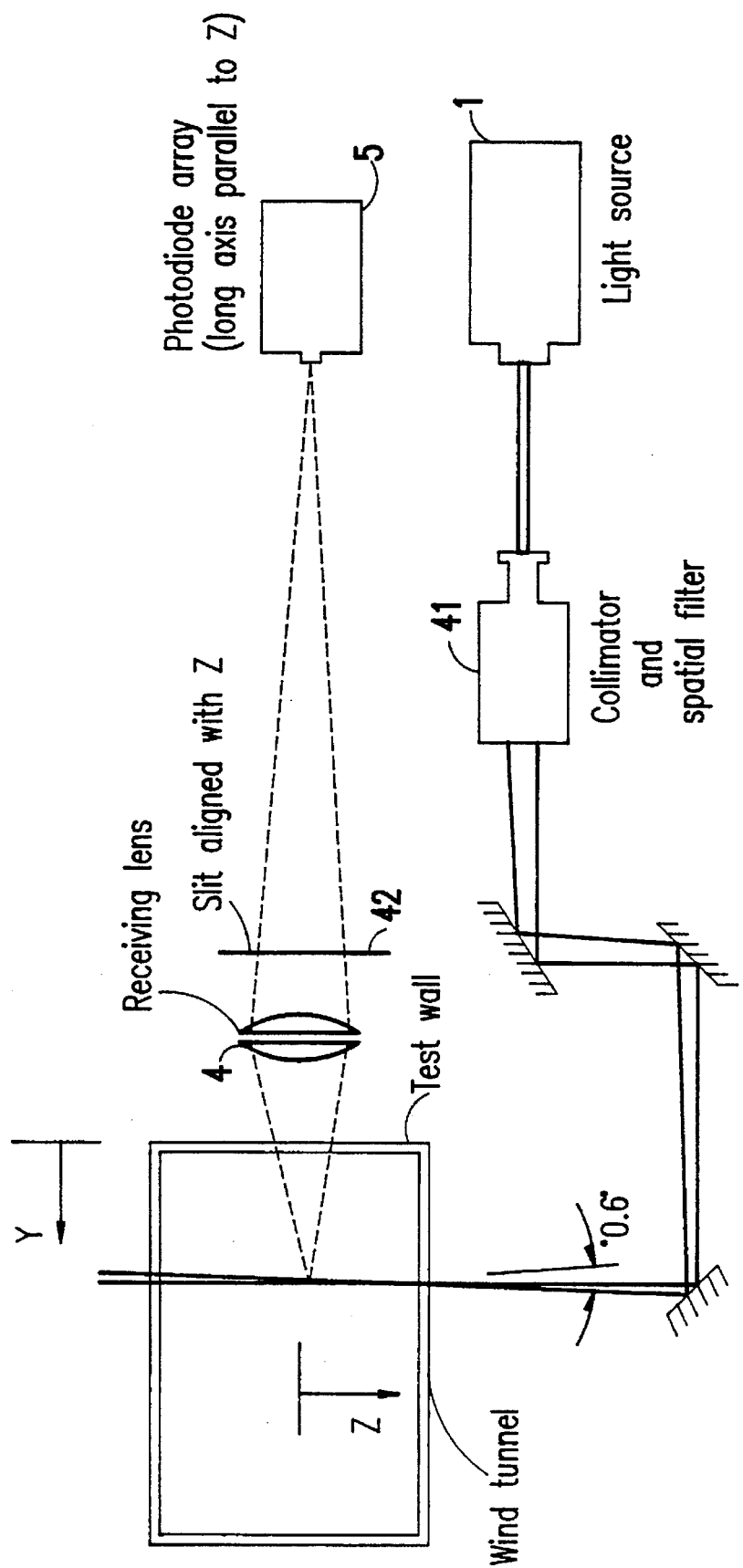
FIG. 4 is a schematic of the optical system and wind-tunnel system utilizing the one-component DAV according to the specific embodiment of the invention.

A schematic of the overall optical system of the specific embodiment is shown in FIG. 4. In the specific embodiment reduced to practice, all optical components are preferably mounted on an aluminum table built into the top of a milling machine base. The table is preferably positioned using a three-axis traverse installed in the base.

With its components fixed, design of the optical system involves only four variables, e.g., (i) the laser beam diameter, (ii) the angle of the receiving lens axis to the laser beam (the receiver angle), (iii) the orientation of the detector array and, (iv) the distance of the receiving lens from the beam (i.e., the optical magnification M of scattering particle images). The beam diameter (e.g., 0.4 mm at the $1/e^2$ points) and optical magnification (e.g., ×10) were chosen for the specific embodiment as a consequence of design constraints described in the following sections, but may be any suitable value. To give the simplest possible measurement volume shape, the receiver angle was fixed at 90 degrees and the detector array was oriented with its face normal to the receiving lens axis and the long edges of its rectangular elements parallel to the laser beam.

The measurement volume, as shown, for example, in FIGS. 1 and 3, is the region within the laser beam where light scattered by seeding particles arrives at one of the photodiode elements. Therefore, the measurement volume includes two thin rectangular regions (e.g., plates) of space side-by-side. In the specific embodiment, its length (h=0.457 mm), overall width (D=0.104 mm) and separation of its two halves (d=0.002 mm) are equal to the corresponding dimensions of the photodiode array divided by the magnification of the receiving lens. Its depth is preferably the diameter of the laser beam. Such a measurement volume is suitable for measurement of the velocity component u. The magnitude of this component is determined by measuring the time taken for particles to pass between the centers of the plates, i..e., for particle images to pass between the centers of the elements of the detector array. The sign of this component is determined from the order in which the particles cross the plates, i..e, the order in which their images cross the elements of the detector array.

To obtain signals from the photodiode array, a constant voltage, such as 15 V, is applied across the PIN photodiodes which convert light power to a proportional current. The sensitivity of the elements of the SD160 photodiode is about 0.2 A/W at a wavelength of, for example, 514.5 nm. Given the results of MIE scattering calculations and the available laser power, currents typically of tens of nanoAmps would be generated by the passage of a single particle image across an element of the detector. An amplifier circuit with a net current-to-voltage gain of about $10^7$ ohms is needed to convert these into usable voltage signals.

Figure 5A:
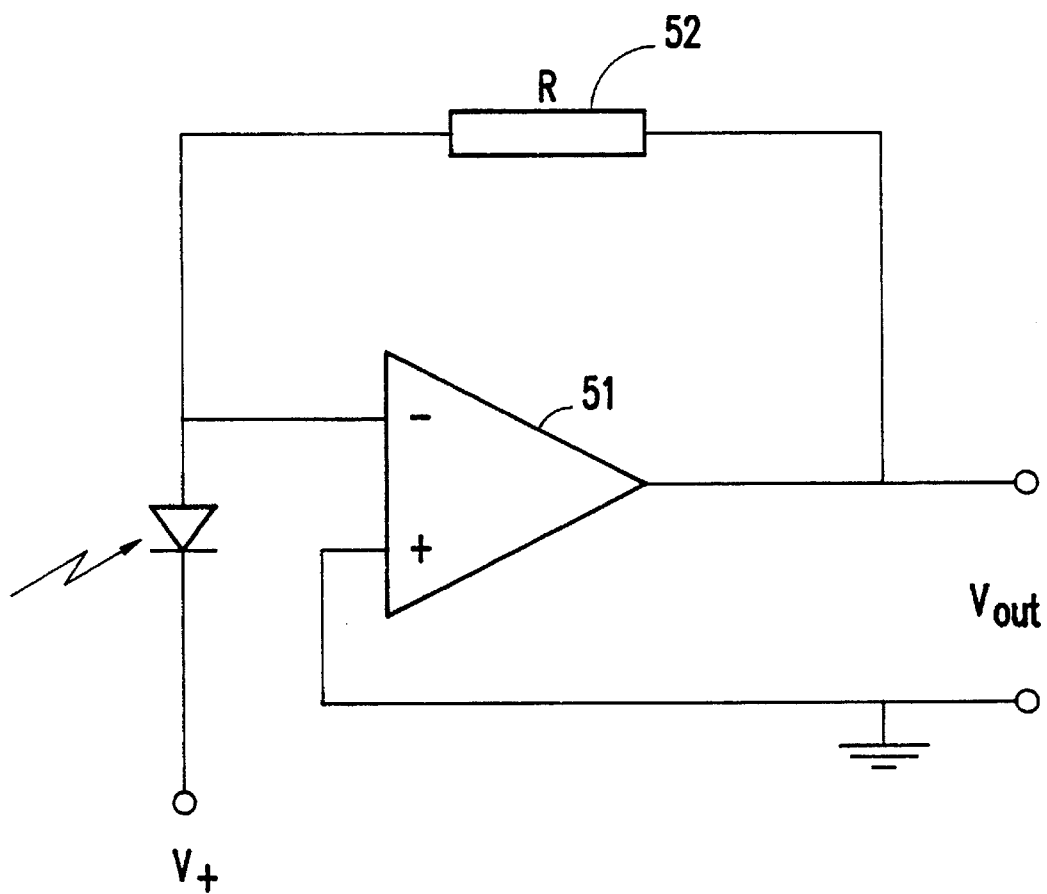
FIG. 5(a) is a schematic of a circuit for amplifying signals produced by a photodiode element of the photodiode array.

In the specific embodiment reduced to practice, two circuits of the type shown in FIG. 5(a) were used to provide this gain separately for the two photodiode elements. In each circuit, the photodiode element is connected between the virtual ground of a high-speed operational amplifier 51 and a reference voltage of 15 V. A precision, low-capacitance 7 Mohms resistor 52, placed in the feedback loop of the operational amp gives a current to voltage gain of $7 \times 10_6$.

Figure 6:
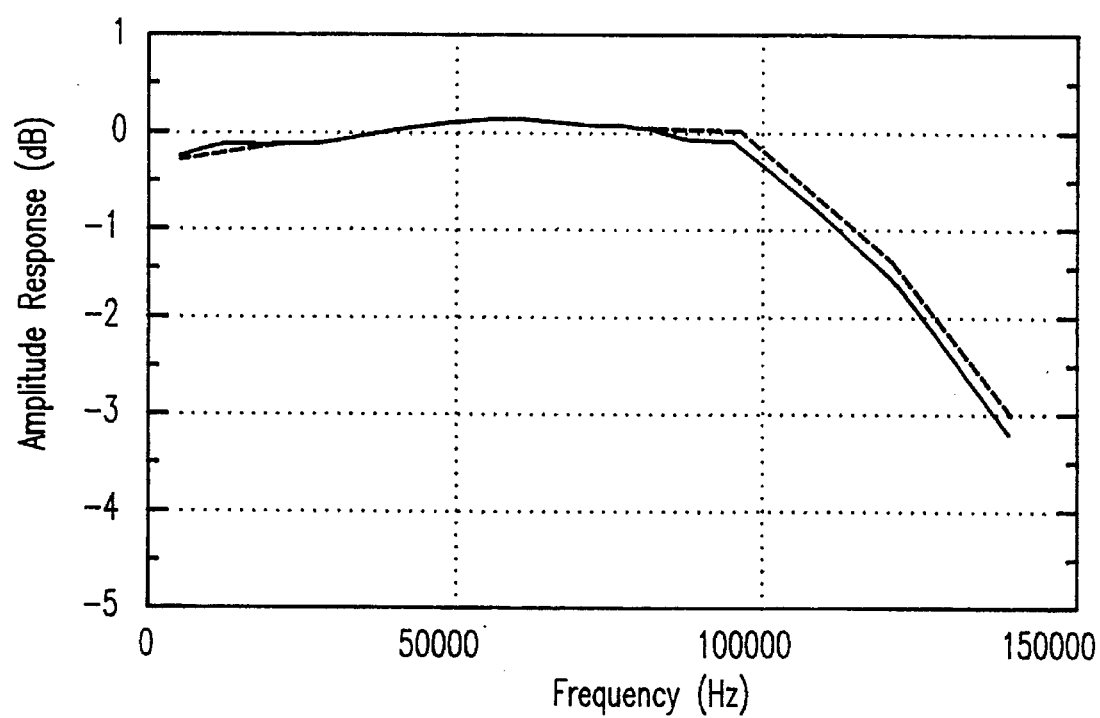
FIG. 6 is a graph illustrating frequency response curves for the photodiode elements and their amplifiers of FIG. 5(a)
Figure 7A:
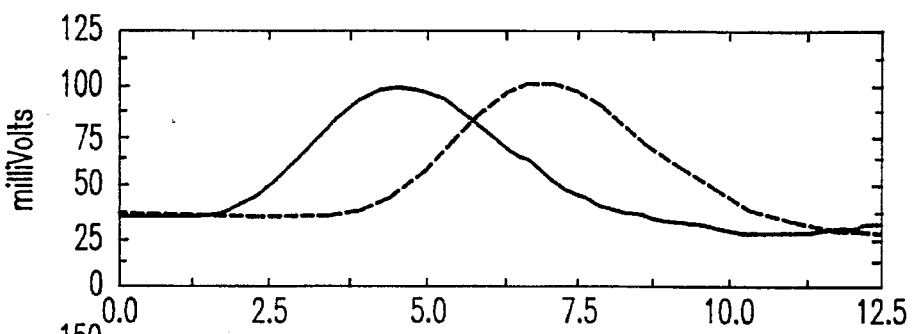
FIG. 7(a)–7(e) illustrate typical DAV output signals.
Figure 7B:
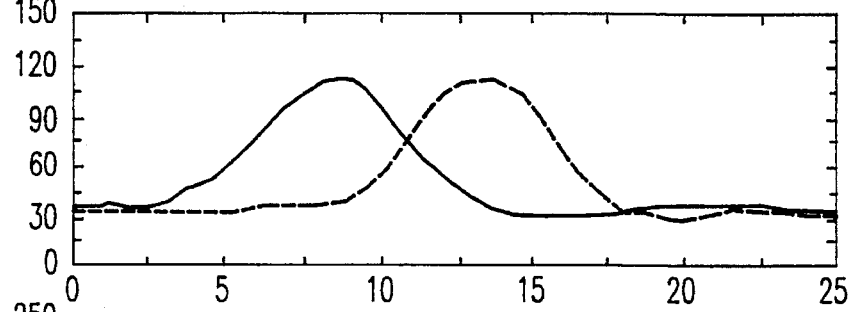
Figure 7C:
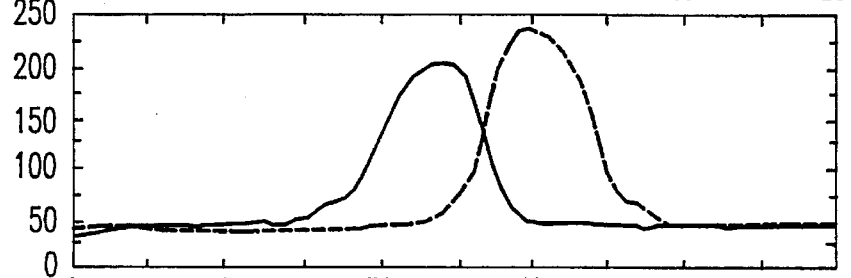
Figure 7D:
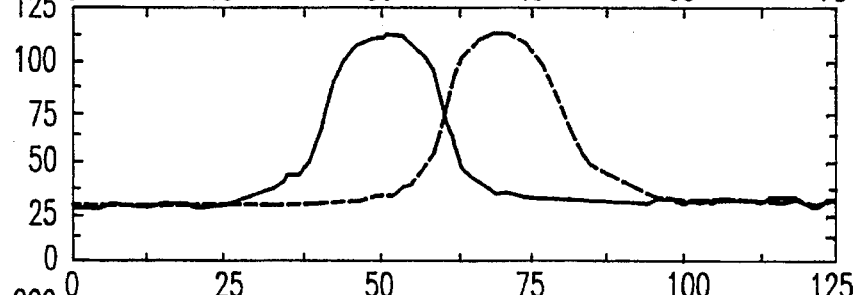
Figure 7E:
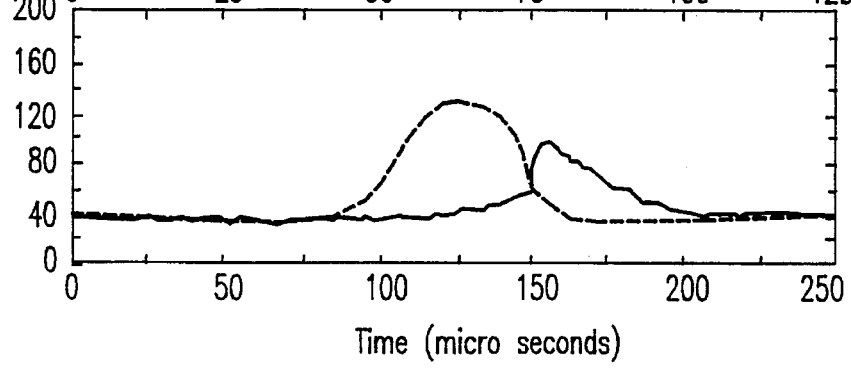

The dynamic characteristics of these circuits was determined by simultaneously exciting both photodiodes with a green light emitting diode of flat frequency response (e.g., a Hewlett Packard HPMP-3507). The results, as plotted in FIG. 6, show the circuits to be closely matched, both having 3dB points at around 140 kHz. The frequency response of this circuit is limited by stray capacitance across the feedback resistor of the first amplifier, which reduces the feedback impedance at higher frequencies. The output noise level was about 1.5 mV $_{rms}$ for both circuits.

FIGS. 7(a)–7(e) shows typical DAV signals output from the amplifiers over a range of flow conditions. The origins of the voltage scales in this figure are arbitrary and these signals are formed as follows. A particle, moving at constant speed through the Gaussian laser beam, produces an image in the receiving lens whose light power varies as a Gaussian with time. As the image crosses the photo-diode array, each element detects a portion of this Gaussian waveform. The detection and amplification of these signals filters them and adds noise. Since the particle may enter the measurement volume at any angle and not pass through the beam center, the photodiode elements may see unsymmetrical portions of the Gaussian intensity distribution (see for example FIGS. 7c and 7e).

To measure the velocity component u, the transit time of particles between the centers of the measurement volume "plates" is extracted from the amplifier output signals. This operation may be performed using any one of a variety of techniques.

The preferred method used herein is to cross correlate the amplified signal originating from one of the detector array elements with that originating from another detector array element and then to measure the time delay of the peak correlation coefficient. This is achieved by reading the signals into a computer, preferably an IBM AT or the like, using an analog-to-digital (A/D) converter, preferably a Rapid Systems R2000. The A/D converter inputs are buffered using two amplifiers, preferably buck-and-gain amplifiers with a gain of 10 or the like. Within the computer, correlations are performed using a computer program, preferably with the aid of an 18–8 Laboratories PL2500 Array Processor or the like.

Figure 5B:
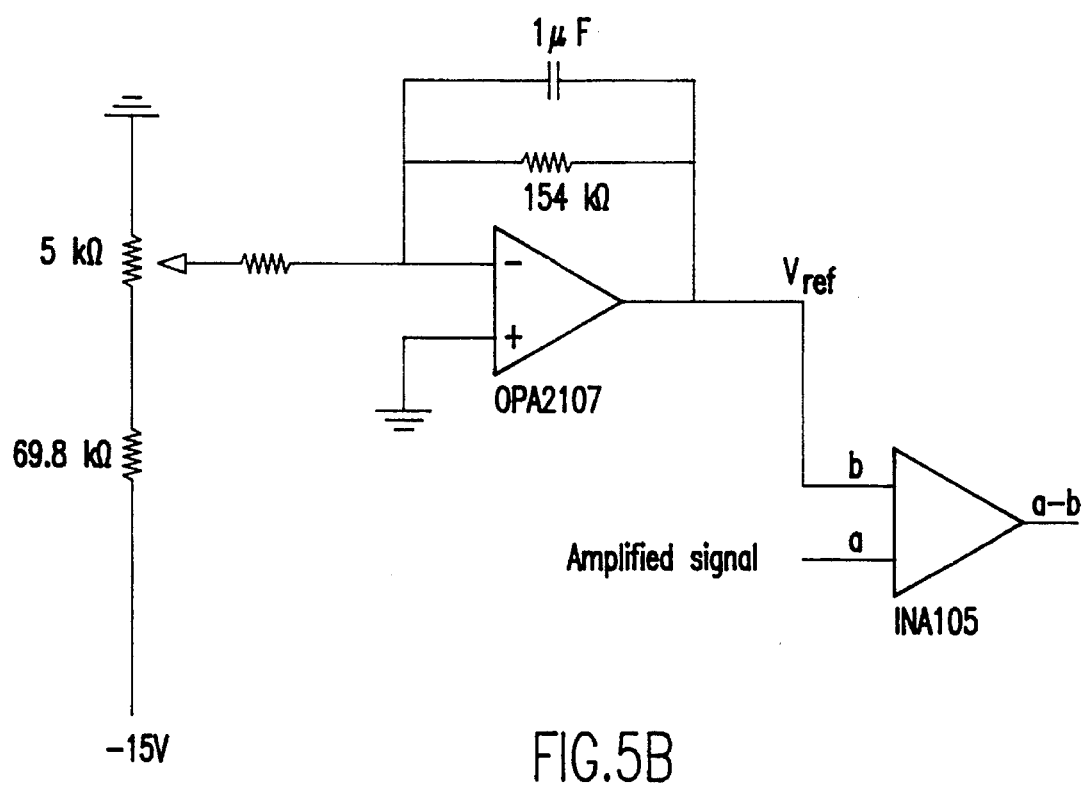
FIG. 5(b) illustrates a preconditioning circuit for triggers for the present invention.
Figure 5C:
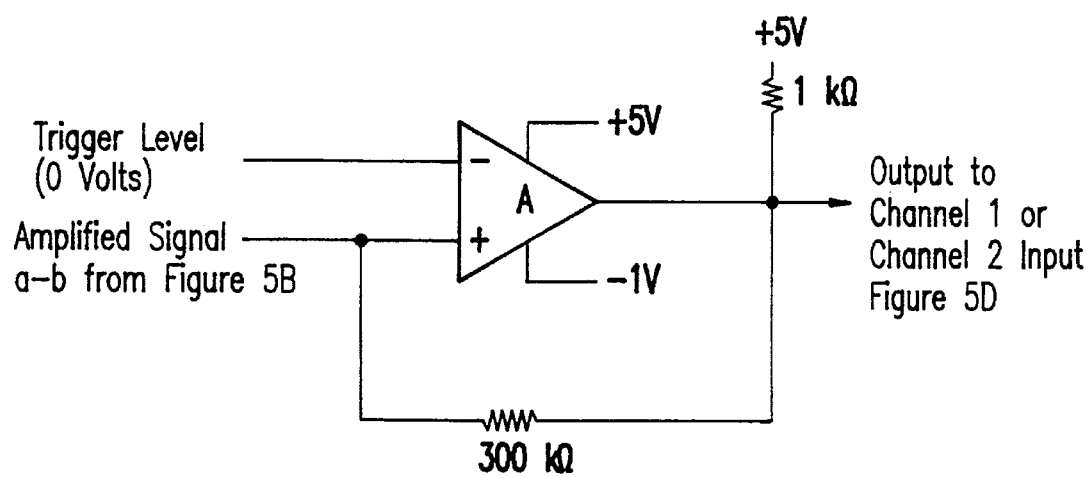
FIG. 5(c) illustrates a non-inverting Schmidt trigger circuit.
Figure 5D:
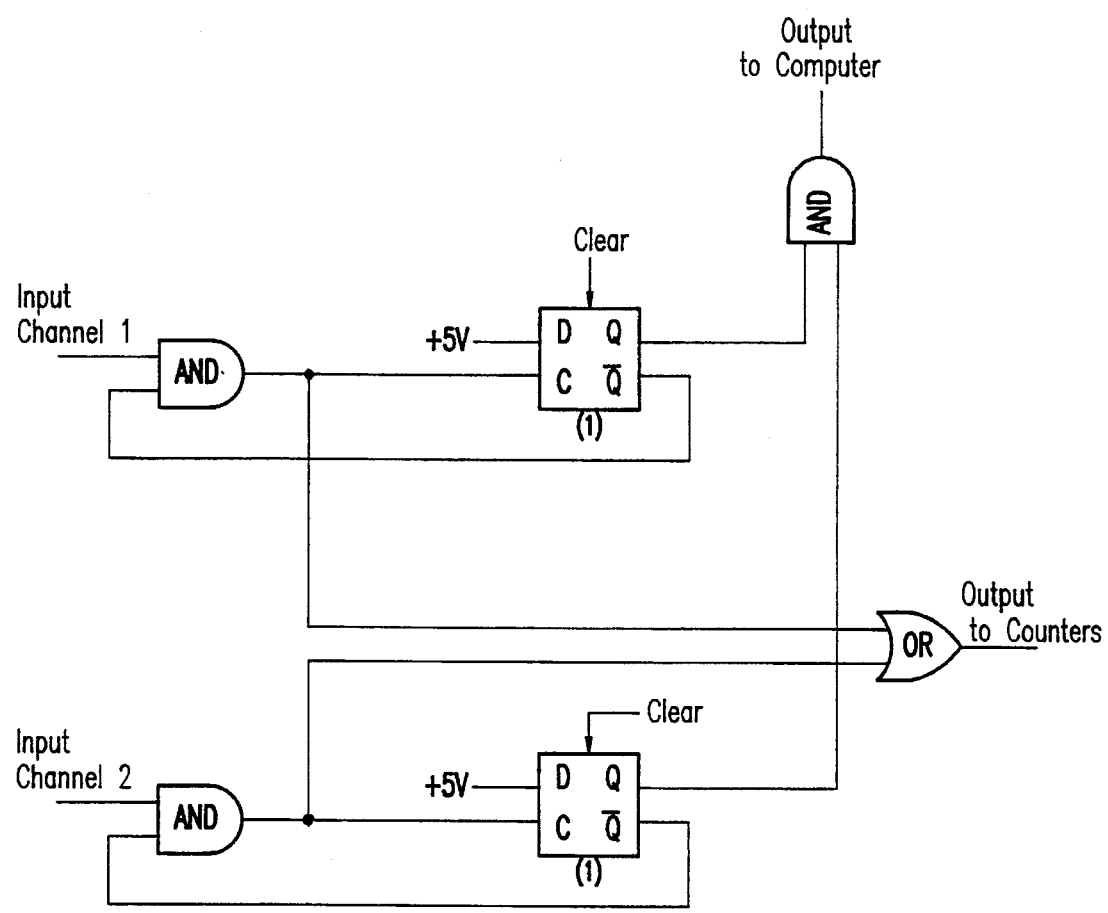
FIG. 5(d) illustrates a digital timing circuit.
Figure 5E:
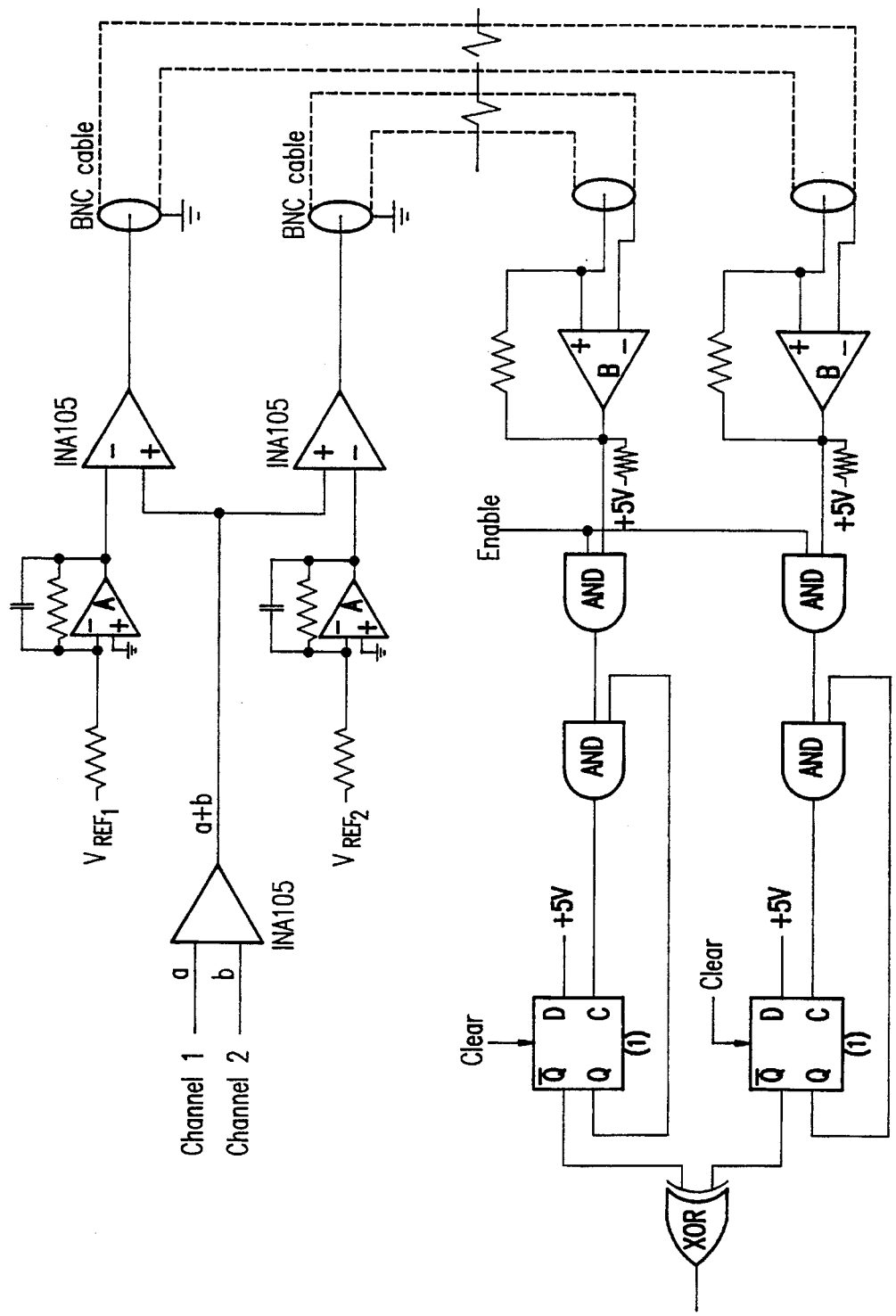
FIG. 5(e) illustrates a validation circuit.

An alternative timing method, also reduced to practice, is to monitor the amplified output signals of the photodiode elements using the trigger and logic circuits shown in FIGS. 5b to 5e under the control, preferably, of an IBM XT computer or the like. The amplified output signals are output separately to two identical trigger circuits where they are compared with a fixed reference voltage level. This is set so that the trigger fires as soon as a particle image arrives at the photodiode element. The trigger outputs are used to start and stop a clock counter so that, following the passage of a particle image, the clock counter contains the transit time of the image which it communicates to the computer as a binary number through a digital interface board. In addition to this circuit, a 'validation' circuit is preferably added, as shown in FIG. 5e, which warns of measurements made on particularly weak or strong signals both of which may indicate undesirable events such as the passage of a particle far from the laser beam center or the passage of a large dust particle through the measurement volume. The validation circuit sums the amplified signals arriving from the two photodiode elements and then compares them with two fixed voltage levels, a 'low valid level' and a 'high valid level'. If the peak voltage of the summed signal, occurring during the transit of the particle image, lies between the low and high valid levels, the validation circuitry communicates a bit to the computer indicating a valid measurement.

One of the two identical trigger circuits is shown in two parts in FIGS. 5b and 5c. In FIG. 5b, the signal, having been further amplified by a factor of 10 using a Burr Brown INA106 instrumentation amplifier (not shown), is connected to a Burr Brown INA105 differential amplifier. The differential amplifier subtracts the fixed reference voltage from the amplified signal. The reference voltage is set using a 5 kOhm potentiometer buffered through a Burr Brown OPA2107 operational amplifier. The output of the differential amplifier is then sent the Schmidt trigger circuit shown in FIG. 5d. The outputs of the two identical trigger circuits are sent to the logic timing circuit shown in FIG. 5d. Here the outputs are used to start and stop the digital clock counter through the 'OR' gate output. The counter (not shown) consists of a 10 MHz clock and 4 cascaded 4-bit binary counters. The resulting 16-bit value, indicating the transit time of a particle image, is fed to the IBM XT computer through a Data Translation DT2817 digital interface board. The timing circuit generates two bits of additional information input to the computer. The first, generated from the AND gate labeled 'to computer' in FIG. 5d indicates to the computer that a measurement has been made, i.e. that both triggers have been fired. The second, generated from the outputs of the two other AND gates directed to a 'set-reset' flip-flop made from two NOR gates (not shown), indicates to the computer the order in which the triggers were fired, and thus the flow direction.

The amplified photodiode signals input to the two trigger circuits in FIG. 5b are also connected to the validation circuit shown in FIG. 5e. Here, they are summed using a Burr Brown instrumentation amplifier INA105 and then compared with the low and high valid voltage levels, $V_{ref1}$ and $V_{ref2}$. Using techniques similar to those employed in the trigger and timing circuits, they are then used to generate an output at the XOR gate to the bottom left of FIG. 5e. This one bit of information, read by the computer through the digital interface board is used to indicate whether a valid or invalid measurement has been made. Note that after a measurement has been made and read the computer resets the timing and validation circuits by sending setting the inputs marked 'clear' in the timing and validation circuits (FIGS. 5d and 5e) using the output capability of the DT2817 digital interface board.

Compared to the cross correlation timing method, the trigger timing method has the advantage that it is performed primarily using a relatively simple stand alone electronic circuit. The computer here is only used to read the circuit output and reset it. In a DAV where multiple photodiode detector arrays are used, such a circuit would be built for each army and dedicated to timing the transit of particle images across that array. The photodiode arrays would thus operate in parallel enabling simultaneous or near simultaneous measurements to be made separately with the arrays. The disadvantage of the trigger timing method, compared to the cross correlation method, is a greater sensitivity to electrical noise in the amplified signal since the particle image is timed using only a small part of the signal (i.e., that part where it crosses the preset voltage level). As mentioned above, the preferred method in this particular reduction to practice is cross-correlation timing.

Theoretical analyses were performed based on the structure of the above-described DAV of the specific embodiment. First, the influence of noise in determining velocity was investigated. The relationship between the transit time t determined from the DAV signals and the velocity u inferred from it is ideally $$u = A/t \qquad (1)$$

where A is the distance between the centers of the measurement volume plates (D+d)/2, see, for example, FIG. 3). This measured transit time has a contribution from the actual transit time and electrical noise $t'_u$. Over a sequence of many samples, the actual transit time may be considered as being made up of a mean T and a fluctuation $t'_t$ associated with unsteadiness in the flow. Therefore, $$u = \frac{A}{T + t'_t + t'_n} \qquad (2)$$

As indicated $t'_n$ would not be expected to have a mean value. It is simple to show that, to a first order approximation assuming $t'_n \ll T$ and $t'_t \ll T$, equation 2 leads to the expressions $$U \cong \frac{A}{T} \tag{3}$$

$$\frac{\overline{u'^2}}{U^2} = \frac{\overline{t'^2_t} + \overline{t'^2_n}}{T^2} = (\overline{t'^2_t} + \overline{t'^2_n}) \frac{U^2}{A^2} \tag{4}$$

where U and u' represent the measured mean velocity and velocity fluctuation respectively. So, assuming constant $\overline{t'^2_n}$ the influence of electrical noise on normalized turbulence stress measurements increases as the square of the mean velocity. Obviously, minimizing electrical noise is important if accurate turbulence measurements are desired.

The r.m.s. of $t'_n$ rises if the electrical signal to noise ratio S (peak signal voltage divided by r.m.s. voltage noise level) were decreased. It also rises if the amplifier cutoff frequency $\omega_c$ were reduced since this leads to greater filtering of the signals, blurring their definition in time. Whether the cross-correlation or trigger timing scheme is used, it follows that $$\frac{\sqrt{\overline{t'^2_n}}}{T} \sim \frac{1}{S\omega_c T} \tag{5}$$

Since the voltage noise in the DAV outputs is independent of signal, S depends only on the peak signal magnitude. This, in turn, will vary linearly with the total light power received in a particle image, which is proportional to the intensity of the laser beam multiplied by the solid angle over which the receiving lens collects light. Using $f_l$ and $l$ to denote the distance from the measurement volume to the receiving lens and the diameter of that lens, respectively, it follows that $$S \sim \frac{P}{\sigma^2} \cdot \frac{l^2}{f_l^2} = \frac{P}{\sigma^2 f_{no.}^2} \left(\frac{M}{M+1}\right)^2 \tag{6}$$

where P is the total laser beam power, σ is its r.m.s. width, $f_{no.}$ is the f-number of the receiving lens (focal length over diameter) and M is the image magnification it produces. To proceed further, it is recognized that there is a linkage between the beam width and the optical magnification of the receiving lens. If the measurement volume geometry is to remain constant then $$\sigma \sim \frac{1}{M} \tag{7}$$

and so, $$S \sim \frac{P}{f_{no.}^2} \times \frac{M^4}{(M+1)^2} \tag{8}$$

Substituting this back into equation 5 gives $$\frac{\sqrt{\overline{t'^2_n}}}{T} \sim \frac{f_{no.}^2 (1+M)^2}{PM^4} \times \frac{1}{\omega_c T} \tag{9}$$

For a given flow velocity, the average transit time T is inversely proportional to M, since optical magnification amplifies the speed of the particle image as well as its size and so, finally, $$\frac{\sqrt{\overline{t'^2_n}}}{T} \sim \left(\frac{f_{no.}^2}{P\omega_c}\right)\left(\frac{(M+1)^2}{M^3}\right) \tag{10}$$

The first term on the right hand side of equation 10 is fixed by the choice of optical and electrical components. To minimize the influence of noise on transit time measurements, the receiving lens magnification is preferably maximized and the laser beam diameter correspondingly reduced.

Such modifications have the added benefits of minimizing the measurement volume size and maximizing signal to noise ratio (making the presence of a signal much easier to detect).

For example, in the specific embodiment discussed above, M is set at 10, this being the maximum that can be achieved within the available length of the optical table employed. In fixing the aperture, and therefore the f-number of the receiving lens, the depth of focus was found to be an important consideration. If particle images are out of focus, this increases their radius, smoothing the rising and falling edges of the output signals. The net effect is similar to that of a decrease in $\omega_c$. Focussing of particle images in the direction normal to the long axis of the photodiode array was improved by using the 12.7 mm wide slit shown in FIG. 4.

Secondly, theoretical analyses were performed to examine the linearity and angle response of this particular DAV design. This was studied by simulating signals produced by the DAV over a range of conditions. Considering the measurement volume shown in FIG. 3 and taking the laser beam as Gaussian, its normalized intensity distribution I may be written as $$I(x,y) = \exp\left(-\frac{x^2+y^2}{2\sigma^2}\right) \tag{11}$$

where σ is the r.m.s. beam width (one quarter of its $1/e^2$ diameter) and the coordinate system (x,y,z) is centered in the measurement volume with the z axis parallel to the beam (see FIG. 3).

With a particle with a velocity (u,v,w) moving along a trajectory that crosses the measurement volume center plane at the location $(0,y_0,z_0)$, the particle will experience a light intensity equal to $$\exp\left(-\frac{x^2+(y+y_0)^2}{2\sigma^2}\right) \tag{12}$$

which may be rewritten in terms of time t $$\exp\left(-\frac{(ut)^2+(vt+y_0)^2}{2\sigma^2}\right) \tag{13}$$

Assuming that the intensity of light scattered by the particle is proportional to that incident upon the particle and that the diameter of the particle and its image are negligible, equation 13 is preferably used to represent the normalized light intensity received or current signals produced by the photodiode elements. All that is needed are to state the limits of the signal for each element. These are, for element 1: $-D/2 < ut < -d/2$, $-h/2 < wt+z_0 < h/2$ for element 2: $d/2 < ut < D/2$, $-h/2 < wt+z_0 < h/2$ where d, D and h are the dimensions of the measurement volume defined in FIG. 3. Introducing q to denote the magnitude of the velocity vector $\sqrt{u^2+v^2+w^2}$, angles α and β to denote its direction (see FIG. 3) and the non-dimensional variable $t^* = qt/\sigma$, these current signals may be re-written as $$i(t^*) = \exp\left(-\frac{1}{2}(t^*\cos\alpha)^2 - \frac{1}{2}\left(t^*\sin\alpha\sin\beta + \frac{y_0}{\sigma}\right)^2\right) \tag{14}$$

for element 1:

$-D/2\sigma < t^*\cos\alpha < -d/2\sigma$ $-h/2\sigma < t^*\sin\alpha\cos\beta + z_0/\sigma < h/2\sigma$ for element 2:

$d/2\sigma < t^*\cos\alpha < D/2\sigma$ $-h/2\sigma < t^*\sin\alpha\cos\beta + z_0/\sigma < h/2\sigma$ The current to voltage converters amplify and alter these signals. We may write the amplifier output as $$v(t)=i(t)*h(t\omega_c) \qquad (15)$$

where $h(\omega_c t)$ is the amplifier impulse response, $\omega_c$ is the angular cutoff frequency of that response and the asterisk denotes convolution. Non-dimensionalizing gives $$v(t^*)=i(t^*)*h(\omega_c^* t^*) \qquad (16)$$

where $\omega_c^*=\omega_c\sigma/q$

A computer program was written to simulate signals from this DAV for a range of conditions using the above expressions. The impulse response required in equation 16 was taken as that of a single pole low-pass filter. The signals, generated as records 256 points long, was then used to test the cross-correlation timing scheme. Specifically, for each condition, the signal for the first element were cross correlated with that of the second element and the time delay at which the correlation coefficient reached its peak was taken as the transit time. A 7-point least-squares parabola was used to interpolate the position of this peak. Velocity inferred from this transit time was then compared to the velocity input to the calculation for a range of conditions.

Figure 8:
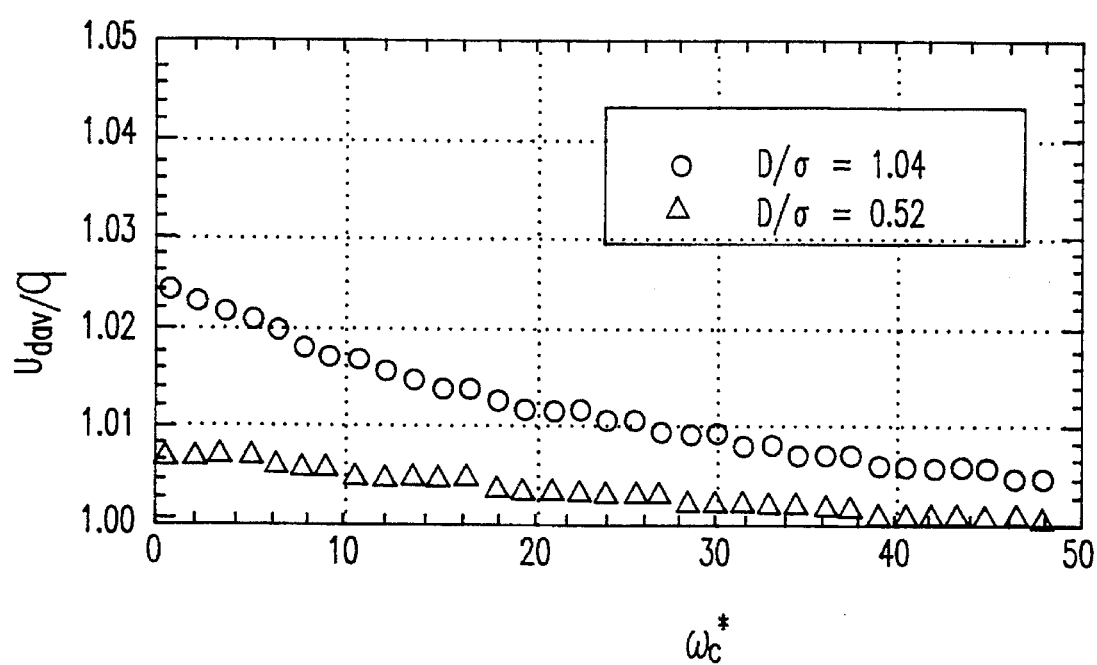
FIG. 8 is a graph illustrating velocity inferred from simulated DAV signals over actual velocity.

Calculations are presented below for the present DAV for which $D/\sigma=1.04$, $h/D=4.39$ and $d/D=0.02$. FIG. 8 illustrates the response to a uniform flow at zero yaw and pitch ($\alpha=0,\beta=0$) and shows the velocity inferred from simulated DAV signals over actual velocity as a function of $\omega_c$. For this special case, the response is not a function of $Y_0$ and $z_0$. Computed over actual velocity, $(u_{dav}/q)$ is plotted as a function of the parameter $\omega_c$ which varies inversely with the absolute flow speed.

For the present DAV, $\sigma=0.1$ mm and $\omega_c^*=2\pi\times140,000$ which results, for example, in $\omega_c^*=0.5$ at $176/s$ and $50$ at $1.76$ m/s. FIG. 8 shows the DAV output to be closely linear, $u_{dav}/q$ varying only slightly with $\omega_c^*$ from $1.024$ at $\omega_c^*=0.5$ to $1.006$ at $\omega_c^*=50$. This ratio being larger than unity implies that the cross-correlation scheme slightly underestimates the actual transit time. For most applications, the variation in the ratio would be insignificant, so this effect can be accounted for by adjusting measured velocities by a small constant factor.

Figure 9:
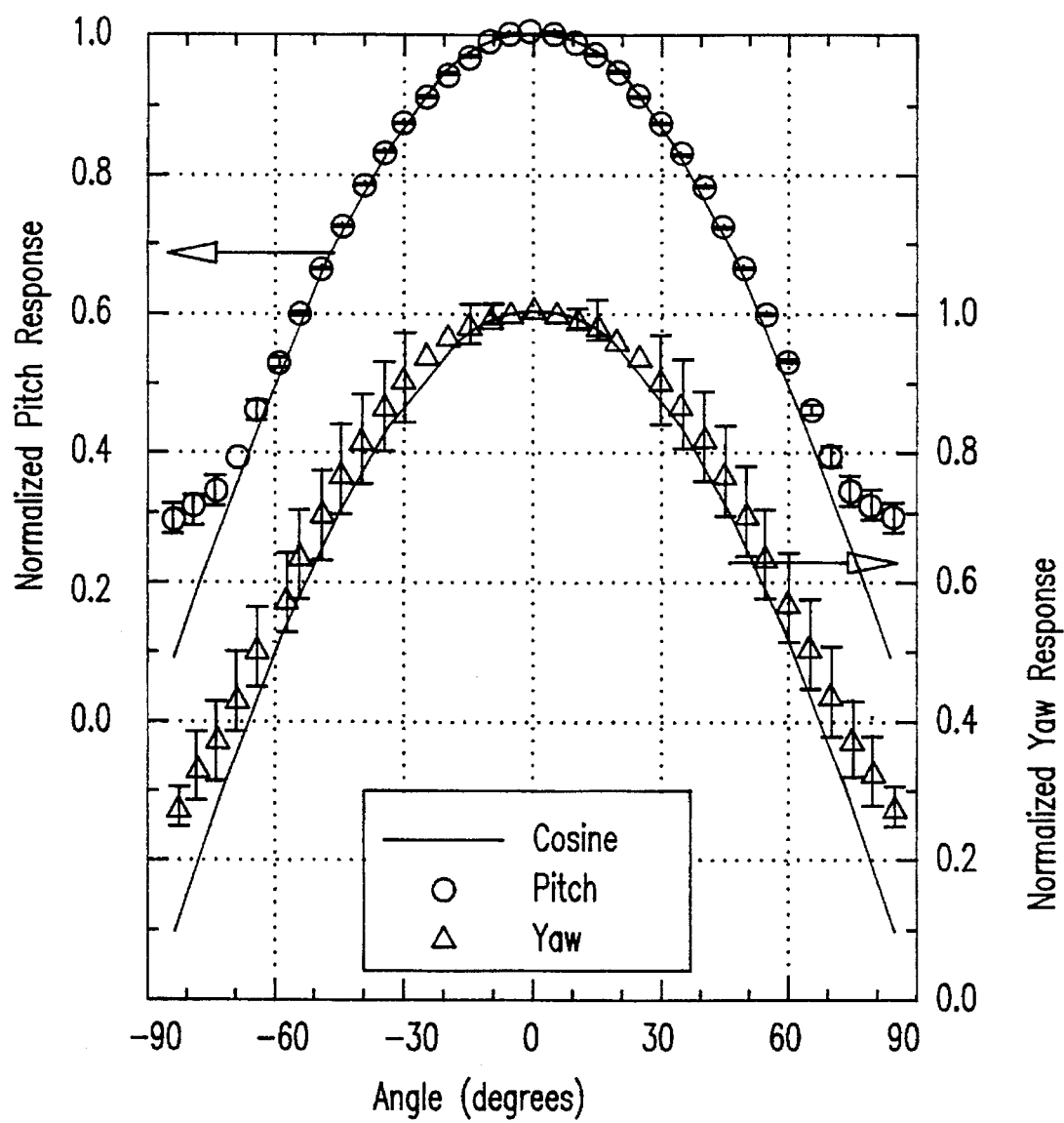
FIG. 9 is a graph illustrating DAV angle response normalized on velocity at zero pitch and yaw.
Figure 10A:
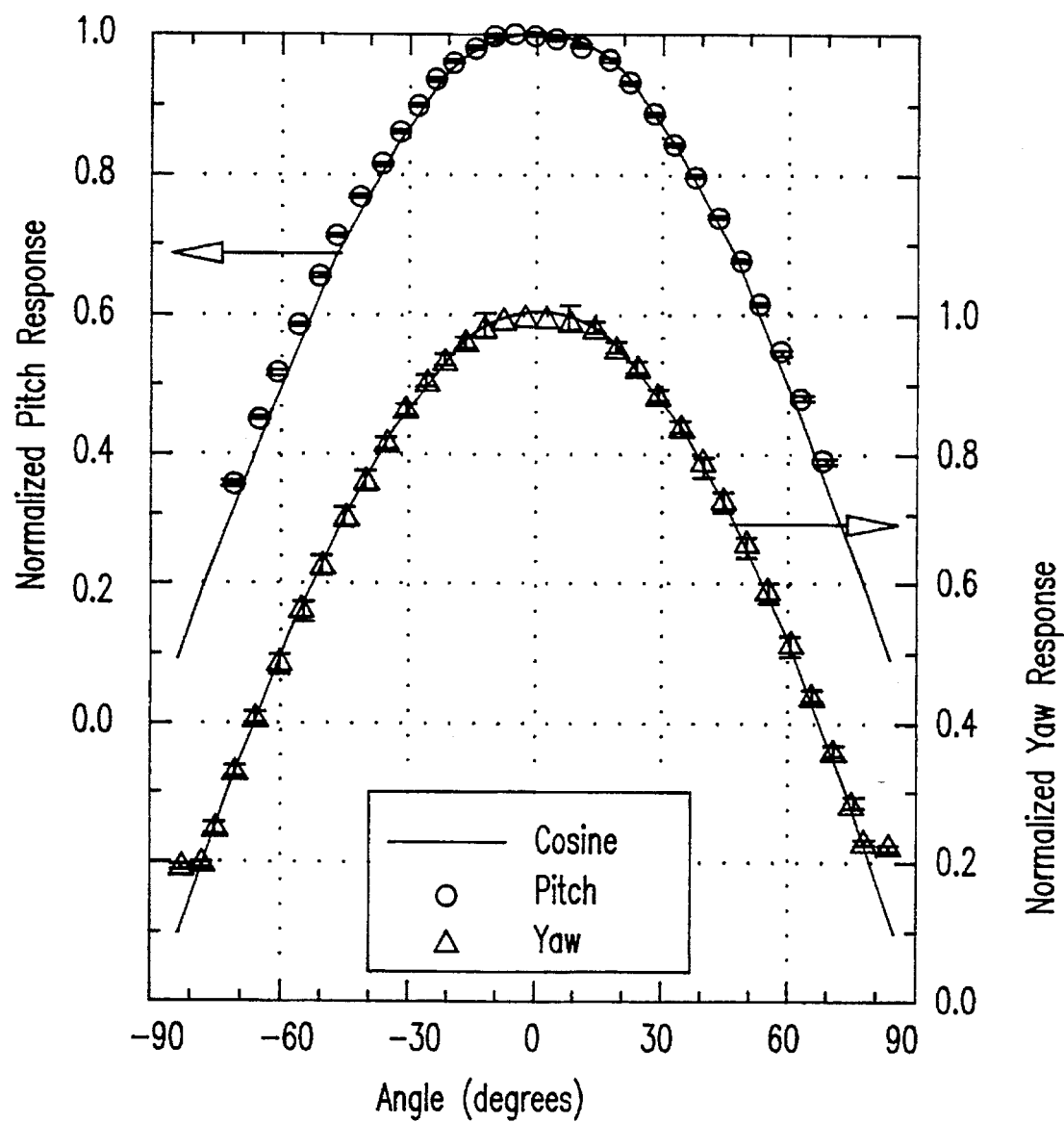
FIG. 10(a) is a graph illustrating DAV angle response normalized on velocity at zero pitch and yaw for a minimum peak correlation coefficient of 0.95 Wc=2.83.
Figure 10B:
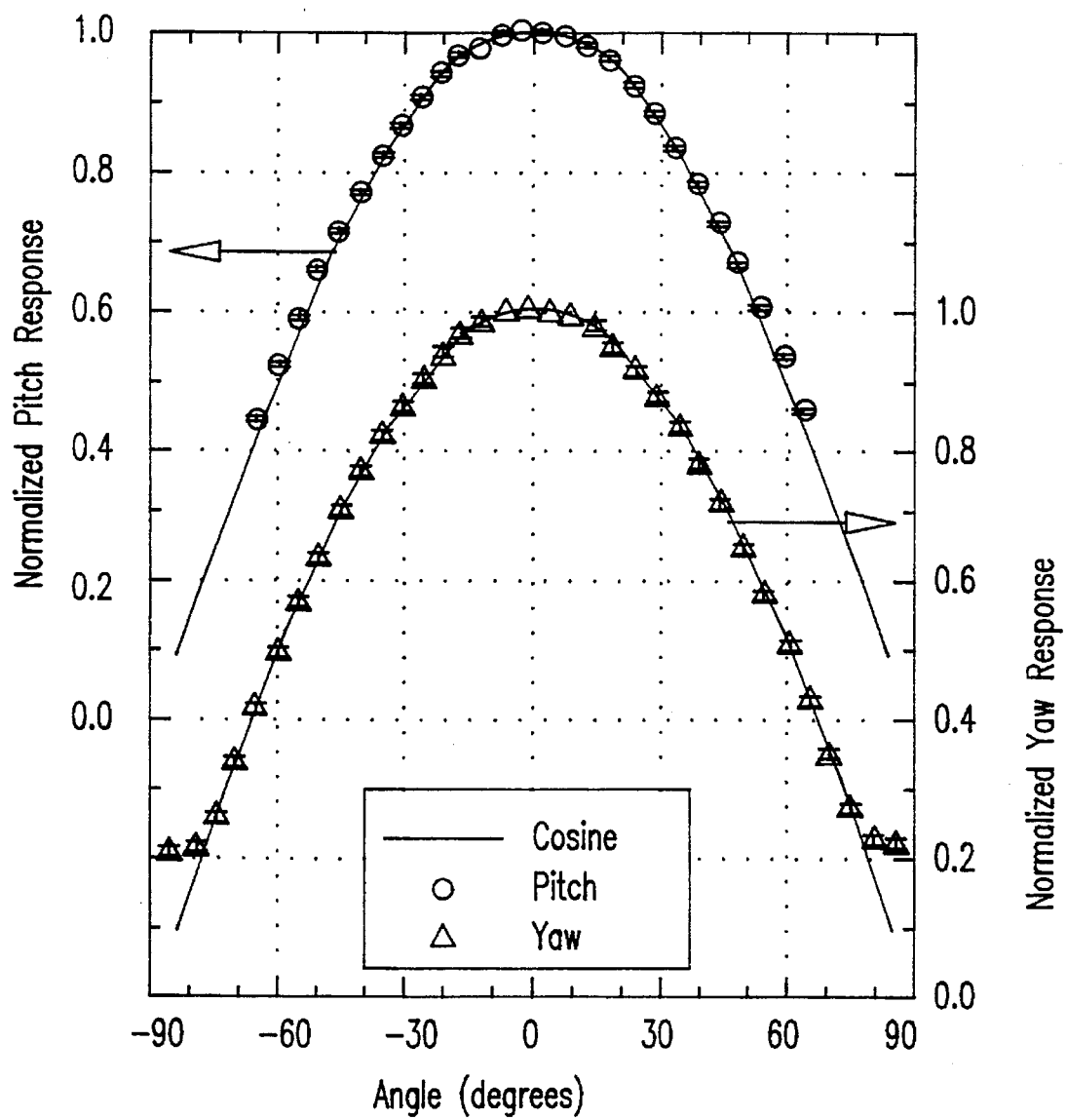
FIG. 10(b) is another graph illustrating DAV angle response normalized on velocity at zero pitch and yaw for a minimum peak correlation coefficient of 0.95 and for $\omega_c^* = 5.65$.
Figure 10C:
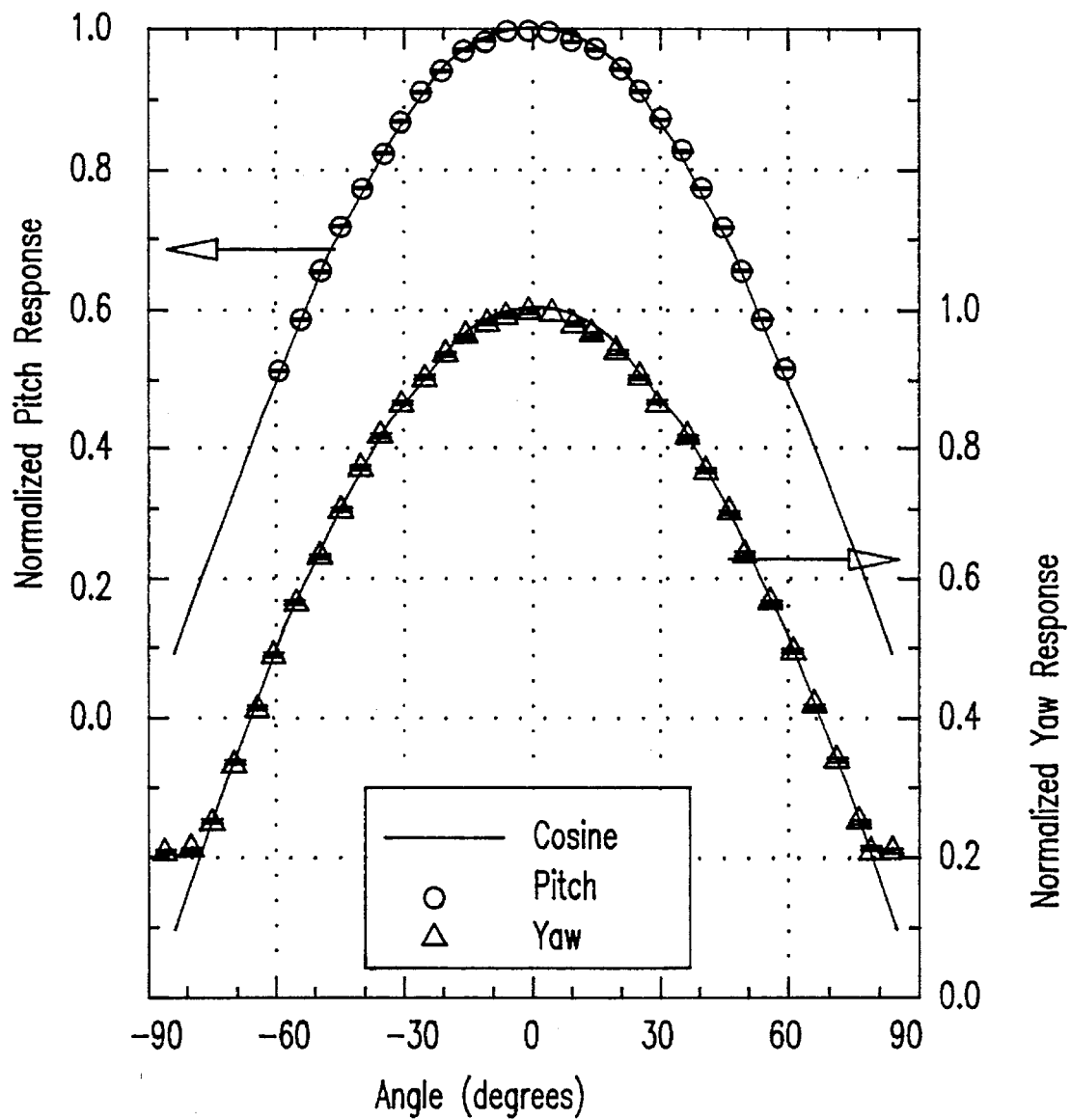
FIG. 10(c) is a third graph illustrating DAV angle response normalized on velocity at zero pitch and yaw for a minimum peak correlation coefficient of 0.95 and for $\omega_c^* = 11.3$.
Figure 10D:
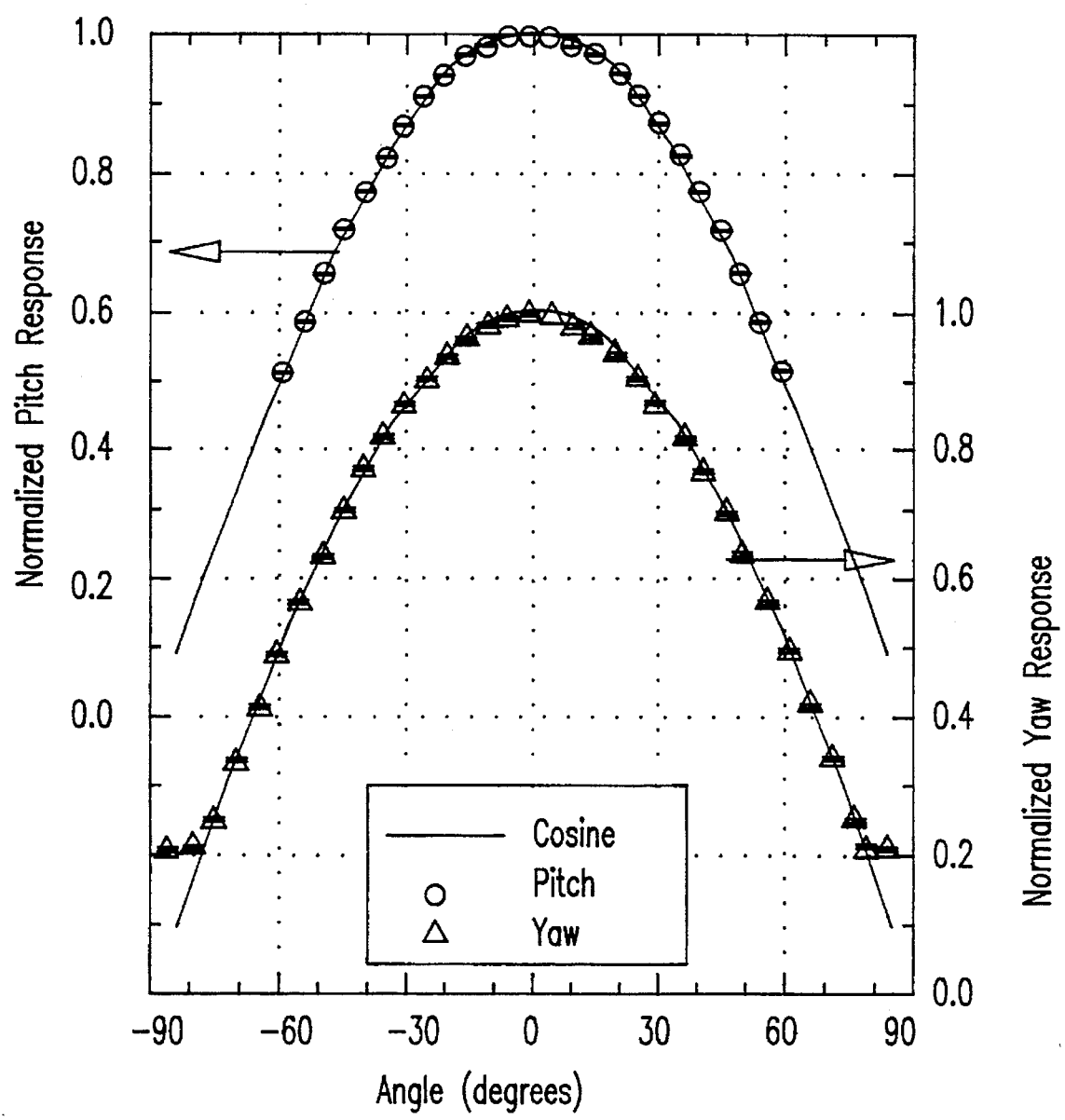
FIG. 10(d) is a fourth graph illustrating DAV angle response normalized on velocity at zero pitch and yaw for a minimum peak correlation coefficient of 0.95 and for $\omega_c^* = 22.6$.

FIG. 9 shows the response of the DAV in pure pitch ($\beta=90°$) for $\omega_c^*=5.65$ (15.6 m/s) and illustrates the DAV angle response normalized on velocity at zero pitch and yaw. As can be seen from equation 14, the pitch characteristic will generally be a function of $Y_0$. Rather than presenting curves for many different $Y_0$ values, the mean response (indicated by the points in FIG. 9) and its r.m.s. variation over the measurement volume (shown by the error bars) are shown for convenience. For these averages, the y-limits of the measurement volume were taken to be $\pm 2\sigma$ (i.e. the $1/e^2$ points). Ideally, the mean variation is preferably a cosine. Between about $\pm 65°$ it is cosinusoidal, and r.m.s. variations are small. However, at flow angles greater than $70°$, the mean curve departs significantly from a cosine and r.m.s. variations increase.

FIG. 9 also shows the response in pure yaw ($\beta=0°$) for $\omega_c^*=5.65$. In this case, the response is a function of $z_0$ so spatially averaged mean and r.m.s. values are again presented. Clearly, the yaw response is unacceptable, the r.m.s. variations being far too large. The poor performance is a result of the fact that at large yaw angles or large $z_0$, particle images start to cross the ends of the photodiode elements rather than their long edges. One way to improve the response, without changing the photodiode array geometry, is to ignore the signals produced by these images. This can be done to a certain extent using the magnitude of the peak cross correlation coefficient. While this is close to unity for particles images that cross only the long edges of the diode elements, it is much smaller for most of those crossing the ends. Of course, setting a minimum acceptable peak correlation coefficient also influences the pitch characteristic.

FIGS. 10a through 10d show DAV angle response normalized on velocity at zero pitch and yaw and show the pitch and yaw characteristics for a minimum peak correlation coefficient of 0.95. Curves for $\omega_c^*=2.83$, 5.65, 11.3 and 22.6, corresponding to 31, 15.6, 7.8 and 3.9 m/s respectively, are presented. The yaw response is greatly improved by this measure, the mean being cosinusoidal up to $\pm 75°$ and the r.m.s. remaining acceptably small, regardless of $\omega_c^*$. For angles less than about 65°, the pitch response appears unaltered and largely independent of $\omega_c^*$. For greater angles, however, it is eliminated.

Figure 11:
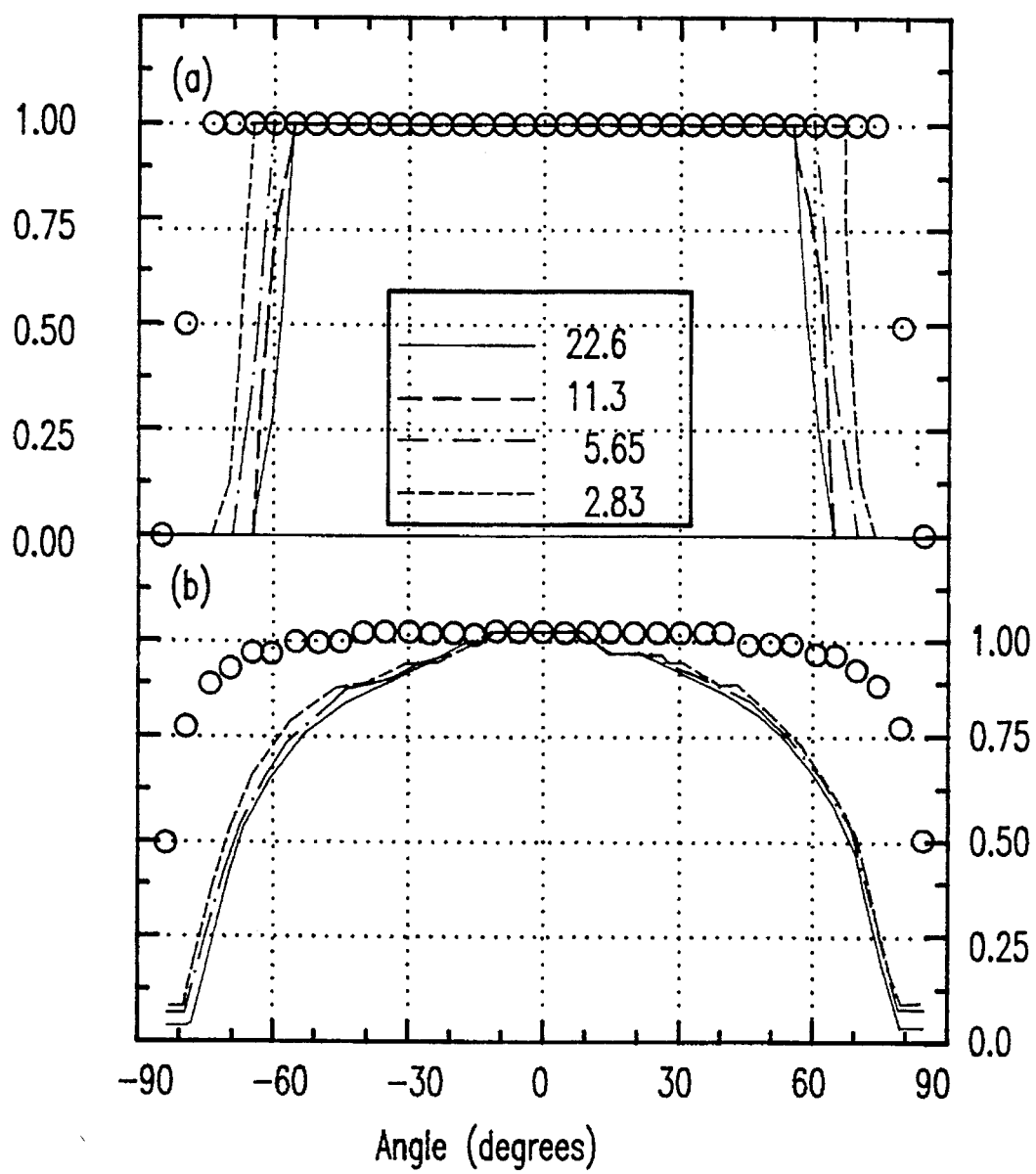
FIG. 11 illustrates a proportion of the measurement volume sensitive to a particular flow angle for a minimum peak correlation coefficient of 0.95.

As is obvious from these Figures, the improvement in yaw response is made at the expense of the DAV becoming biased against higher flow angles. This is shown in more detail in FIG. 11 where the proportion of the measurement volume sensitive to a particular flow angle is plotted vs. flow angle. For the pitch response, this proportion remains unity over almost the entire angle range. For yaw, the proportion drops more gradually with an increase in angle. However, most of the loss still comes at angles greater than $60°$.

Figure 12:
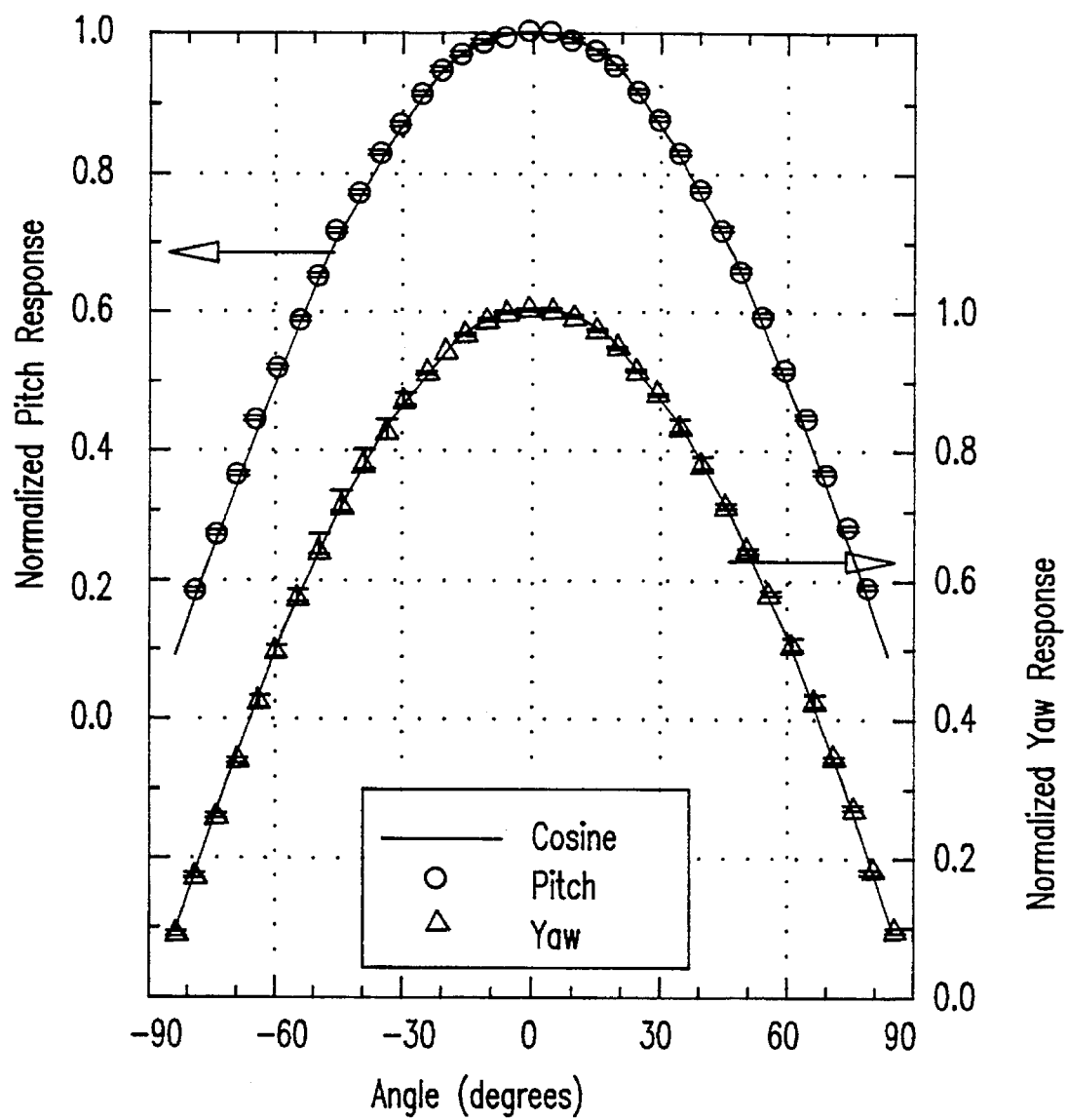
FIG. 12 is a graph illustrating DAV angle response normalized on velocity at zero pitch and yaw for an improved photodiode array design.

Even if the design of the photodiodes is restricted to two rectangular elements, the response can be substantially improved by increasing the aspect ratio of the array $h/D$ and reducing the measurement volume to beam size ratio $D/\sigma$. For example, FIG. 12 shows the angle response for $h/D=17.6$, $D/\sigma=0.52$ and $d/D=0.02$ with a minimum peak correlation coefficient of 0.9. The mean pitch and yaw response are nearly perfect cosines to $75°$ and $85°$, respectively, while r.m.s. variations remain small. The angle bias (FIG. 11) and non-linearity (FIG. 8) are also substantially reduced.

To examine the performance of the one-component DAV of the specific embodiment experimentally, measurements were made in attached and separated turbulent flows. To verify the performance of the DAV, comparisons were made, where possible, with a hot-wire anemometer.

The flows were generated in a small, blow-down open-circuit wind tunnel powered centrifugal fan illustrated in FIG. 4, commercially available and known in the art. The tunnel has a rectangular test section 2.29m long and 0.235 m wide. The last 0.330m of its length (i.e., the portion at which the measurements were made) is built entirely from plexiglas (e.g., see FIGS. 4 and 13). The height of the test section, which increases gradually along its length to maintain a zero streamwise pressure gradient, is approximately 114 mm in the measurement section. Flow at the test section entrance consists of a uniform potential core surrounded by relatively thin boundary layers. However, by the measurement section, the boundary layers have grown, almost entirely engulfing the potential core. A moveable plate, placed over the blower entrance is controls air speed. Potential core velocities of 10 and 20 m/s were investigated by the present inventors.

Figure 13:
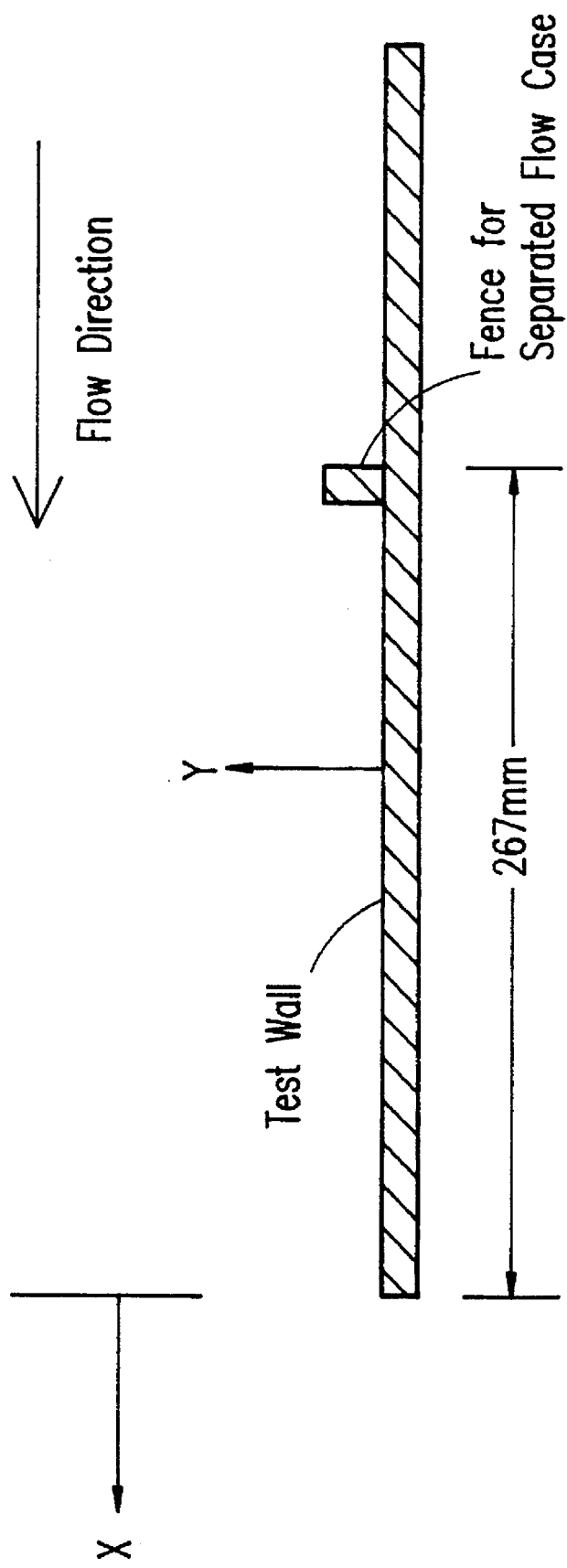
FIG. 13 is a schematic of the wind-tunnel test section as viewed in the Z direction.

Measurements were made in the flow adjacent to the side test wall, as shown in FIG. 4, along horizontal profiles at the mid height of the test section. FIGS. 4 and 13 show the coordinate system (X,Y,Z) used in presenting results below and in the Figures. X is measured downstream from the wind tunnel exit, Y inwardly from the test wall and Z completes a right-handed system. A Pitot-static probe, located at $X=-343$ mm, was used to monitor velocity in the potential core during both hot-wire and DAV measurements.

Hot-wire measurements were made using a TSI type 1210 T1.5 single sensor probe which was held by a long rod attached to a computer-controlled traverse gear located about 1 m downstream of the test-section exit, outside of its jet. The probe stem was bent toward the test wall at an angle of about 15° to the X axis to enable measurements to be made very close to that surface. This arrangement produced less flow interference than if the probe were introduced through a test section wall. For all measurements, the sensor was positioned parallel to the Z direction, i.e., normal to the local mean flow direction and velocity gradient. The absolute position of the sensor was found by placing it as close as possible to the test wall and then using a cathetometer to measure the distance between the hot-wire prongs and their reflection in the wall, the overall accuracy being better than ±0.1 mm.

For the attached flows, this uncertainty was further reduced by comparison of the mean-velocity measurements with a theoretical sublayer profile. This comparison led to a Y-datum adjustment of −0.06 mm in both flows, an error attributed to backlash in the traverse gear.

The hot wire was operated at an overheat ratio of 1.7 using a Dantec type 56C01 and 56C17 constant temperature bridge and main unit, balanced to give a frequency response of over 30 kHz. The bridge output was read through an Analogic HS-DAS 12 A/D converter into an IBM AT computer where the output was linearized. The hot-wire was calibrated by placing it in the potential core next to the reference pitot static and varying the flow speed. Flow temperature was monitored during calibrations and measurements. Temperature variations, ±2° F. at most, were suitably corrected in a manner known in the art.

For measurements with the DAV, 2.1 μpolylatex spheres were introduced to the flow through a jet-type atomizer (e.g., commercially available and known in the art) placed at the blower outlet. The spheres were suspended in alcohol which evaporated soon after their injection into the flow, resulting in a monodisperse distribution of particle sizes.

To enable DAV measurements close to the test wall, a laser beam was introduced at a slight angle (0.6°) to the Z-axis (see FIG. 4). Its diameter in the measurement volume was adjusted to 0.4 mm at the $1/e^2$ points using the collimator. Diameter in the measurement volume was estimated by measuring the beam diameter and convergence angle at the collimator output and the optical path length. From the shapes of the illustrated DAV signals, a smoother, more Gaussian intensity distribution was achieved if the beam was brought to its focus before, rather than after, the measurement volume.

The Y position of the DAV measurement volume was measured to an accuracy of ±0.02 mm using a dial indicator mounted between the outside of the test wall and optical table. The dial indicator was set to zero with the center of the measurement volume at the wall. This position was found by monitoring the d.c. output of the photodiode amplifiers. Near Y=0, the laser beam strikes the wall at a glancing angle and light is scattered from the surface.

When the measurement volume intersects the wall, this scattered light is received by the photodiode elements. When the center of the volume is at the wall, the light received by the elements is at a maximum. By maximizing the d.c. output of the photodiode amplifiers, the measurement volume center could be placed at the wall to an accuracy of better than ±0.1 mm. For the attached flows, this uncertainty was further reduced by comparison of the mean-velocity measurements with a theoretical sublayer profile. This comparison led to an Y-datum adjustment of ±0.04 mm in both flows, the consistency of this error suggesting some bias in the above positioning scheme. In contrast to LDV, scattered light from the wall is not a problem in making near-wall measurements since it merely adds a d.c. level to the signals.

At most measurement locations, typically 400 measurable signals per second were visible in the DAV outputs, this rate being consistent with seeding density and measurement volume dimensions. Signals were cross-correlated by reading them into an IBM AT computer using a Rapid Systems R2000 A/D converter, the A/D inputs being buffered with two×10 buck and gain amplifiers or the like. The R2000 is an 8-bit 2 channel A/D converter with a peak sampling frequency of 20 MHz per channel. The external trigger of the R2000 A/D converter detects the presence of a signal by monitoring one of the outputs, its threshold being set just above the noise level. Since pre-trigger samples were taken, the same output was used to trigger data acquisition regardless of the flow direction. At most locations, 192 pretrigger and 320 post-trigger samples were taken simultaneously on both channels, the sampling rate being adjusted between 20 Mhz and 500 kHz according to local flow conditions. Cross-correlations were performed with the aid of an 18–8 Laboratories PL2500 array processor. As in the simulation, a 7-point least-squares parabola was used to interpolate the position of the peak. To allow further study of the characteristics of the DAV of the specific embodiment, signals were also stored on optical disc. Between 1000 and 4000 DAV signals were processed at each measurement point. Statistics were calculated using particle averages.

Figure 14A:
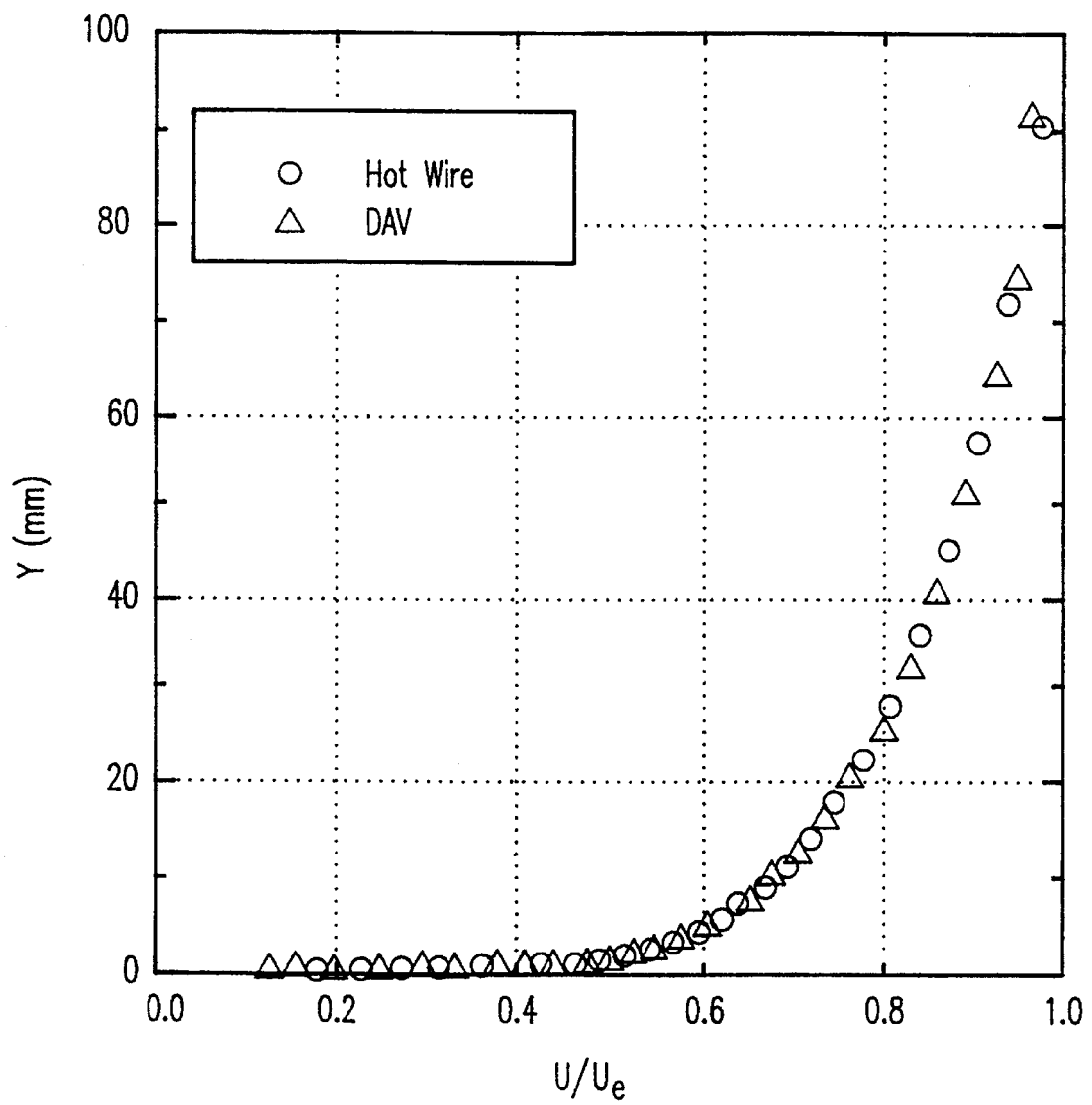
FIG. 14(a) is a graph illustrating velocity profiles for the turbulent boundary layer, $U_e$ being 10 m/s.
Figure 14B:
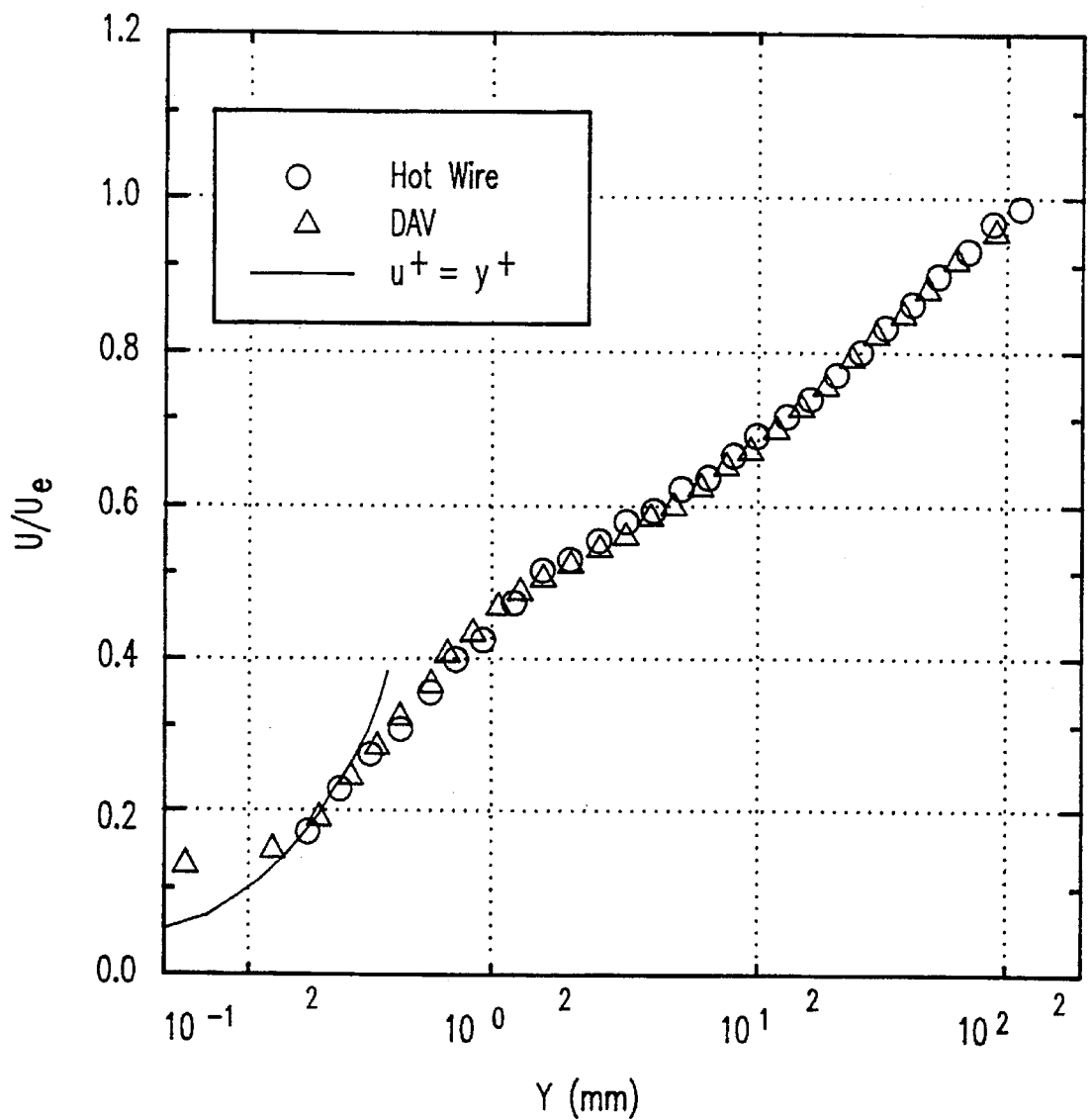
FIG. 14(b) is another graph illustrating velocity profiles for the turbulent boundary layer, $U_e$ being 10 m/s.

For attached flows, measurements were made in the undisturbed test wall boundary layer at x=−165 mm for edge velocities of 10 and 20 m/s. FIGS. 14a–14d compare hot-wire and DAV measurements of $\overline{u'^2}/U_e^2$, mean velocity $U/U_e$, turbulence normal stress and skewness factor $\overline{u'^3}/(\overline{U_e^2})^{1.5}$ for the 10 m/s flow. The agreement between the mean velocity measurements (i.e., see FIGS. 14a and 14b) appears very good. The largest difference, of about 2.5% $U_e$, occurs in the buffer layer (FIG. 14b) where the hot-wire measurements lie slightly below those of the DAV. FIG. 14b shows that the DAV is capable of useful mean velocity measurements as close as 0.2 mm from the wall, within the sublayer. This limit is consistent with the 0.4 mm diameter of the laser beam in the measurement volume.

Figure 14C:
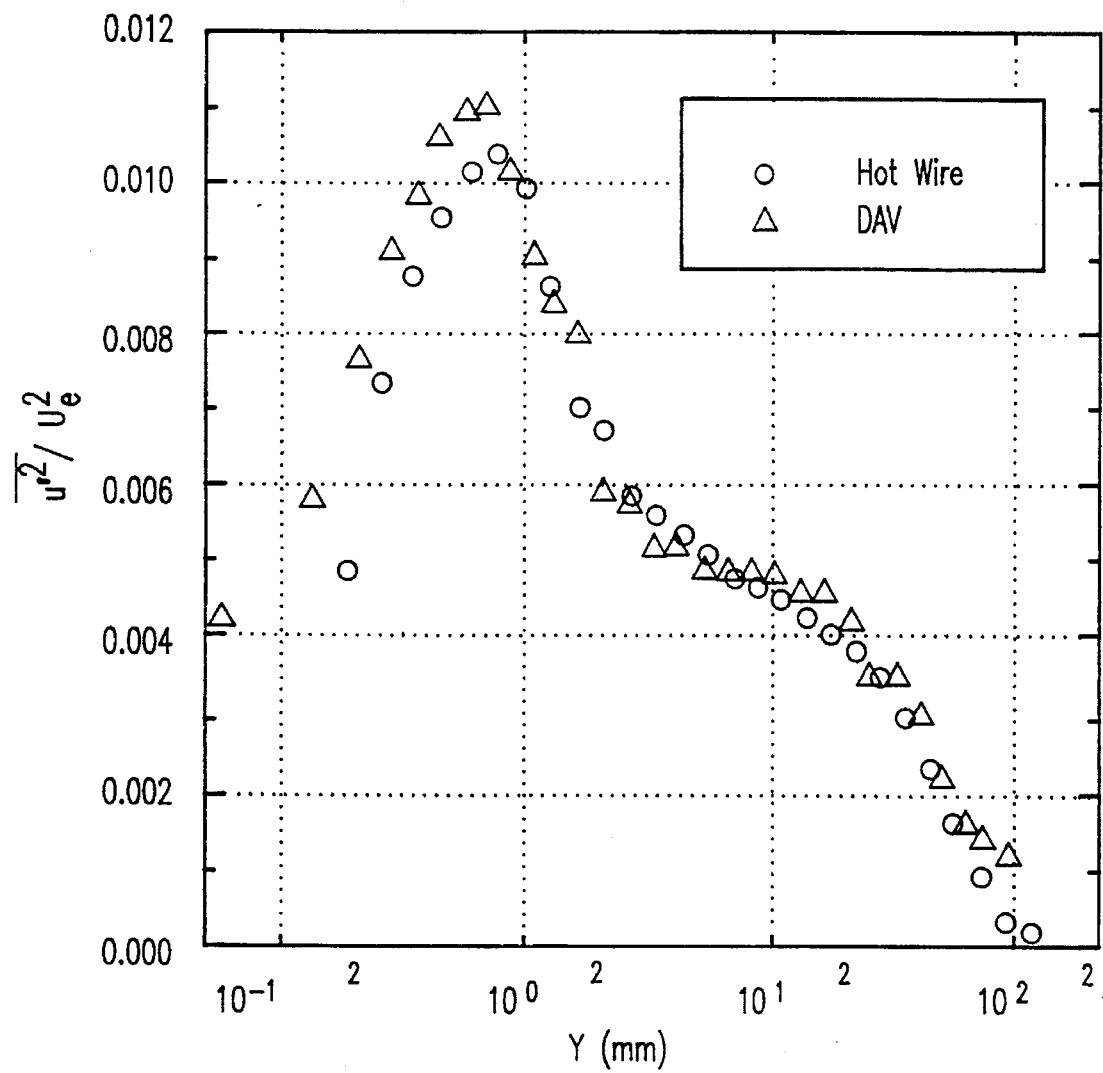
FIG. 14(c) is a third graph illustrating velocity profiles for the turbulent boundary layer, $U_e$ being 10 m/s.
Figure 14D:
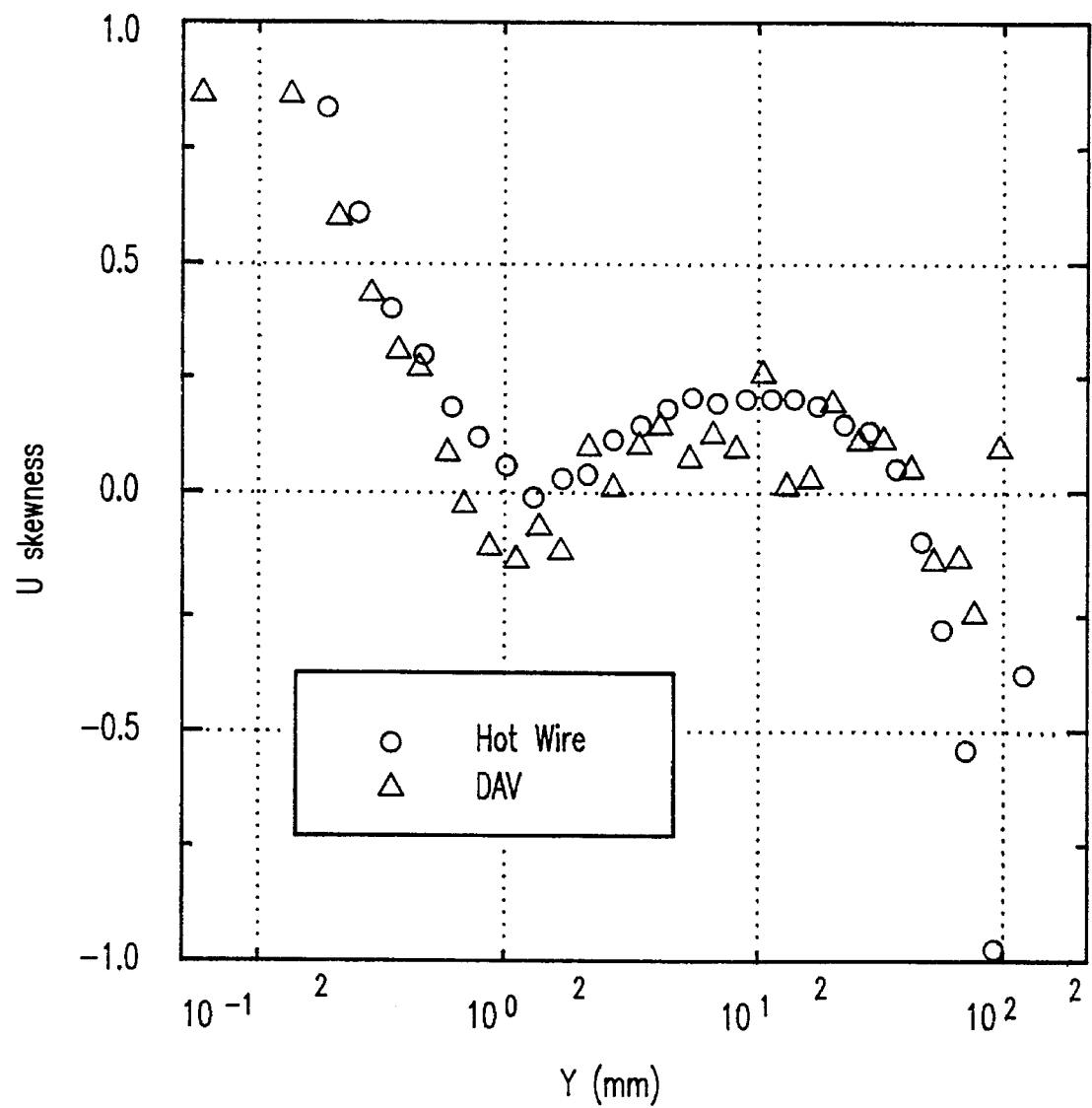
FIG. 14(d) is a fourth graph illustrating velocity profiles for the turbulent boundary layer, $U_e$ being 10 m/s.
Figure 15A:
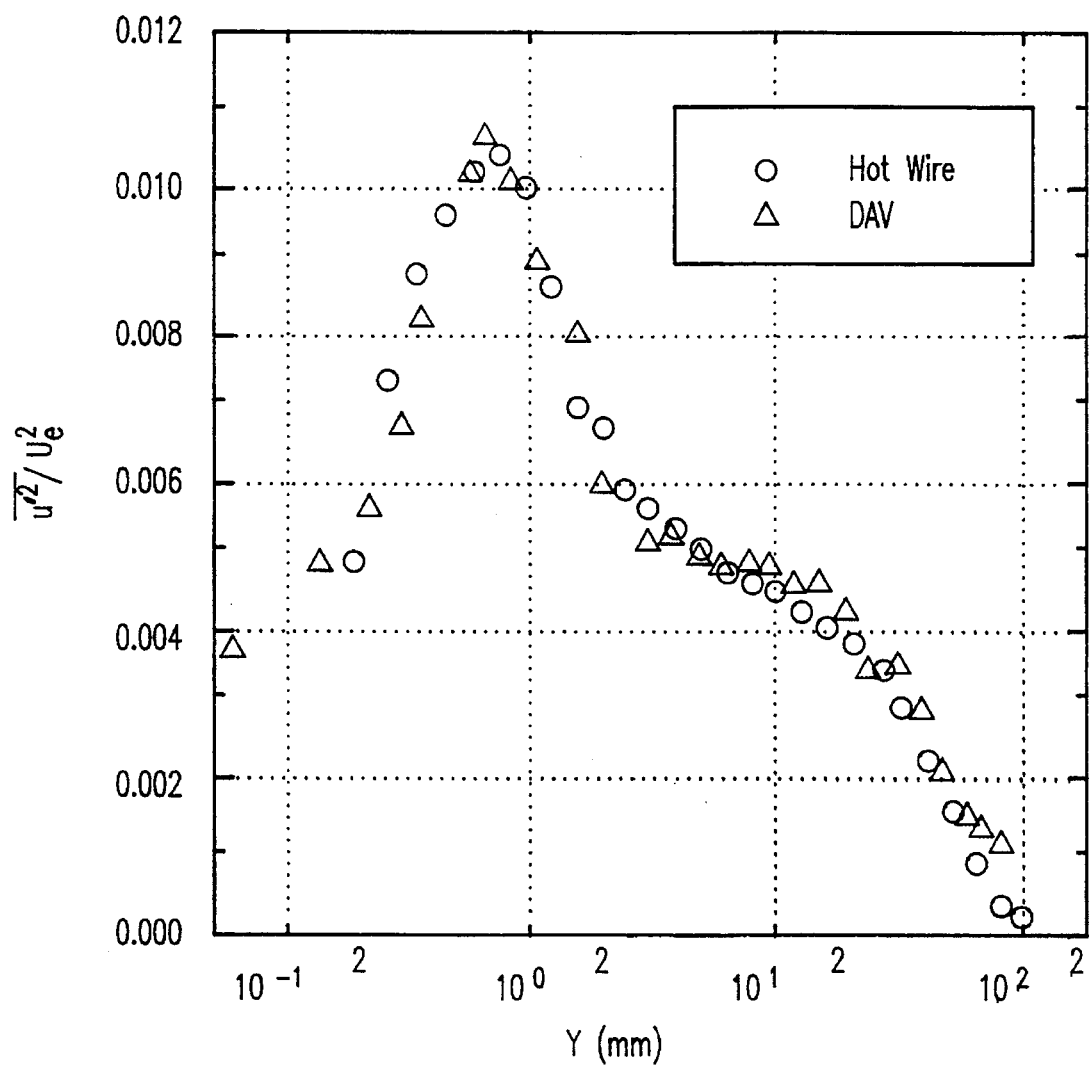
FIG. 15(a) is a graph illustrating velocity profiles for the turbulent boundary layer with $U_e$=10 m/s corrected for gradient broadening.

Agreement between the turbulence stress measurements at 10 m/s is also satisfactory except within the near-wall region (y<0.8 mm) and close to the outer edge of the boundary layer (y>40 mm) (e.g., see FIG. 14c). The discrepancies in the near-wall region are almost certainly caused by a velocity gradient broadening of the DAV measurement, i.e., an additional apparent turbulence stress due to significant variations in mean velocity across the measurement volume. This error is well documented for LDV applications. To first order the additional turbulence stress is given by $(\Delta \partial U/\partial Y)^2$ where $\Delta$ is a distance representing the standard deviation of the distribution with Y of particles passing through the measurement volume. Based on the dimensions and form of the DAV measurement volume, this distance is preferably on the order of 0.1 mm. In fact, setting $\Delta=0.075$ mm corrects for the difference between the hot-wire and DAV results, as evidenced in FIG. 15a.

The differences in the normal stress measurements in the outer region are due to electrical noise in the DAV. At the furthermost point from the wall (y=91 mm), this adds about $0.001 U_e^2$ to the normal stress. As is evidenced by FIG. 14c and predicted by equation 4, this error is not constant across the boundary layer but decreases as the fourth power of the mean velocity. This lower limit on normal stress measurements, due to electrical noise, is not a fundamental one. Increasing laser power, moving to a more advantageous receiving angle, using a smaller laser beam and a greater receiving lens magnification are all measures that would reduce $\overline{t_n'^2}$.

Figure 15B:
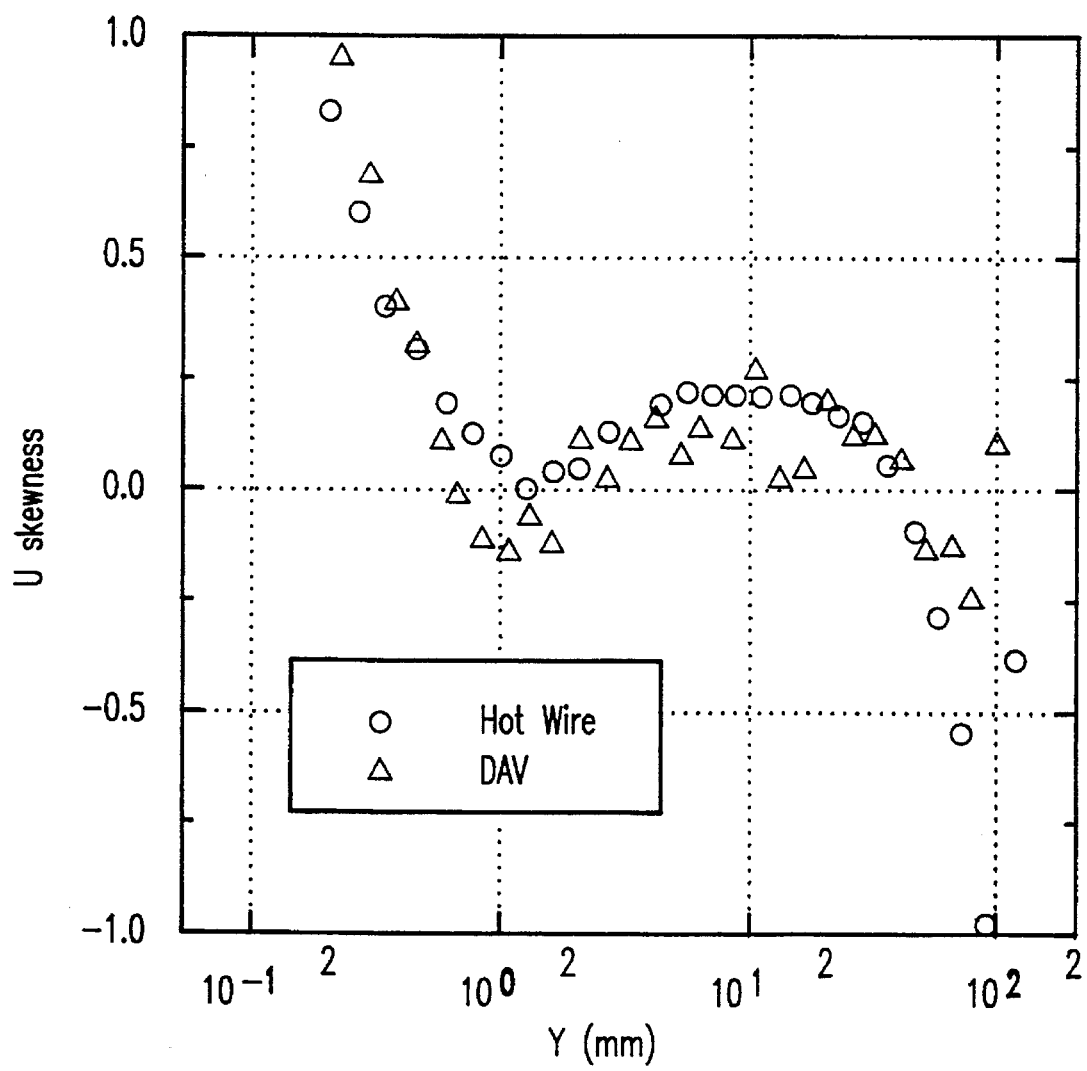
FIG. 15 (b) is another graph illustration velocity profiles for the turbulent boundary layer $U_e$=10 m/s corrected for gradient broadening.

As with the normal stress, agreement between the measurements of skewness factor (FIG. 14d) is best in the midregion of the boundary layer. Close to the wall (i.e., Y<1 mm), the DAV consistently underestimates skewness by about 0.2. In the very near-wall region (Y<0.5 mm), this appears to be due to velocity gradient broadening of the normal stress, since here correcting the normal stress using Δ=0.075 mm brings the two measurements into closer agreement (i.e., see FIG. 15b). The remaining discrepancy may be partly due to second-order broadening, i.e., curvature of the mean profile within the volume. This error, which would tend to make the skewness more negative, would be greatest in the buffer layer, much like the differences observed here.

Figure 16A:
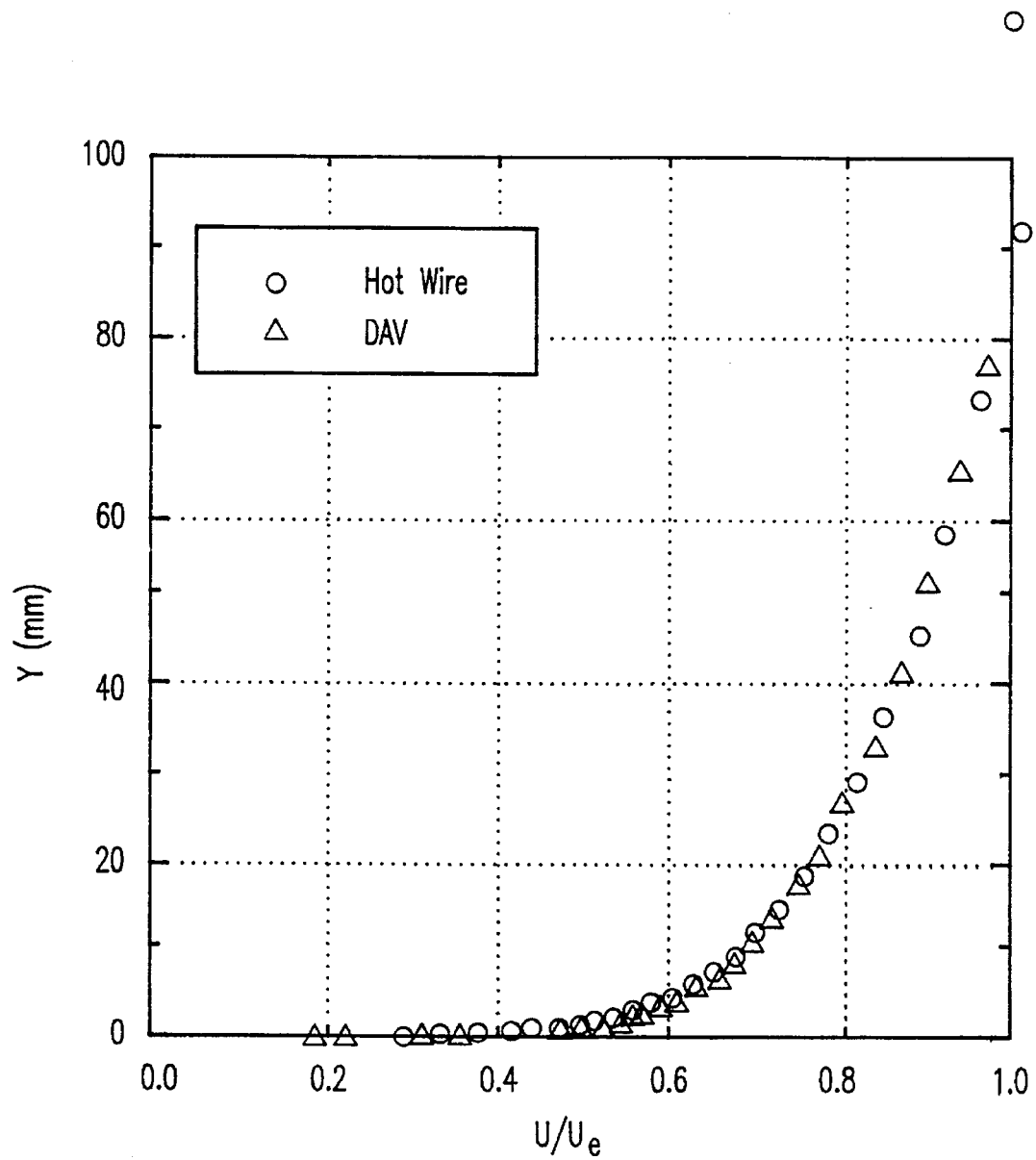
FIG. 16(a) is a graph illustrating velocity profiles for the turbulent boundary layer with $U_e$=20 m/s.
Figure 16B:
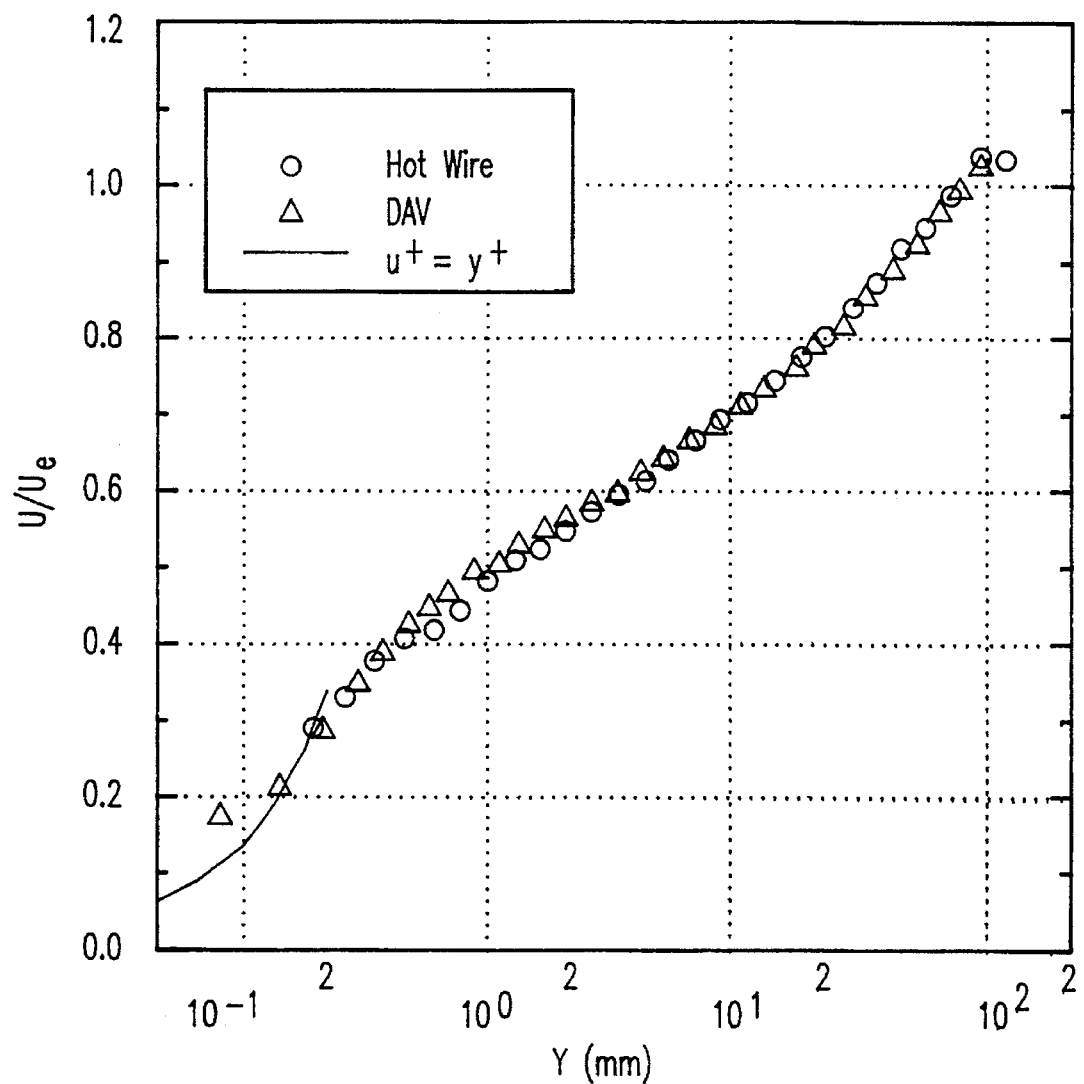
FIG. 16(b) is another graph illustrating velocity profiles for the turbulent boundary layer with $U_e$=20 m/s.
Figure 16C:
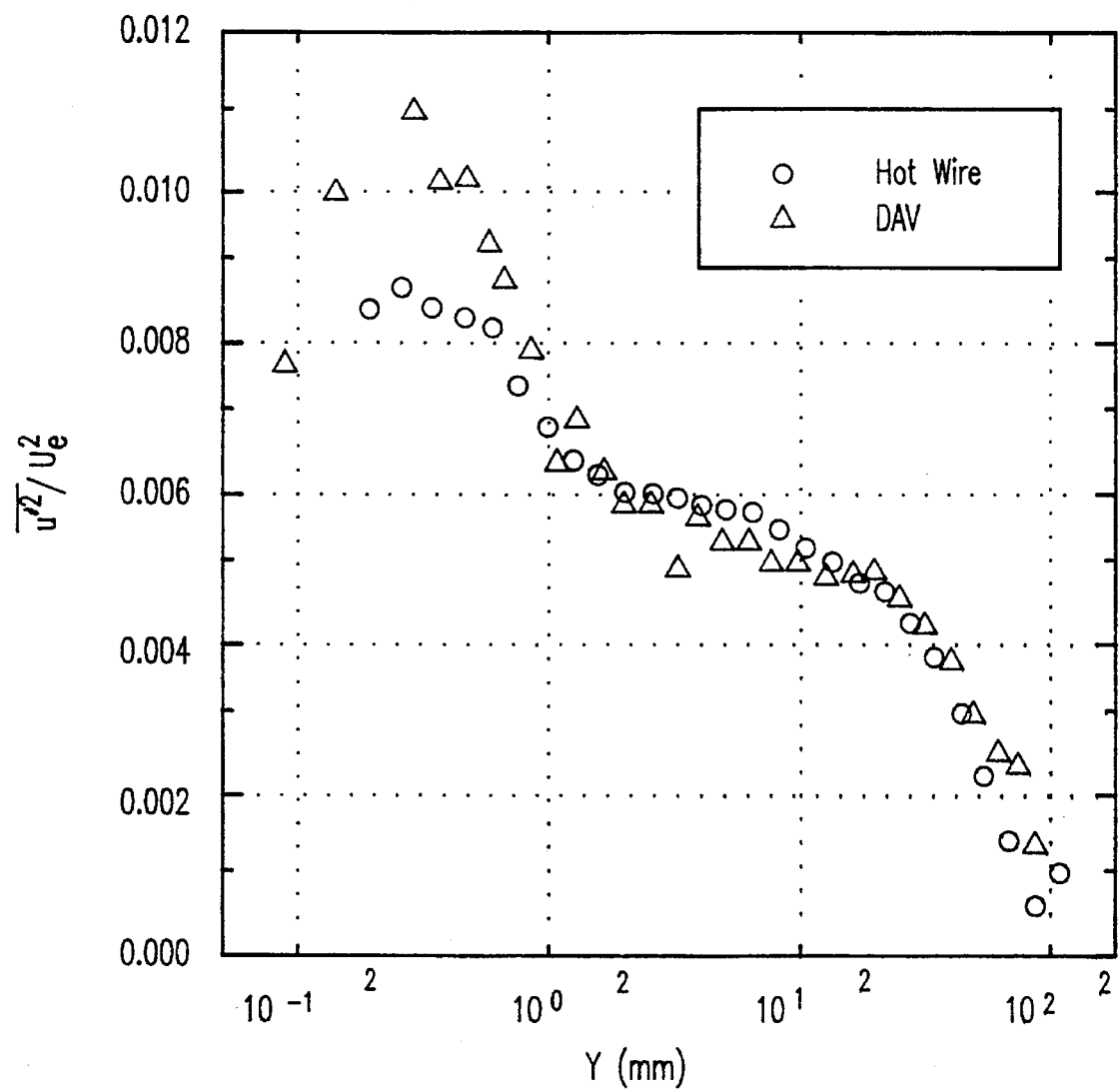
FIG. 16(c) is a third graph illustrating velocity profiles for the turbulent boundary layer with $U_e$=20 m/s.
Figure 17A:
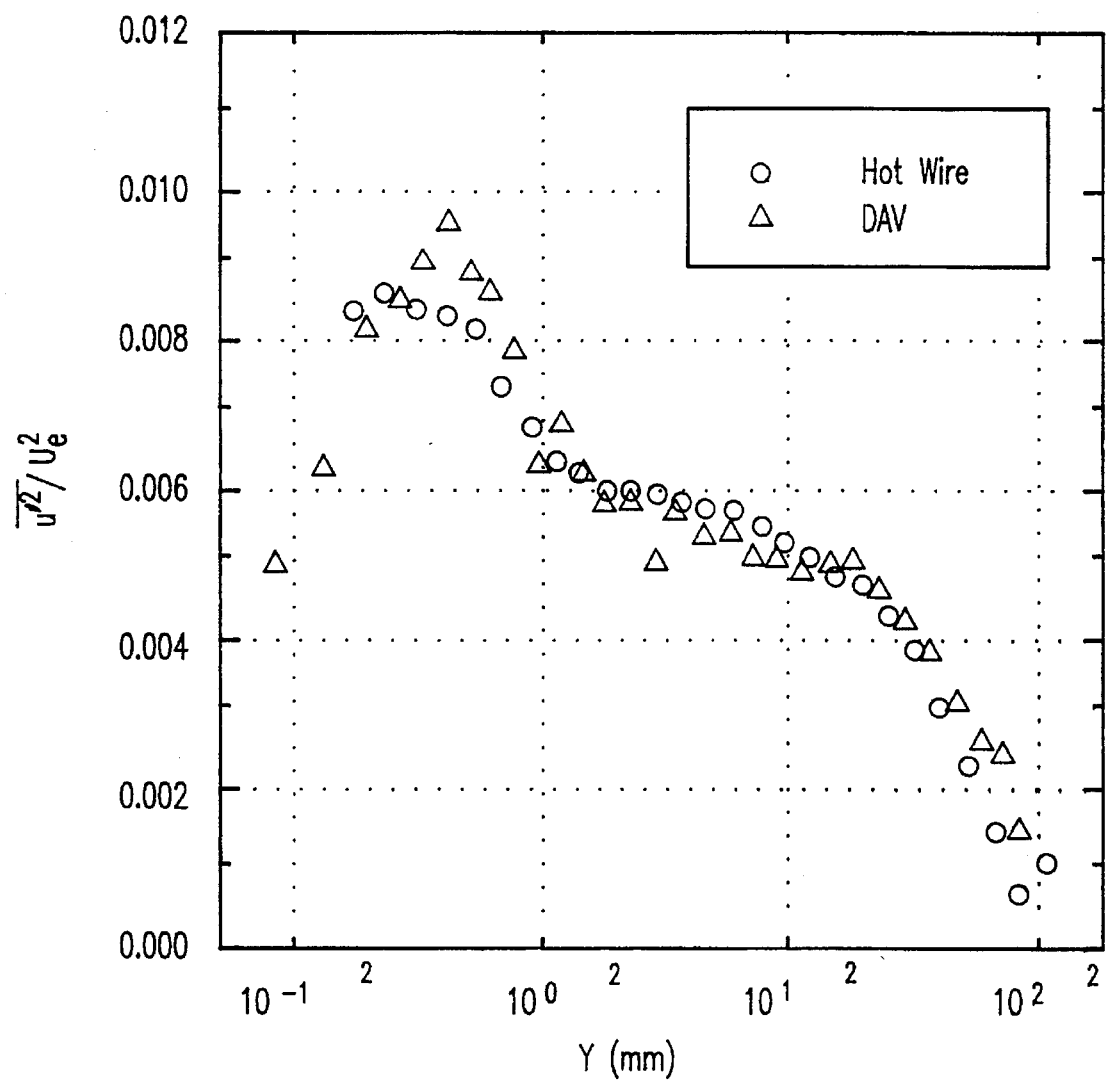
FIG. 17(a) is a graph illustrating velocity profiles for the turbulent boundary layer with $U_e$=20 m/s corrected for gradient broadening.

The mean-velocity measurements made with an edge velocity of 20 m/s (i.e., see FIGS. 16a and 16b) agree substantially as well as those at the lower speed. The greatest discrepancy between the hot-wire and DAV (about 3.5% $U_e$) measurements occurs in the buffer layer. As at 10 m/s the turbulence normal stresses (i.e., see FIG. 16c) are in close agreement except in the near wall region and towards the boundary layer edge. Velocity gradient broadening appears responsible for the near-wall errors, corrections with Δ=0.075 mm eliminating most of the differences here (i.e., see FIG. 17a). Errors in the edge region resulting from electrical noise are actually less severe than at 10 m/s bearing in mind that, scaled on $U_e$, equation 4 predicts an increase of 4 times the normalized turbulent stress error with a doubling of the mean velocity. The apparent change in $\overline{t_n'^2}$ between the two profiles reflects the fact that this parameter is quite sensitive to optical alignment of the DAV system, which was adjusted between these measurements. Alignment of the axis of the photodiode array with the laser beam center and focussing of the receiving lens are particularly important in this respect.

Figure 16D:
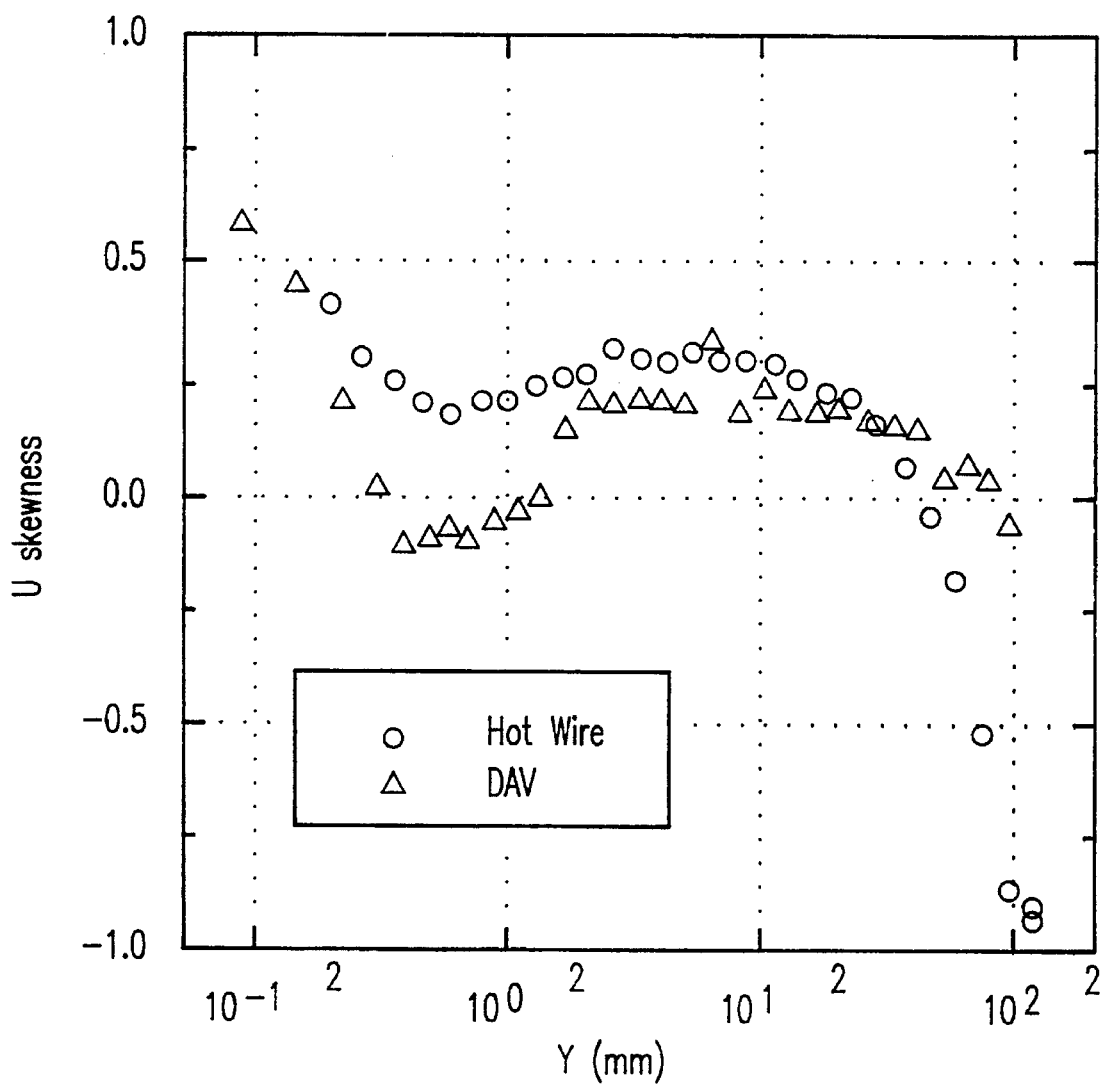
FIG. 16(d) is a fourth graph illustrating velocity profiles for the turbulent boundary layer with $U_e$=20 m/s.
Figure 17B:
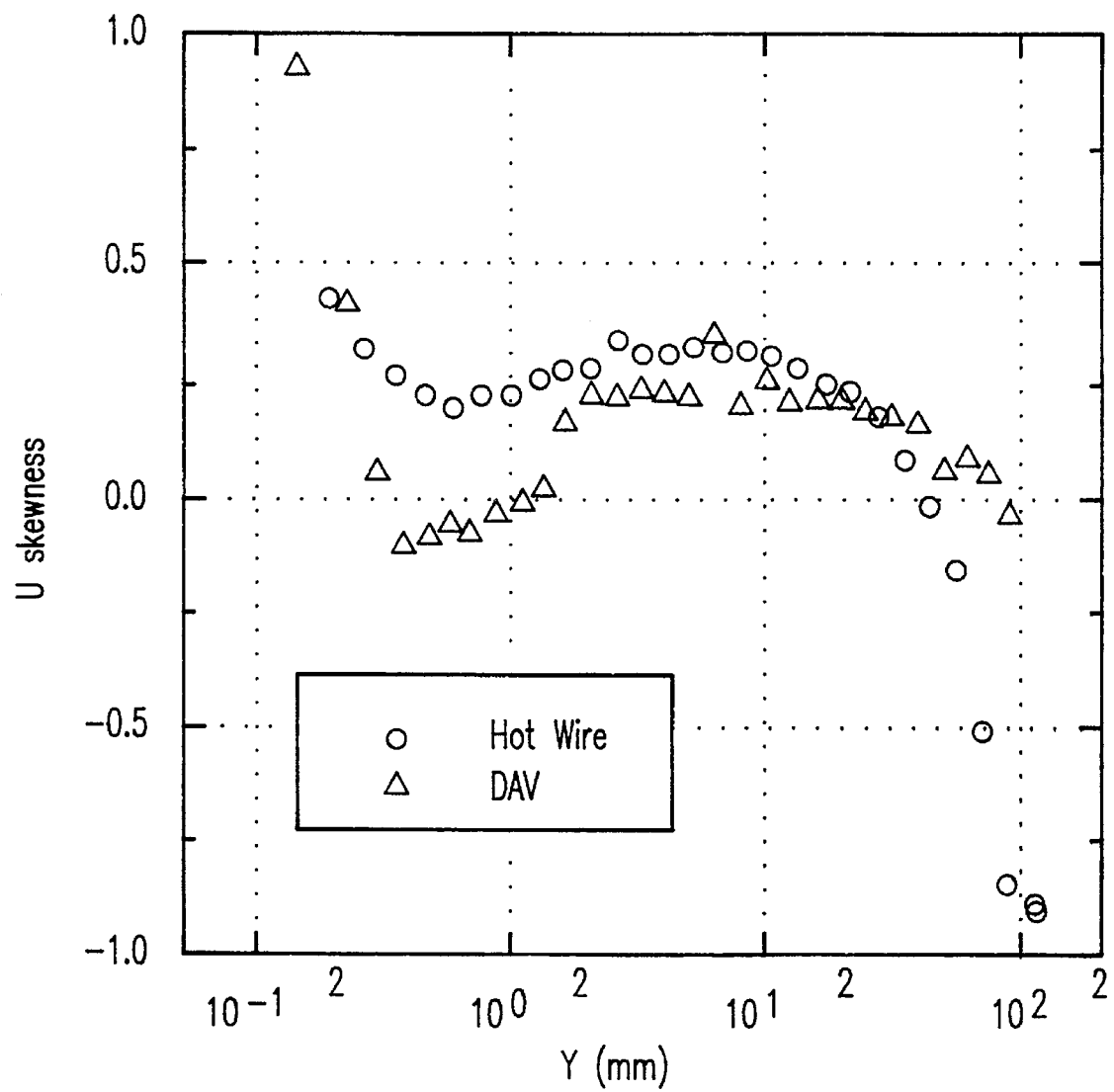
FIG. 17(b) is another graph illustrating velocity profiles for the turbulent boundary layer with $U_e$=20 m/s corrected for gradient broadening.

The skewness profile comparison (i.e., see FIG. 16d) is similar to that at 10 m/s except that the disagreements close to the wall (Y<2 mm) are more severe. Applying gradient broadening corrections to the normal stress reduces differences very near the wall (i.e., see FIG. 17b) but, as at 10 m/s, does not improve agreement in the buffer region.

The satisfactory performance of the DAV in the attached flows is predictable from its theoretical angle response curves. At the relatively small instantaneous flow angles experienced in a turbulent boundary layer, these are closely cosinusoidal. In a separated flow, however, instantaneous flow angles reach 90°. Therefore, errors due to the imperfections in angle response would be expected. Observing these errors was only one reason for performing separated-flow measurements. The primary purpose was to uncover any other unforeseen problems that would limit the performance of a DAVs with better photodiode array designs.

A separated flow was generated in the measurement section by placing a fence, as shown in FIG. 13, on the test wall at X=−267 mm. The fence preferably has a rectangular cross-section 12.7 mm high by 6.4 mm thick and completely spans the test wall. It generates a region of recirculating flow roughly 150 mm in length. The DAV measured three profiles in this flow at X=−117 mm, −165 mm and −213 mm for an approach edge velocity $U_e$ of 10 m/s. Hot-wire measurements were made only at X=−165 mm in the region outside the separation where local turbulence levels were less than 30%. Because of the high turbulence intensities and instantaneous flow reversals in these flows, the particle averaging used to determine statistics from the DAV measurements was expected to produce some bias error.

This type of error has been well researched for LDV applications and was corrected, as is usual for LDV measurements, by weighting each velocity sample by the measurement volume transit time of the particle that produced the error.

Figure 18A:
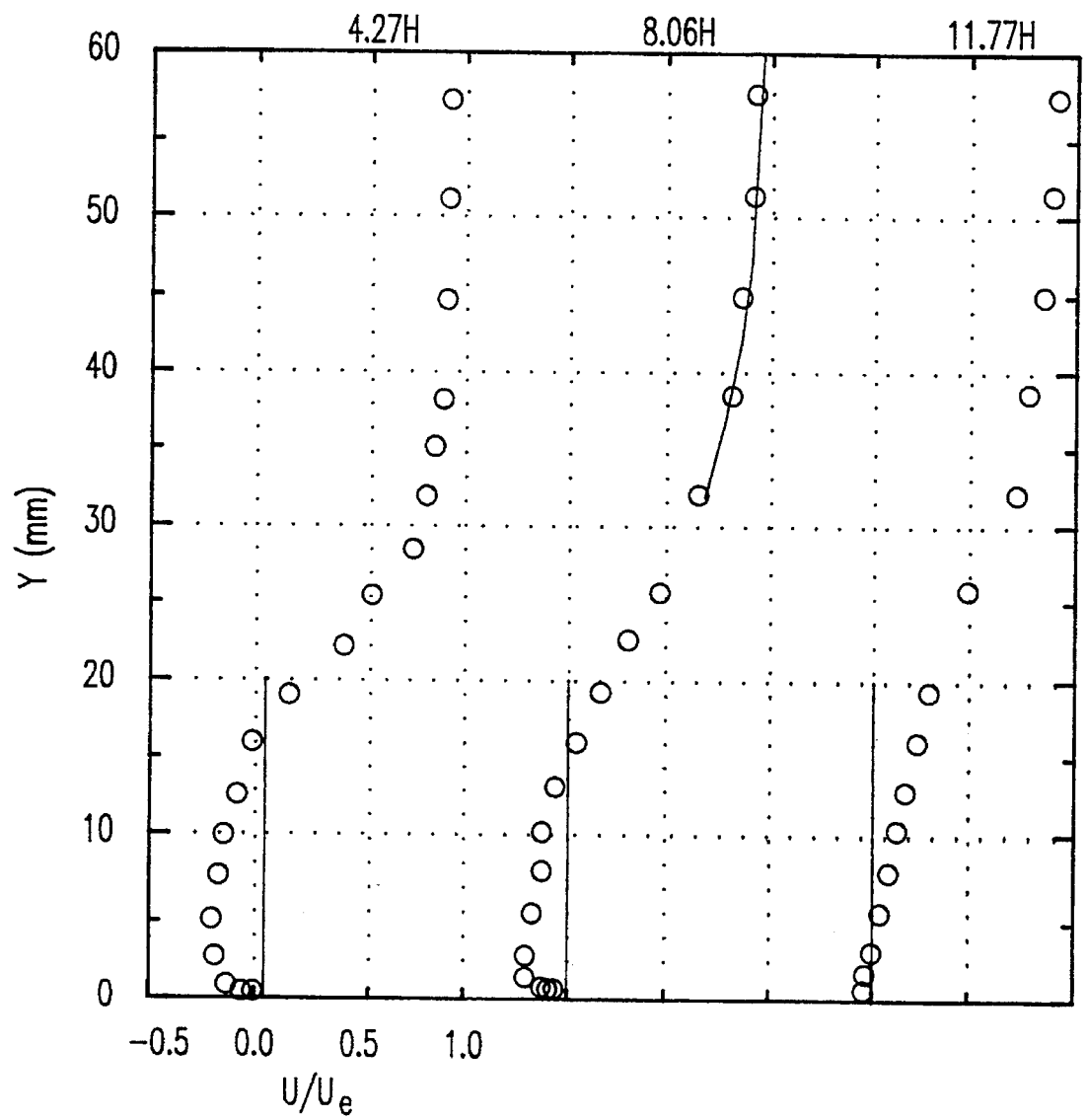
FIG. 18(a) is a graph illustrating mean velocity profiles measured in the separated flow.
Figure 18B:
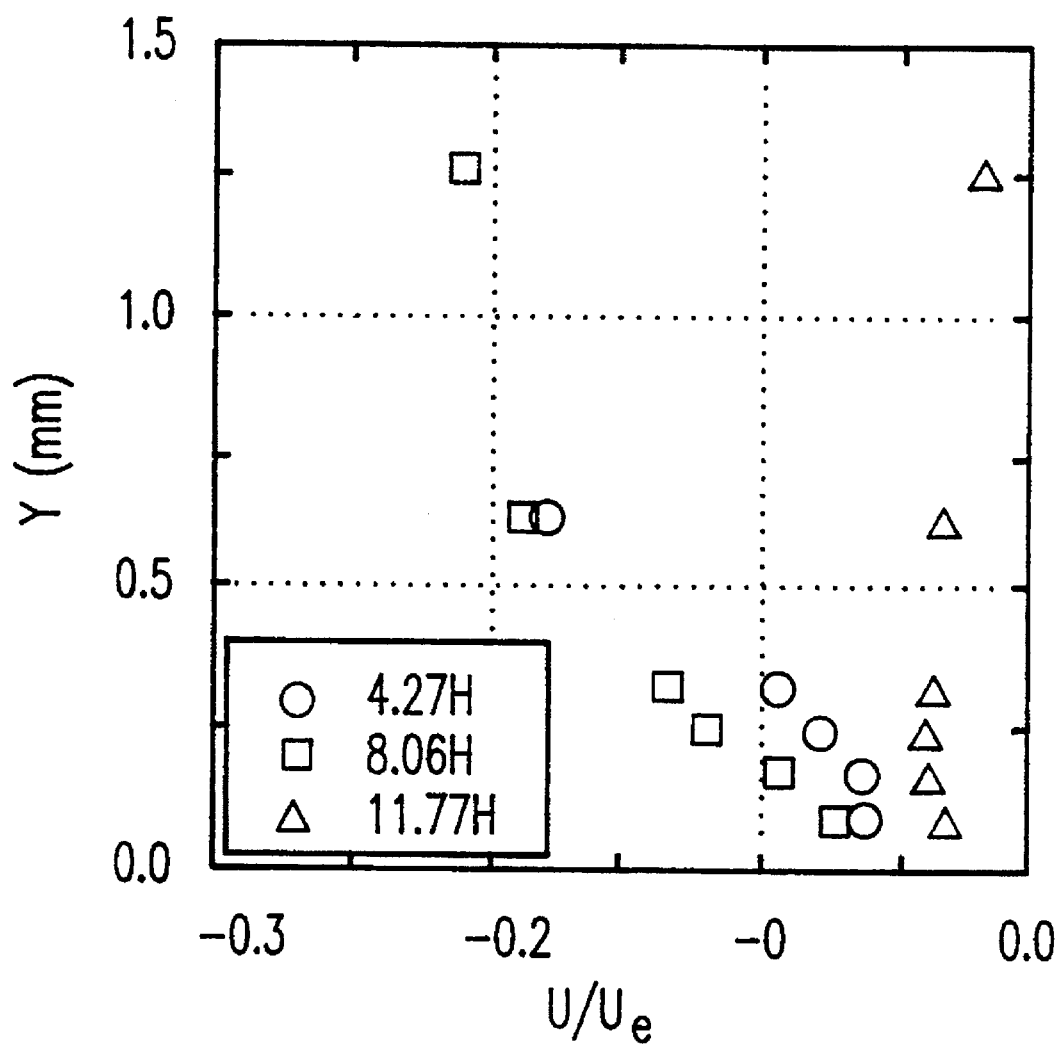
FIG. 18(b) is a graph illustrating mean velocity profiles measured in the separated flow with a detail of the near-wall region.
Figure 19:
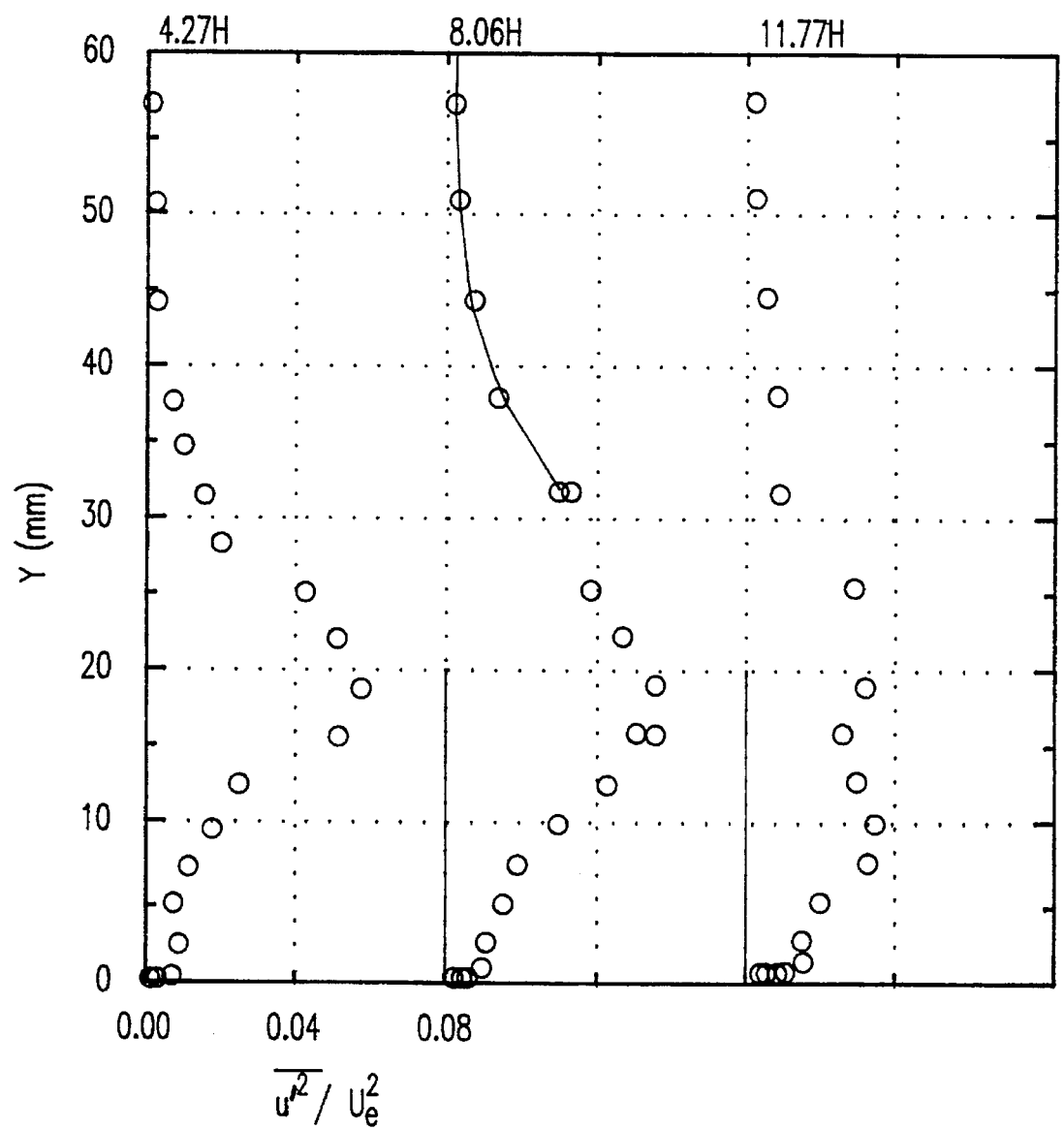
FIG. 19 is a graph illustrating turbulence normal stress profiles measured in the separated flow.
Figure 20:
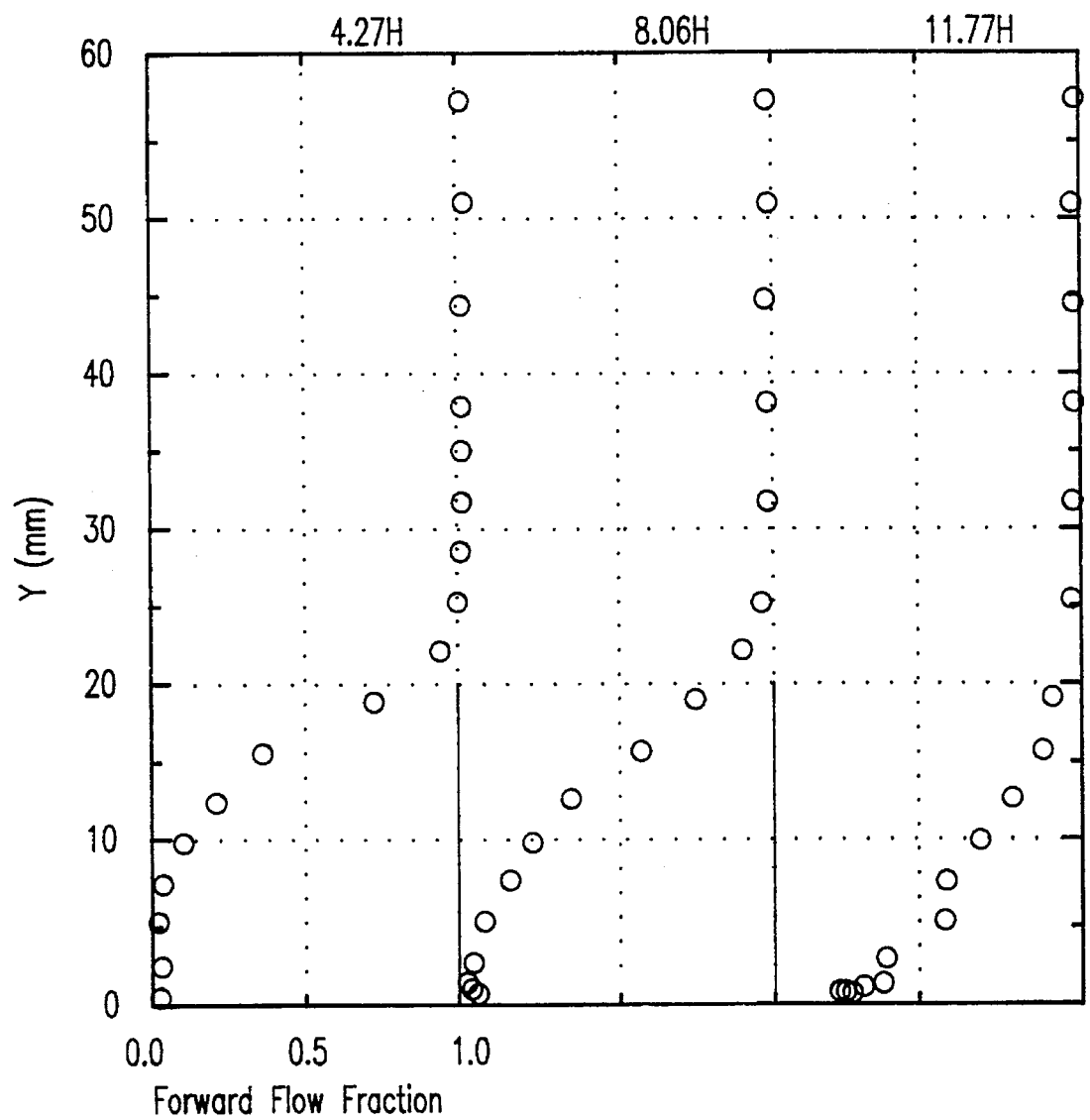
FIG. 20 is a graph illustrating forward-flow fraction profiles measured in the separated flow.

FIGS. 18 through 20 show mean velocity, turbulence normal stress and forward flow fraction profiles measured in the separated flow. These measurements are generally consistent with the results of previous recirculating-flow studies. Qualitatively, at least, the measurements demonstrate the ability of the DAV to make useful measurements in a reversing flow.

The mean velocity profiles (i.e., see FIG. 18a) illustrate the steep velocity gradient associated with the separated shear layer and its relaxation with distance downstream. They also show the mean backflow which has a peak magnitude of −0.24$U_e$ at X=−213 mm (4.27 fence heights H from separation) and −0.21$U_e$ at X=−165 mm (8.06 H from separation). The profile at X=117 mm is measured close to the reattachment location. At X=−165 mm and −213 mm, the sub-boundary layers formed underneath the backflow are visible. The near-wall sections of these profiles (i.e., see FIG. 18b) are consistent with the no-slip condition down to about 0.2 mm from the wall. This lower limit on Y is in agreement with the attached flow results.

The profiles of turbulence normal stress and forward flow fraction (i.e., see FIGS. 19 and 20) also show the separated shear layer. At X=−213 mm and −165 mm, the peak turbulence normal stress is 0.057$U_e^2$(23.9% turbulence intensity). By X=−117 mm, the peak turbulence normal stress has dropped to 0.035$U_e^2$ (18.7%). Agreement with the hot-wire measurements made in the outer part of the shear layer at X=−165 mm is satisfactory.

Figure 21:
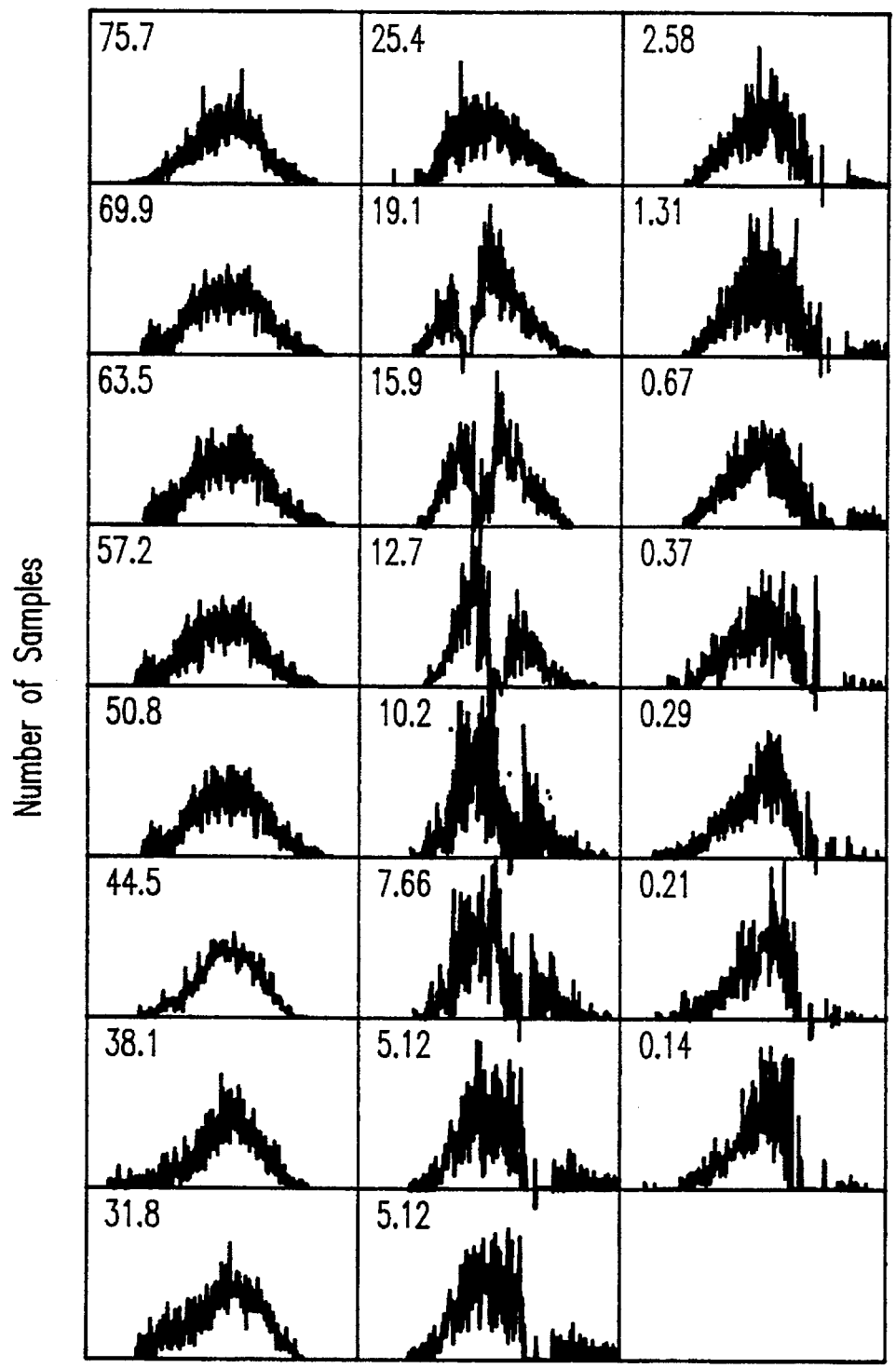
FIG. 21 illustrates a sequence of histograms measured at X=−165 mm.

Without quantitative comparisons, the limitations of the DAV angle response are not visible in the above measurements. However, the limitations are visible in velocity histograms. FIG. 21 illustrates a selection of histograms from the profile at X=−165 mm. The number in the top left hand corner of each histogram indicates a Y location in mm. The "tick" mark on the horizontal axes indicates the location of zero velocity. At all locations where instantaneous flow reversals occur, the histograms have a 'hole' in the vicinity of zero velocity (i.e., near the tick mark). While this hole is probably a consequence of the imperfect angle response, such a hole is also probably due to the limited duration of the signals recorded by the A/D converter with each particle transit. The finite record duration limits the maximum measurable transit time and thus the minimum velocity magnitude. The effects of increasing the duration are evident by comparing the histograms measured at Y=10.2 mm and 7.6 mm, for example, and noting the difference in $\overline{u'^2}/U_e^2$ at these locations (i.e., see FIG. 19). Between these points the duration was doubled by halving the sampling rate, resulting in a corresponding reduction in the size of the hole. Generally, however, reducing the sampling rate may not be preferable in controlling this phenomenon since such reduction degrades the resolution of the DAV of the specific embodiment for small transit times (i.e. high velocities), forcing a heavy reliance on the scheme used to interpolate the cross-correlation function. In most separated flows, as in this one, there are points where both high velocities and near-zero velocities occur.

A more satisfactory solution is to increase the record duration by increasing the number of samples. This is simply performed with the present equipment since the R2000 can accommodate up to 132,000 samples in each record. Alternatively, if this capability were not available, the number of records could be counted for which signals are detected on one channel but not the other and then assign these samples a velocity of zero. This type of scheme has been successfully implemented with pulsed wire anemometers.

Thus, the separated flow measurements revealed no fundamental problems that would limit the accuracy of improved DAV designs.

In sum, the invention has been successfully reduced to practice for one specific design. This design, used for one-component point velocity measurements employs a single detector array with two long rectangular PIN photodiode elements placed side-by-side (i.e., see FIG. 2). A 0.4-mm diameter laser beam is used to illuminate seed particles in a fluid flow. Light scattered by the particles at 90° to the beam is collected by a lens and focussed on to the array, resulting in a measurement volume consisting of two parallel 'plates' (i.e., see FIG. 3).

The time between a particle image being detected by the photodiode elements gives the velocity component normal to the long axis of the array. The direction of the velocity is given by the order of detection. The transit time is measured by cross-correlating the amplified electrical outputs of the photodiode elements.

A theoretical analysis has been performed to examine the influence of electrical noise on the measured velocity. Noise produces an apparent additional turbulence normal stress, the magnitude of which (when normalized over mean velocity) increases as the mean-velocity squared. However, the magnitude drops if the optical magnification of the receiving lens is increased, allowing the laser beam to be focussed. Maximizing the magnification has the added benefit of minimizing the measurement volume size. The optical magnification of the present receiving lens is preferably 10, resulting in a measurement volume which is preferably 0.104 mm wide (D), 0.457 mm long (h), and 0.4 mm deep, the latter dimension being the diameter of the laser beam (4 times its r.m.s. width $\sigma$).

As described above, the angle response of the DAV was examined by simulating the signals generated by the photodiode elements for a range of conditions. The yaw and pitch response were found to be closely cosinusoidal to angles greater than 60° so long as signals producing peak correlation coefficients less than 0.95 were ignored. These limitations are largely a function of photodiode design. Even if the design is restricted to two rectangular elements, the response can be substantially improved by increasing the aspect ratio of the array h/D and reducing the measurement volume to beam size ratio D/$\sigma$.

Measurements were performed in two attached boundary layer flows (edge velocity 10 and 20 m/s) and in a separated flow formed behind a fence (edge velocity 10 m/s). In the boundary-layer flows, detailed comparisons were made with hot-wire measurements. In both flows, DAV and hot-wire mean velocities substantially agree. The DAV is capable of mean velocity measurements down to about 0.2 mm from the wall. Normal stress and skewness profiles are also in substantial agreement, except in the near-wall and edge regions. Satisfactory agreement is obtained in the near wall region after correcting for velocity gradient broadening. Discrepancies in the edge region are a consequence of electrical noise which produced an apparent additional stress of about $0.001U_e^2$.

Measurements made with the fence demonstrate the ability of the DAV to make useful measurements in turbulent reversing flows. All expected features of the separated shear layer and recirculation are observed including the sub-boundary layer formed beneath the backflow. Histograms measured in the reversing part of this flow show a hole near zero velocity that is a consequence of the imperfections in the DAV angle response and the limited duration of the photodiode signals correlated to determine the transit time. Neither of these problems is fundamental. Using a modified photodiode array design and increasing the duration of the photodiode signals used in the cross-correlation is believed to eliminate or, at least, greatly reduce this effect.

As stated above, the specific DAV described above is only one of many possible designs. Some variations in this design and other possible designs are described below.

As mentioned above, while a light source is required, it need not be a laser. Instead, any light source can be used so long as the light can be collimated into a beam or sheet of any intensity distribution. The light may be directed into the flow with mirrors or other optical pointing devices. A collimator and/or spatial filter are not specifically necessary. Devices for improving or varying the characteristics of the collimated light may also be used. The seed particles in the flow are also not critical. Any particles, liquid or solid, added or naturally occurring, may be used so long as they are sufficiently small to accurately follow the flow and sufficiently large to scatter enough light. The particles may be generated and added by any suitable means. Further, any lens or lens arrangement for forming an image may be used to collect scattered light. The optical magnification may also be suitably adjusted. The detector array preferably includes solid-state electro-optic elements, the elements being shaped and positioned to make the deduction of the particle position, velocity and/or acceleration from transit time measurements across or between the array elements simple and accurate. The number of direction in which scattered light is collected, the directions themselves, and the number, design and orientation of the detector arrays on to which light is focussed, is suitably determined based on the desired type of measurement. Some possible designs are shown in FIGS. 22–27.

Figure 22A:
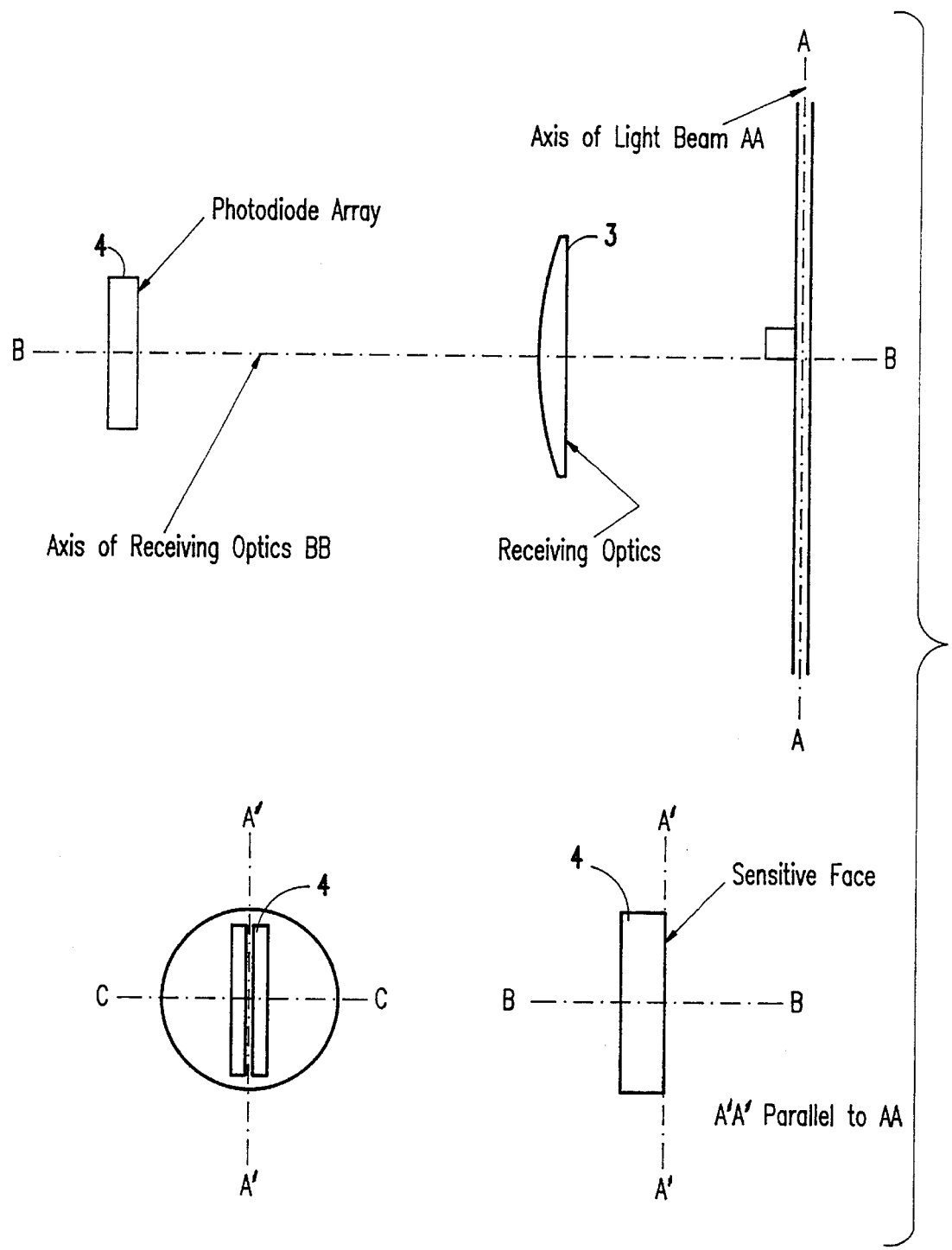
FIG. 22(a) illustrates the optical system of the one-component DAV shown in FIG. 1 above and FIGS. 22(b)–22(d) illustrate variations of the above system.

FIG. 22*a* illustrates the optical system of the one-component DAV shown in FIG. 1 above. In this system, the two-element detector array is used. The axis of the lens or other focussing device (hereafter referred to as the receiving optics) is positioned 90 degrees to the light beam.

Figure 22B:
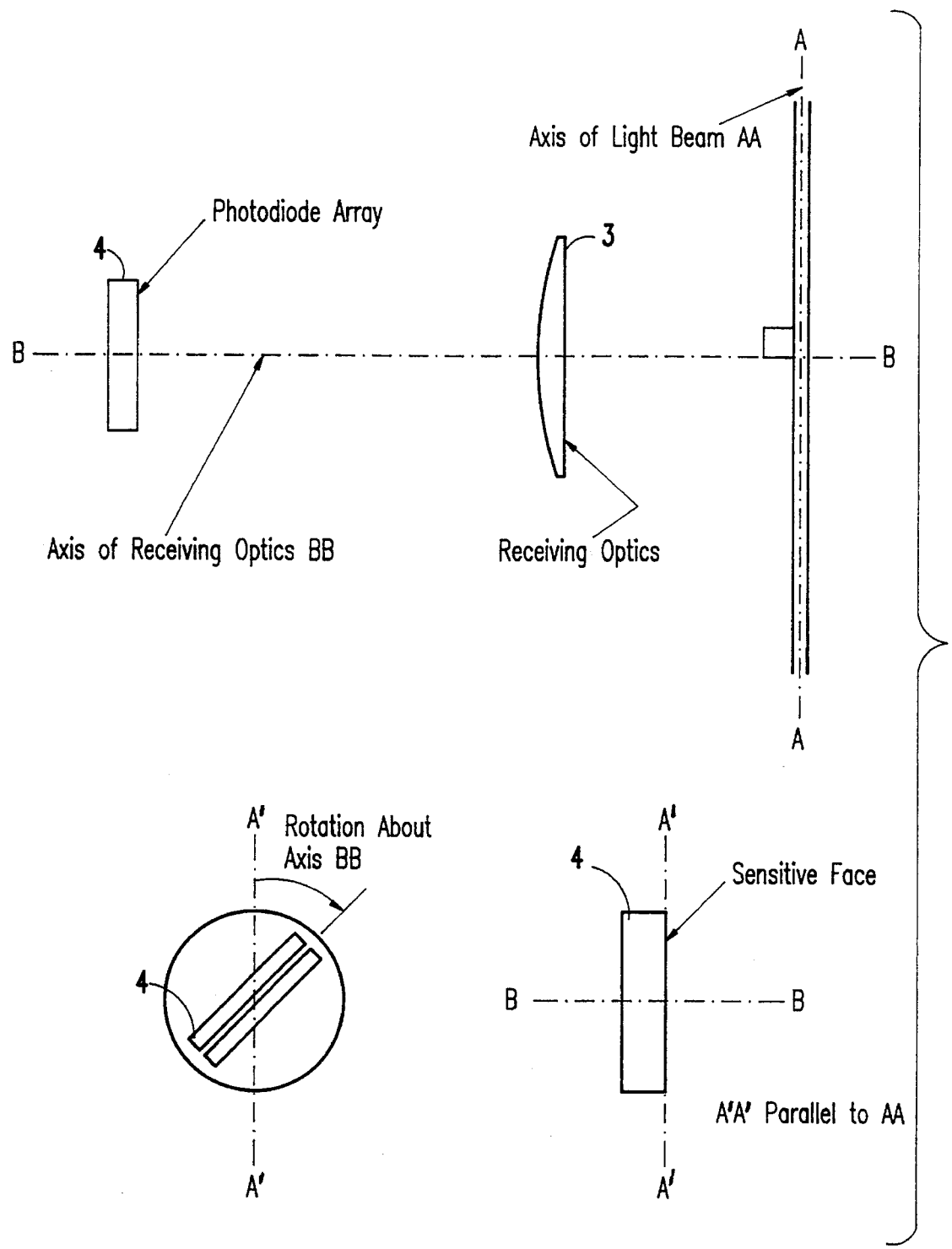

FIG. 22*b* illustrates a variation of the above system in which the long axis of the detector array is not oriented parallel to the laser beam, but is rotated to another angle about the axis of the receiving optics. Rotating the array to a different angle changes the direction of the velocity component being measured, that direction being normal to the long axis of the array.

Figure 22C:
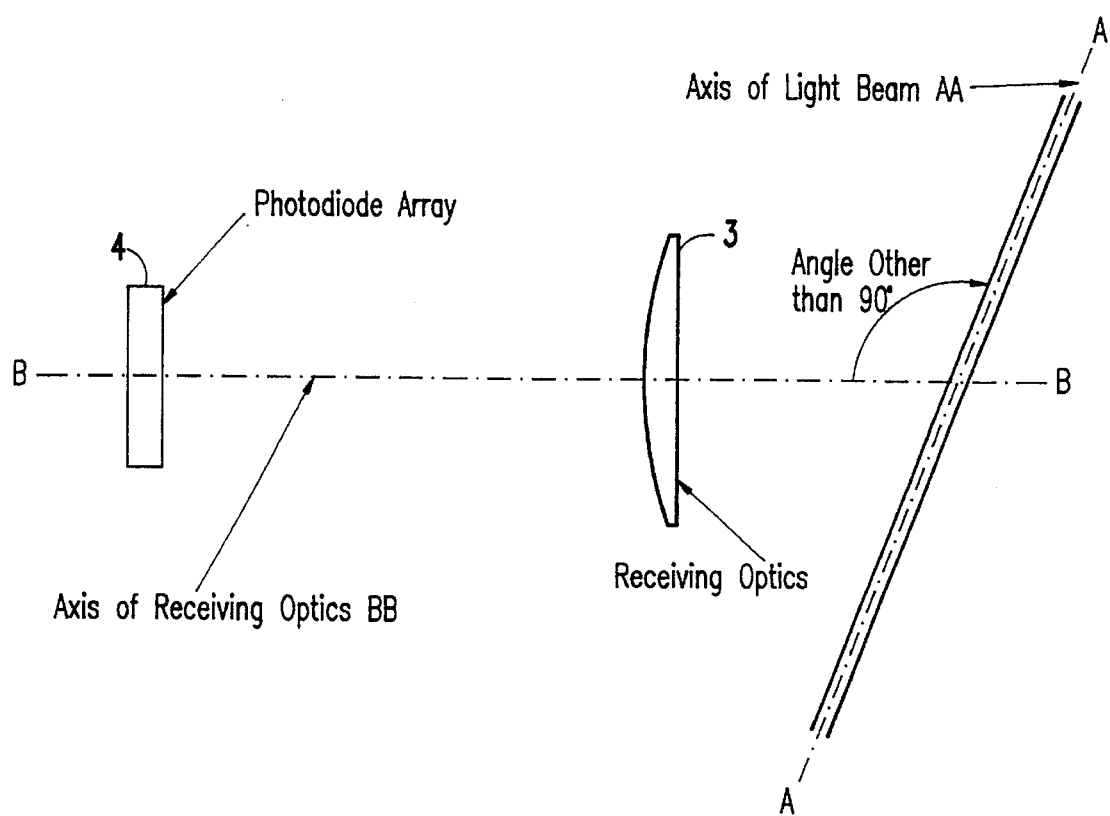

FIG. 22*c* iillustrates another variation in which the axis of the receiving optics being placed at an angle other 90 degrees to the laser beam. The reasons for such a variation is to take advantage of greater scattered light intensity at other angles and to alter the shaped of the measurement volume in a desirable way, e.g., to improve its angle response.

Figure 22D:
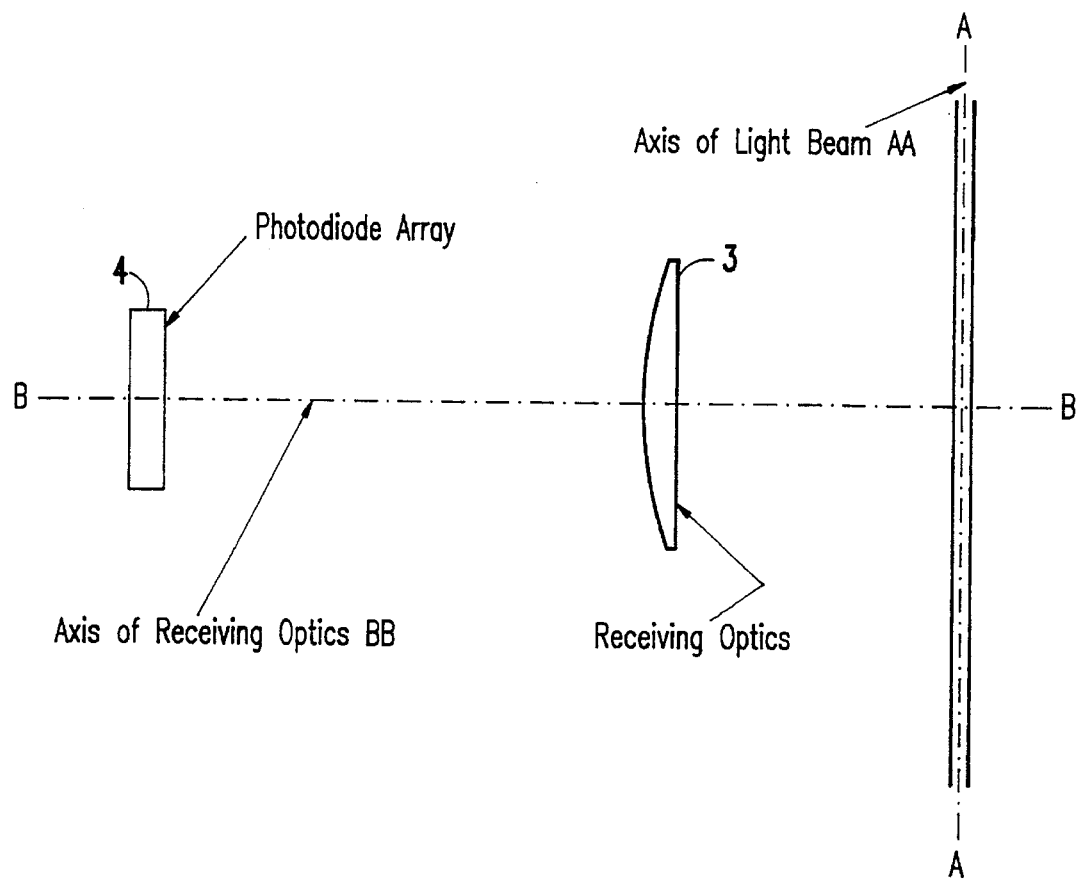
Figure 22D:
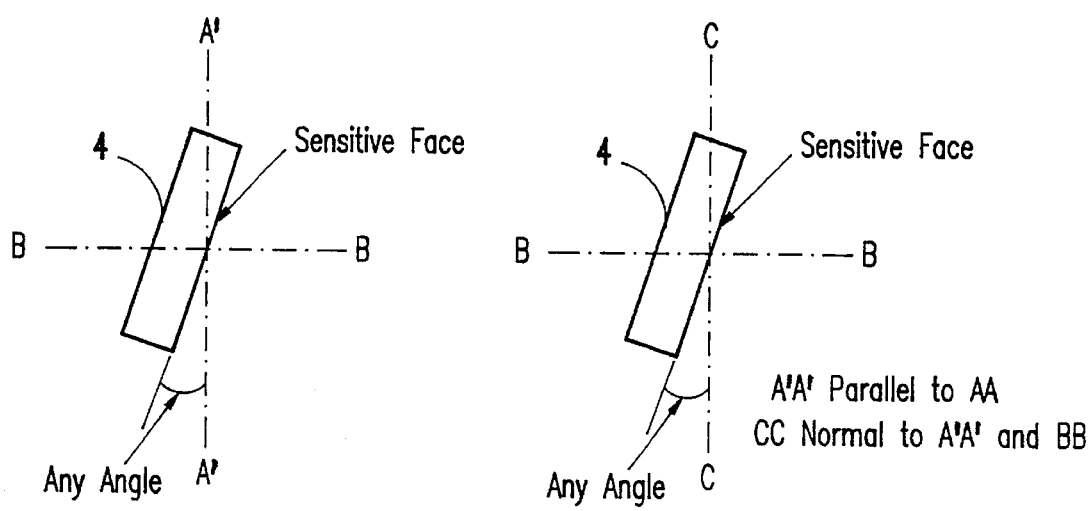

FIG. 22*d* iillustrates a variation in which the face of the detector array is not placed normal to the axis of the receiving optics. This is performed so as to advantageously change the geometry of the measurement volume. For example, if the detector of the one-component DAV of the specific embodiment described above were rotated about its long axis, so that the axis of the receiving optics were no longer normal to its surface, this would reduce the width D of the measurement volume of FIG. 3, while the length of the measurement volume h would remain constant. As indicated by the theoretical analyses described above, the resulting increase in h/D would improve the angle response of the device.

In addition to varying the angle of the receiving optics and the orientation of the detector array, the design of the detector array may also be varied to improved, or otherwise alter, the performance of the device.

Figure 23A:
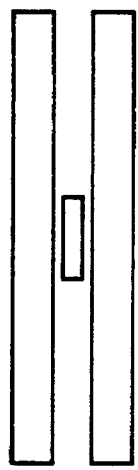
FIG. 23(a)–23(e) illustrates variation in the detector array.

FIG. 23a iillustrates a detector array for a single component point velocity measurements which, similarly to the specific embodiment described above, includes two long thin rectangular elements. The velocity component normal to the long axis of the array is measured by timing the passage of the particle images between these two elements. Additionally, a third rectangular element is provided which is smaller than the first and second elements and which is sandwiched between them. The third element discriminates between those particle images which cross the central portion of the array and those which do not. Measuring only particle images which cross the central portion of the array improves the angle response of the device since far fewer of these images will cross the ends of the array. It also decreases the effective size of the measurement volume, which is an advantage in single-point measurements.

Figure 23B:
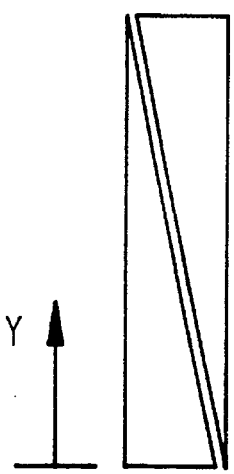
Figure 23C:
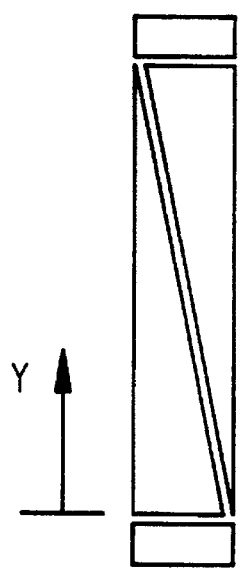

FIG. 23b iillustrates a detector array suitable for single component velocity and position measurements. It includes two long thin triangular elements formed by cutting a rectangle along one of its diagonals. These elements are used to sense the velocity components U of particle images and the y location at which they cross the array (see FIG. 23b). To obtain the velocity component U the transit time of a particle image between the long outer edges A and B of the triangular elements is measured. To obtain the y location at which the particle image crosses the array, the proportion of time spent by the particle image on the two elements is measured. Except for the few particle images which cross the ends of the array, this proportion is independent of the flow angle and is linearly and uniquely related to y. If necessary, particle images crossing the ends of the array could be eliminated from measurements by using two additional elements to detect them, as illustrated in FIG. 23c.

Figure 23D:
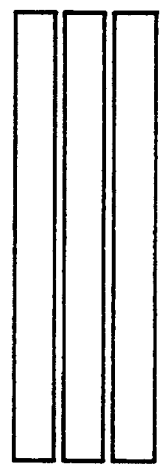

FIG. 23d illustrates a detector array capable of one-component velocity and acceleration measurements, which includes three long rectangular elements placed side-by-side. The transit time of particle images between each of the elements gives two successive estimates of the velocity component U. These estimates may be differenced to obtain the component of the particle acceleration in the direction of U.

Figure 23E:
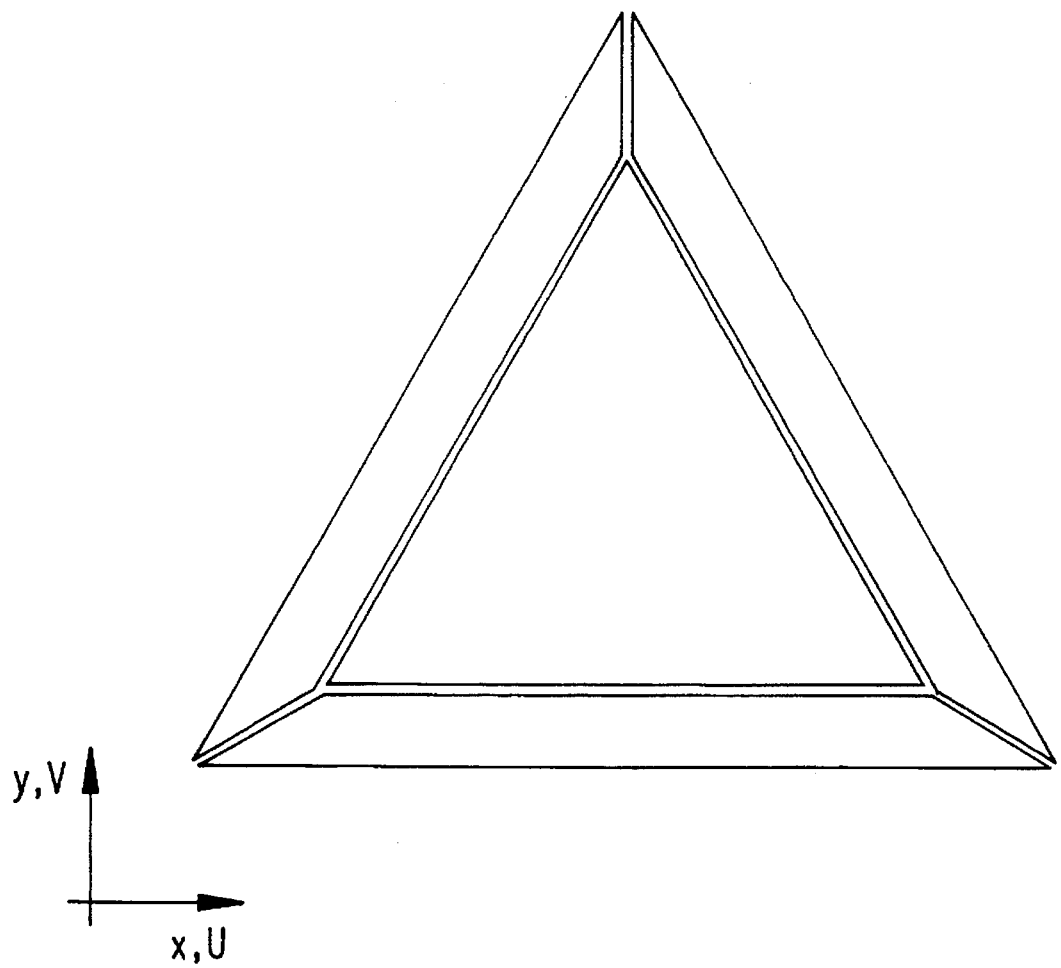

FIG. 23e illustrates a detector array capable of two component velocity and position measurements which includes four elements arranged in the form of a triangle. Only particle images which cross the central triangular element are measured. Measuring the transit time of such a particle image across each of the elements its path intersects gives sufficient information, when combined with the known geometry of the array, to determine from simple trigonometry its velocity components U and V and the x and y locations at which it crossed the array.

In addition to the above variations, multiple detector arrays may be used to improve, or otherwise alter, the performance of the device.

Figure 24:
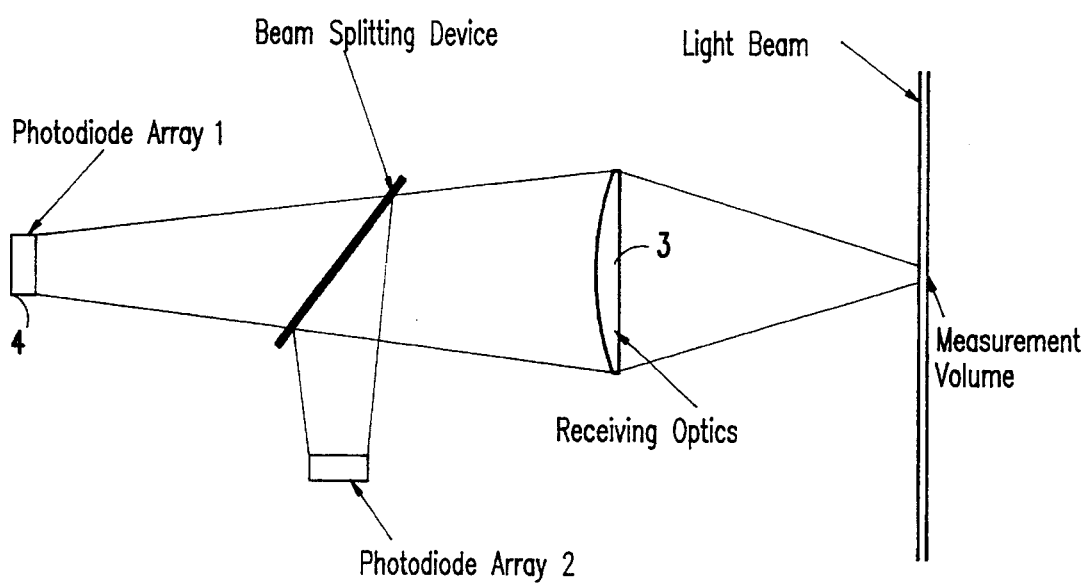
FIG. 24 illustrates a system utilizing multiple photodiode arrays.
Figure 25A:
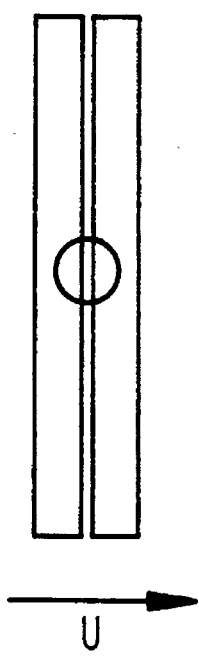
FIGS. 25(a)–25(b) illustrate two examples of measurement volume cross-sections which may be generated by an arrangement of the type shown in FIG. 24.
Figure 25B:
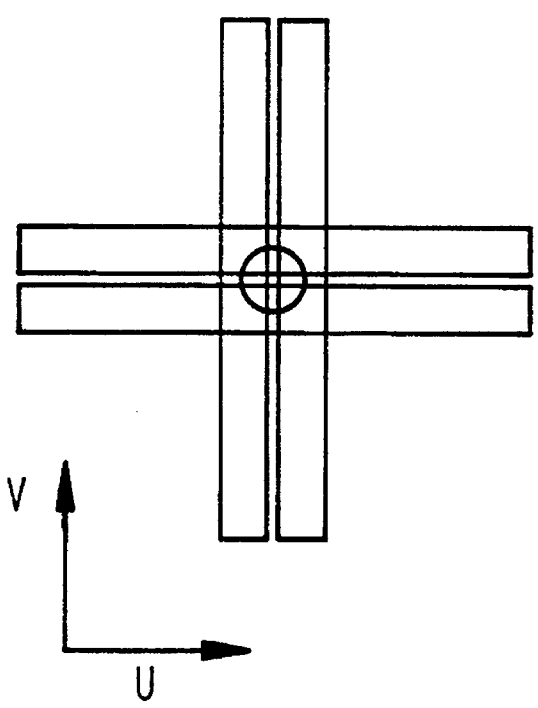

Multiple detector arrays may be used with a single set of receiving optics using the arrangement shown in FIG. 24. Light is received through the receiving optics is split using one or more half mirrors or other beam-splitting devices to generate two or more identical images at different locations. Detector arrays positioned at these locations see the same view. Therefore, their projections back through the beam splitters and receiving optics are superimposed in the measurement volume. FIGS. 25a–25b illustrate two examples of the many useful measurement volume cross-sections that may be generated in this manner.

In FIG. 25a, the detector array of FIG. 2 and an array consisting of only one small circular element have been overlaid. The two rectangular elements are used to sense the velocity component U by timing the passage of particle images between them. The function of the small circular element is to determine which particle images cross the center of the array. As discussed above, this has the benefit of improving the angle response of the device and of reducing the effective measurement volume size. In FIG. 25b, three detector arrays have been overlaid to form a device for accurate two-component velocity measurement. Two of the detector arrays are the same as that shown in FIG. 2. One detector array is oriented to sense the velocity component U, and one is oriented to sense the velocity component V. The third array consists of a single circular element, which improves the angle response of the first and second arrays and which reduces the effective measurement volume size, as discussed above.

Figure 26:
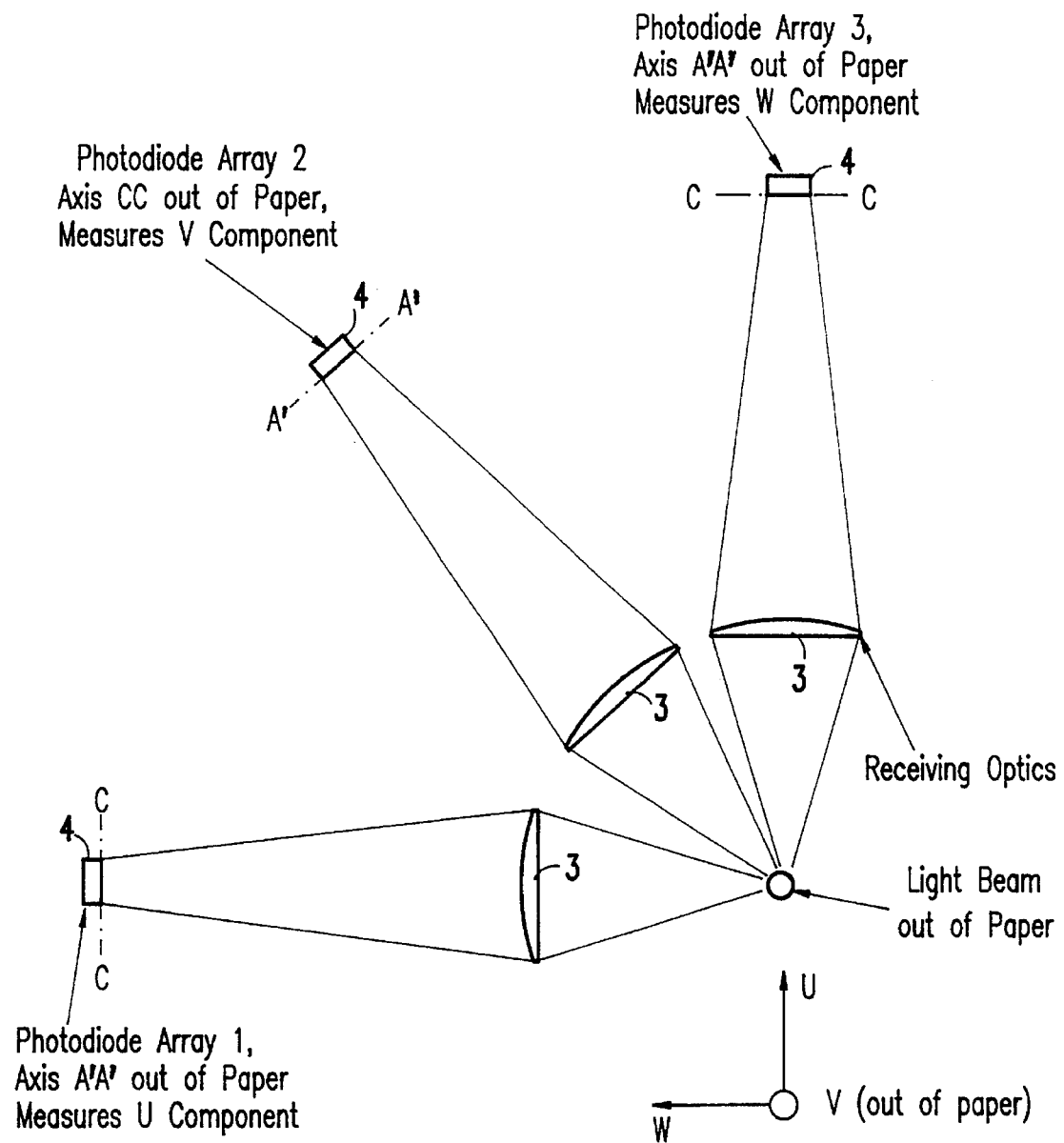
FIG. 26 illustrates a device which uses three sets of receiving optics at predetermined angles, with each set collecting scattered light from the same measurement volume.

Multiple detector arrays may also be used with several sets of receiving optics, especially when more than one component of velocity, position and/or acceleration is measured. FIG. 26 illustrates a device which uses three sets of receiving optics at predetermined angles all collecting scattered light from the same measurement volume. Each set of receiving optics focusses the scattered light on to a detector array of the type shown in FIG. 2. The use of multiple sets of receiving optics allows the arrays to be oriented so that each may be used to sense a different velocity component. Of course, this is only one example of such a device. Any of the detector arrays described above or others of suitable design may be combined to make multi-component measurements in this manner.

Figure 27A:
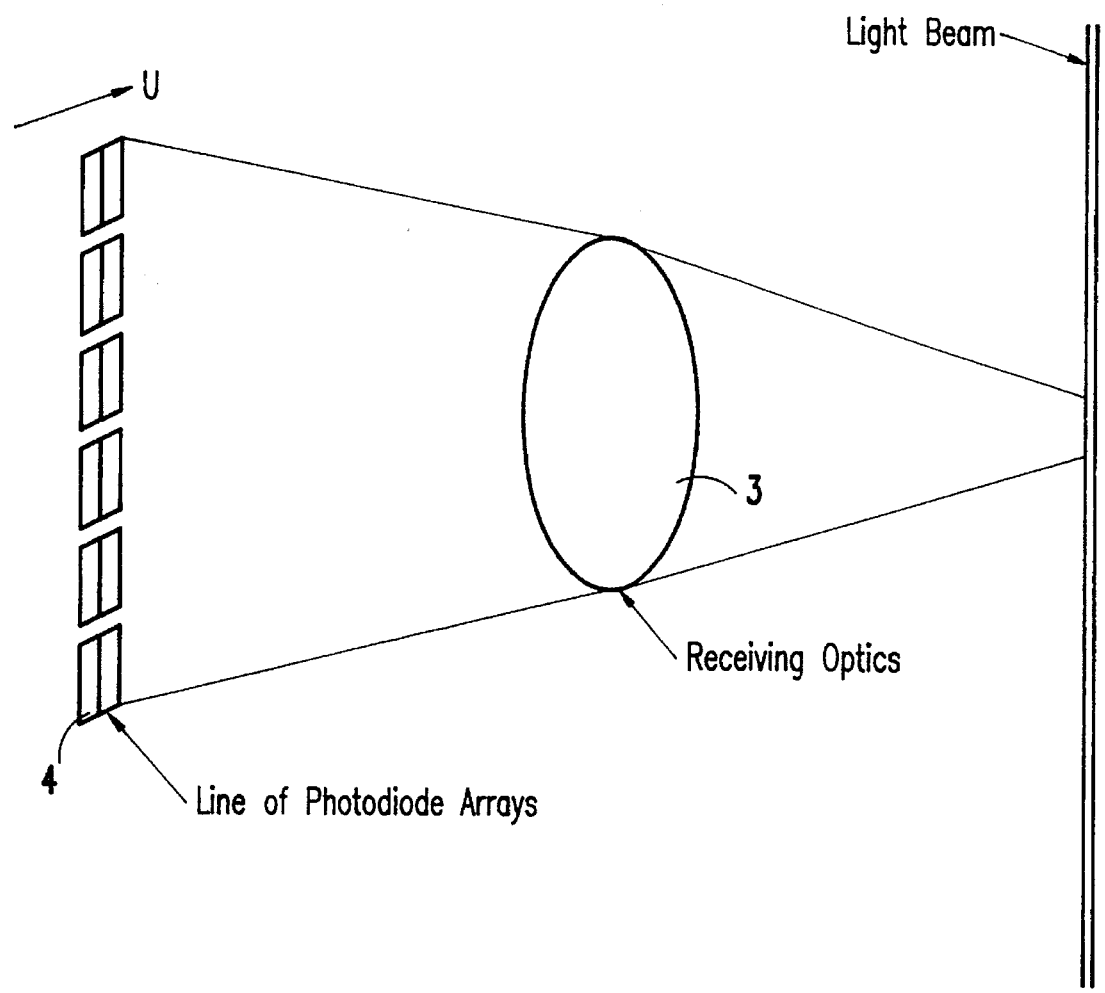
FIG. 27(a) illustrates a design for making one-component velocity measurements at a number of locations along a beam.
Figure 27B:
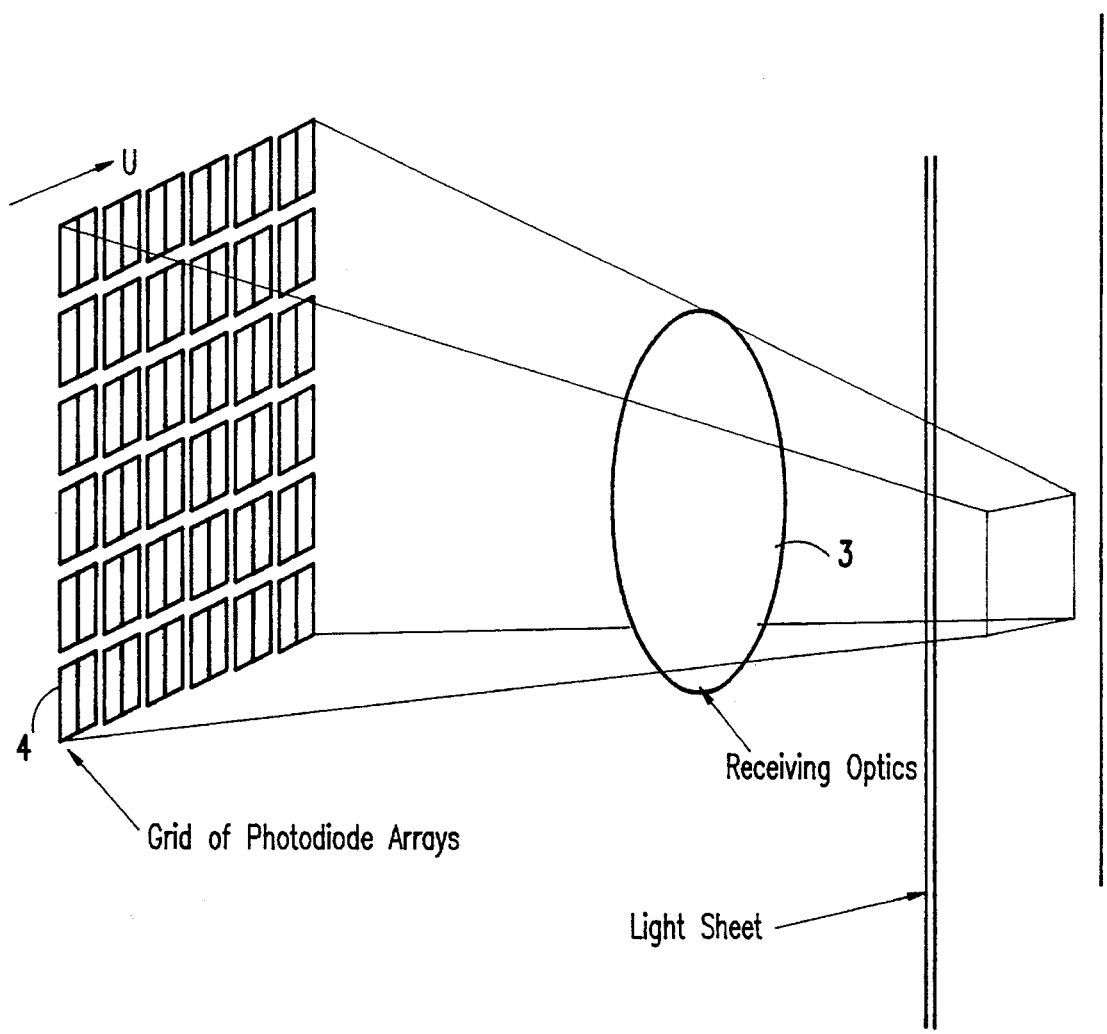
FIG. 27(b) illustrates a system using a light sheet and a number of detector arrays spread over an area.

Multiple detector arrays with single or multiple sets of receiving optics may also be used to make simultaneous or near-simultaneous measurements at a number of different points. FIG. 27a, for example, shows a design for making one-component velocity measurements at a number of locations along a beam. A number of detector arrays of the type shown in FIG. 2 are arranged along a line. The receiving optics focus scattered light from a section of the light beam onto this line. Each of the detectors is operated independently to sense the velocity component U of particle images that cross it. Thus, the distribution of U along the line of the laser beam and its changes with time are measured. This approach may be extended to make measurements simultaneously, or nearly simultaneously, by using a light sheet and a number of detector arrays spread over an area, as illustrated in FIG. 27b.

Further possible variations in design include placing any voltage across each element of each detector. The electrical signal output by each detector array element may be amplified by any suitable means, not just the circuit shown in FIG. 5a, so long as the signal from each detector array element is separately amplified.

Further, to obtain the transit time of particle images across or between elements from the signals they output, many different schemes may be implemented, not just the cross correlation or trigger timing schemes described above. For example, a number of the photodiode array designs described above require measuring both the arrival and departure of particle images from the photodiode array elements. One way of doing this is to modify the trigger and logic circuitry of FIGS. 5b through 5e to detect both the rising and falling edges of the signal and on each edge trigger the storage of the clock value at that instant in a memory buffer. Such a circuit can be easily built for each element in the array. Other timing and processing schemes may be devised that use information ignored by both the cross-correlation and trigger methods. An example of such information is the relative magnitude and shape of the peaks in the signals output by each array element. This information can be related to particle location, direction and velocity through the light beam or sheet. To perform the timing and processing, many different types of equipment might be used. The analog circuitry, logic circuitry, amplifiers, digital interface board, analog-to-digital converter, IBM XT and AT computers, computer programs, and array processor are merely examples of what might be used.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A velocimeter for measuring a flow containing particles, comprising:

means for emitting a light beam through said flow, said particles in said flow scattering light as said light beam passes through said flow:

means for focussing said light scattered by said particles to form particle images;

means for detecting said particle images formed by said focussing means and for outputting detection signals; and means for processing said detection signals so as to time passage of said particle images across said detecting means, wherein said detecting means comprises at least one array of photodiodes for receiving said particle images from said focussing means, each photodiode of said at least one array having a predetermined shape and being positioned relative to others of said photodiodes of said at least one array so as to determine characteristics of said particle images, wherein said at least one array includes a plurality of photodiode arrays, said focussing means including at least one lens, first and second photodiode arrays of said plurality of photodiode arrays for monitoring overlapping portions of an identical image by separating scattered light collected by a same lens of said at least one lens of said focussing means such that a plurality of identical images are formed at different locations, wherein a circular element having a predetermined size is positioned at a center of said photodiode array and is overlaid thereover, and wherein only particle images crossing said circular element are measured.

2. A velocimeter for measuring a flow containing particles, comprising:

a light source for emitting a light beam through said flow, said particles in said flow scattering light as said light beam passes through said flow;

means for focussing said light scattered by said particles to form particle images;

means for detecting said particle images formed by said focussing means and for outputting detection signals; and means for processing said detection signals so as to time passage of said particle images across said detecting means, wherein said detecting means comprises at least one array of photodiodes for receiving said particle images from said focussing means, each photodiode of said at least one array having a predetermined shape and being positioned relative to others of said photodiodes of said at least one array so as to determine characteristics of said particle images, wherein said at least one array comprises first, second and third detector arrays overlaid one on top of another for making simultaneous two-component velocity measurements, the third detector array comprising a single circular element.

3. A velocimeter for measuring a flow containing particles, comprising:

a light source for emitting a light beam through said flow, said particles in said flow scattering light as said light beam passes through said flow;

means for focussing said light scattered by said particles to form particle images;

means for detecting said particle images formed by said focussing means and for outputting detection signals; and means for processing said detection signals so as to time passage of said particle images across said detecting means, wherein said detecting means comprises at least one array of photodiodes for receiving said particle images from said focussing means, each photodiode of said at least one array having a predetermined shape and being positioned relative to others of said photodiodes of said at least one array so as to determine characteristics of said particle images, wherein said detecting means comprises a plurality of photodiodes, first and second photodiode elements of said plurality of photodiodes being rectangularly shaped, said detecting means comprising a third photodiode, said first, second and third photodiodes being arranged side-by-side, wherein said third photodiode has a size smaller that of said first and second photodiodes, said third photodiodes being sandwiched between said first and second photodiodes.

4. A velocimeter for measuring a flow containing particles, comprising:

a light source for emitting a light beam through said flow, said particles in said flow scattering light as said light beam passes through said flow;

means for focussing said light scattered by said particles to form particle images;

means for detecting said particle images formed by said focussing means and for outputting detection signals; and means for processing said detection signals so as to time passage of said particle images across said detecting means, wherein said detecting means comprises at least one array of photodiodes for receiving said particle images from said focussing means, each photodiode of said at least one array having a predetermined shape and being positioned relative to others of said photodiodes of said at least one array so as to determine characteristics of said particle images, wherein said at least one array comprises first and second triangular photodiodes.

5. A velocimeter according to claim 4, wherein said at least one array further comprises third and fourth photodiodes at ends of said first and second triangular photodiodes.

6. A velocimeter for measuring a flow containing particles, comprising:

a light source for emitting a light beam through said flow, said particles in said flow scattering light as said light beam passes through said flow;

means for focussing said light scattered by said particles to form particle images;

means for detecting said particle images formed by said focussing means and for outputting detection signals; and means for processing said detection signals so as to time passage of said particle images across said detecting means, wherein said detecting means comprises at least one array of photodiodes for receiving said particle images from said focussing means, each photodiode of said at least one array having a predetermined shape and being positioned relative to others of said photodiodes of said at least one array so as to determine characteristics of said particle images, wherein said at least one array comprises first, second, third and fourth photodiodes arranged in a triangular shape.

7. An apparatus for measuring a flow containing particles, comprising:

means for emitting a single focussed light beam through said flow, said particles in said flow scattering light as said light beam passes through said flow;

means for collecting and focussing said light scattered by each of said particles carried by said flow through a portion of said focussed light beam, such that each of said particles forms a moving image;

an array of photodiodes positioned such that said moving image of each particle of said particles crosses a surface of said array as the particle passes through said portion of said focussed light beam and for outputting detection signals; and means for processing said detection signals output from each photodiode of said solid state array of photodiodes so as to time passage of particle images between photodiode of said array of photodiodes.

wherein regions within said beam from which light scattered by a particle arrives at photodiodes of said photodiode array form a measurement volume, said measurement volume having a selectively designed shape, position and intensity distribution of illumination such that at least one of velocity, acceleration and position of the particle from within the region is determined based on the measured times regardless of a position and a direction in which said particle enters the measurement volume, wherein said array comprises a plurality of photodiode arrays and said focussing means comprising at least one lens, said apparatus further comprising means for splitting said particle images formed by said focussing means being directed to first and second photodiode arrays of said plurality of photodiode arrays, said first and second photodiode arrays for monitoring overlapping portions of a same image by separating scattered light collected by a same lens of said at least one lens of said focussing means such that a plurality of identical images are formed at different locations.

8. A velocimeter for measuring a flow containing particles, comprising:

a light source for emitting a light beam through said flow, said particles in said flow scattering light as said light beam passes through said flow;

means for focussing said light scattered by said particles to form particle images;

means for detecting said particle images formed by said focussing means and for outputting detection signals; and means for processing said detection signals so as to time passage of said particle images across said detecting means, wherein said detecting means comprises at least one array of photodiodes for receiving said particle images from said focussing means, each photodiode of said at least one array having a predetermined shape and being positioned relative to others of said photodiodes of said at least one array so as to determine characteristics of said particle images, wherein a circular element having a predetermined size is positioned at a center of said photodiode array and is overlaid thereover, wherein only particle images crossing said circular element are measured, wherein said detecting means comprises first, second and third arrays, said third array being overlaid on said first and second arrays, a circular element having a predetermined size being positioned at a center of said third array and overlaid thereover, wherein only particle images crossing said circular element are measured.

* * * * *